(12) United States Patent
Tsukahara et al.

(10) Patent No.: US 6,452,879 B1
(45) Date of Patent: Sep. 17, 2002

(54) OPTICAL STORAGE APPARATUS

(75) Inventors: Wataru Tsukahara; Shigenori Yanagi; Toru Ikeda; Masatsugu Nishida, all of Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/772,155

(22) Filed: Jan. 29, 2001

(30) Foreign Application Priority Data

Sep. 29, 2000 (JP) ........................................ 2000-298664

(51) Int. Cl.$^7$ ................................................ G11B 7/00
(52) U.S. Cl. .................................. 369/44.36; 369/44.32
(58) Field of Search .......................... 369/44.32, 44.34, 369/44.35, 44.36, 47.36, 47.38, 47.44, 47.45, 53.12, 53.28, 53.3

(56) References Cited

U.S. PATENT DOCUMENTS 4,855,983 A * 8/1989 Arai ........................ 369/44.34
5,652,743 A * 7/1997 Takamine et al. ......... 369/44.32

FOREIGN PATENT DOCUMENTS

| JP | 05128557 | 5/1993 |
| JP | 09297923 | 11/1997 |
| JP | 11328696 | 11/1999 |

* cited by examiner

Primary Examiner—Paul W. Huber
(74) Attorney, Agent, or Firm—Greer, Burns & Crain, Ltd.

(57) ABSTRACT

An offset measuring unit receives a servo error signal E1 in which a change in an offset caused by a change in an amount of reflection light directly appears and which does not pass through a filter, and measures an offset amount in the servo error signal which is caused by a change in the amount of reflection light. A correction amount calculating unit calculates a correction amount to cancel out the offset amount and outputs the correction amount to an offset correcting circuit for an offset generating period so as to perform correction.

18 Claims, 49 Drawing Sheets

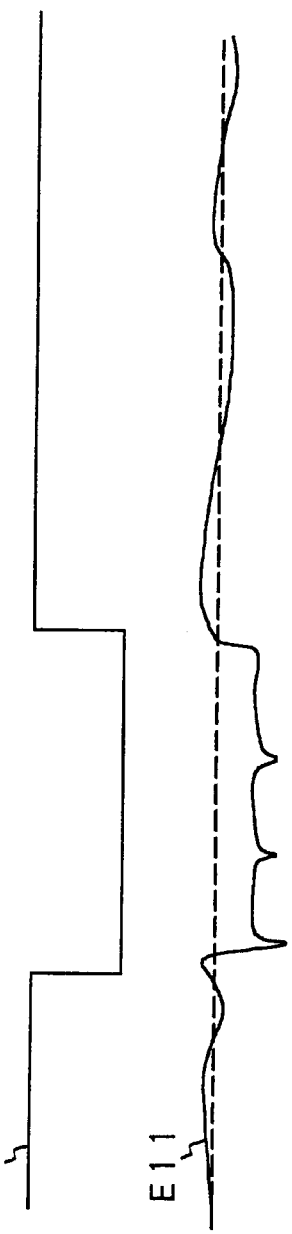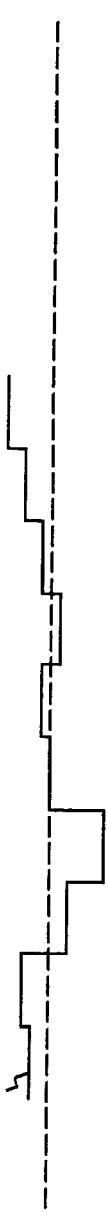
FIG. 3A PRIOR ART
FIG. 3B
FIG. 3C
FIG. 3D
FIG. 3E
FIG. 3F

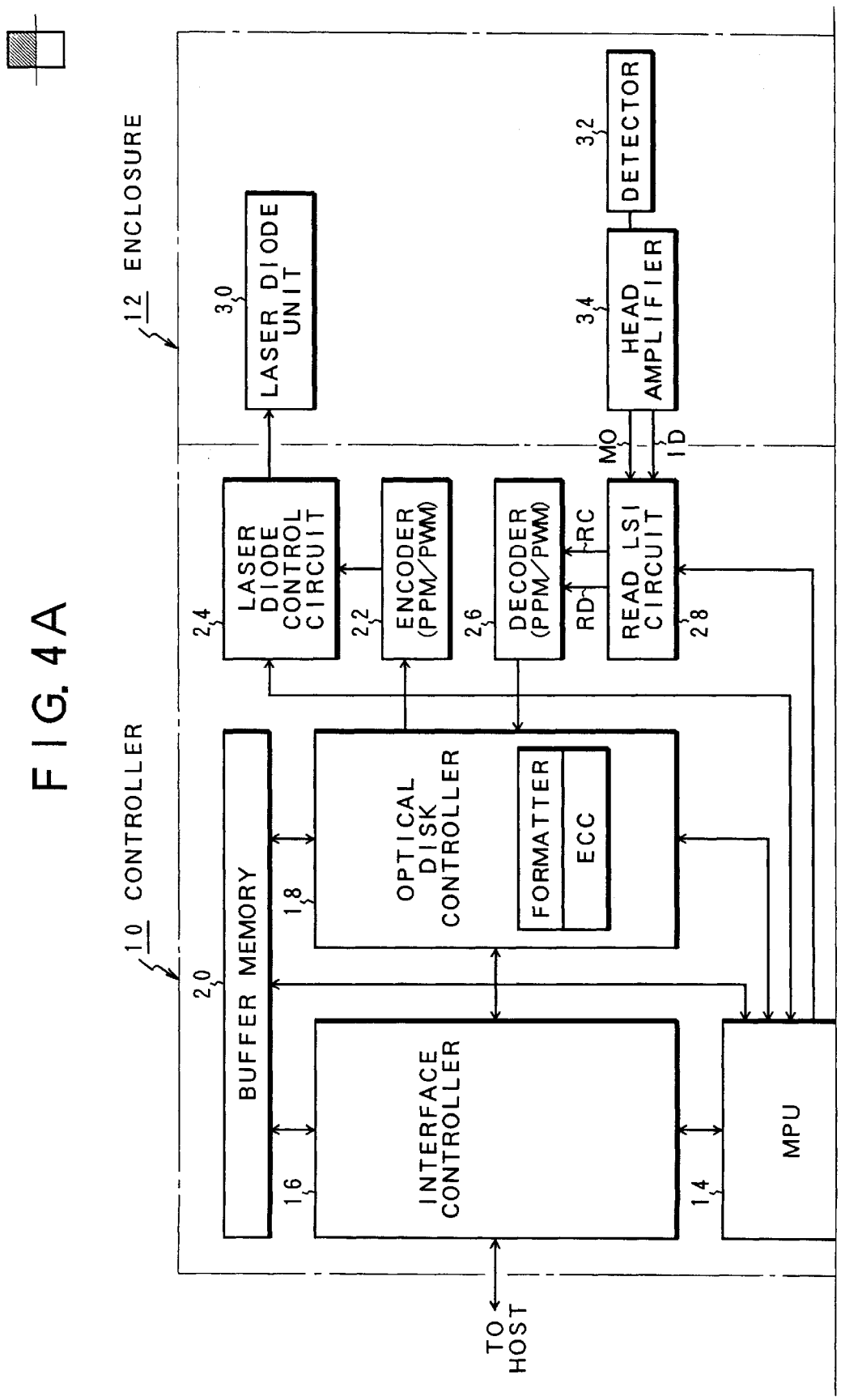

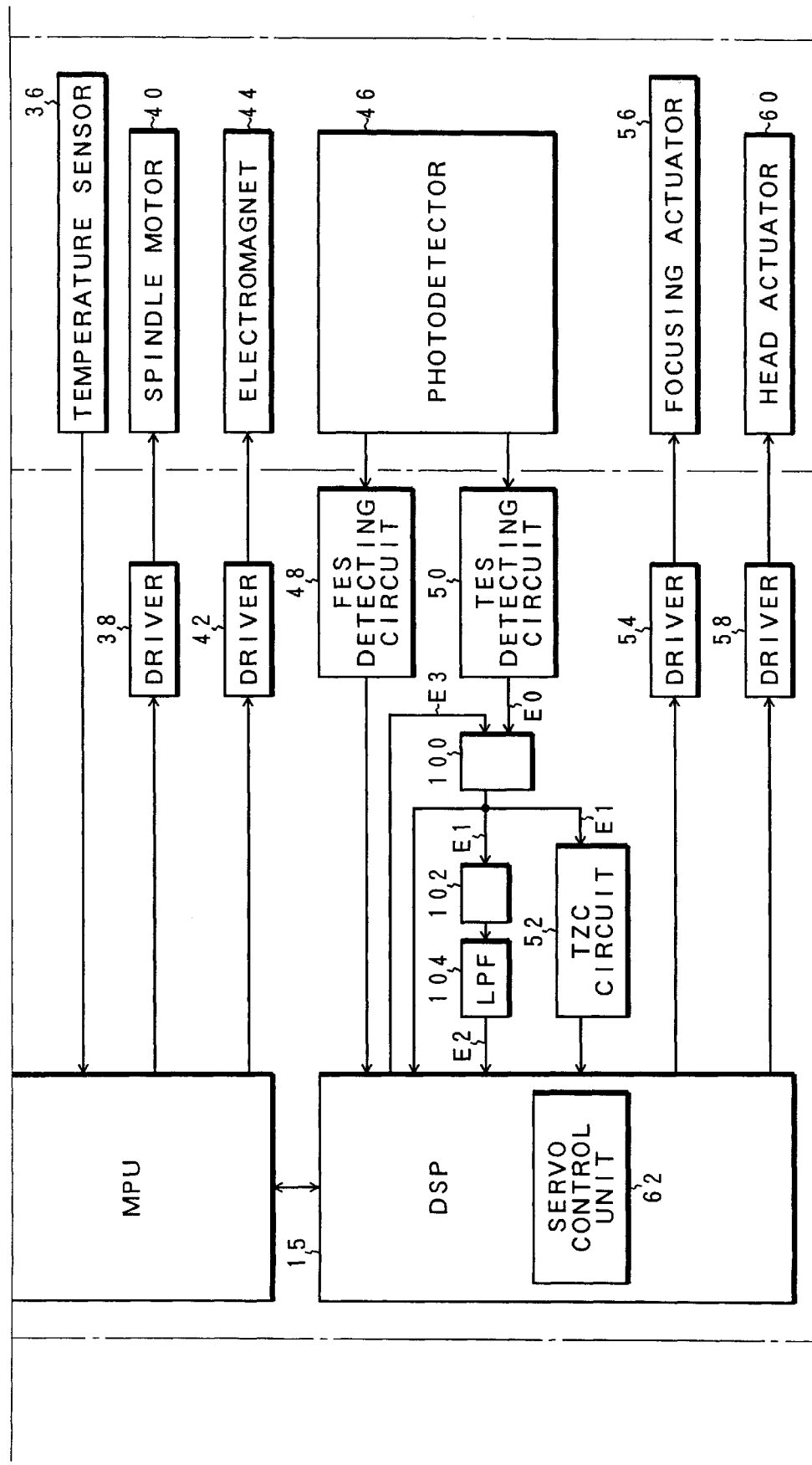

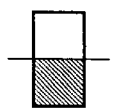
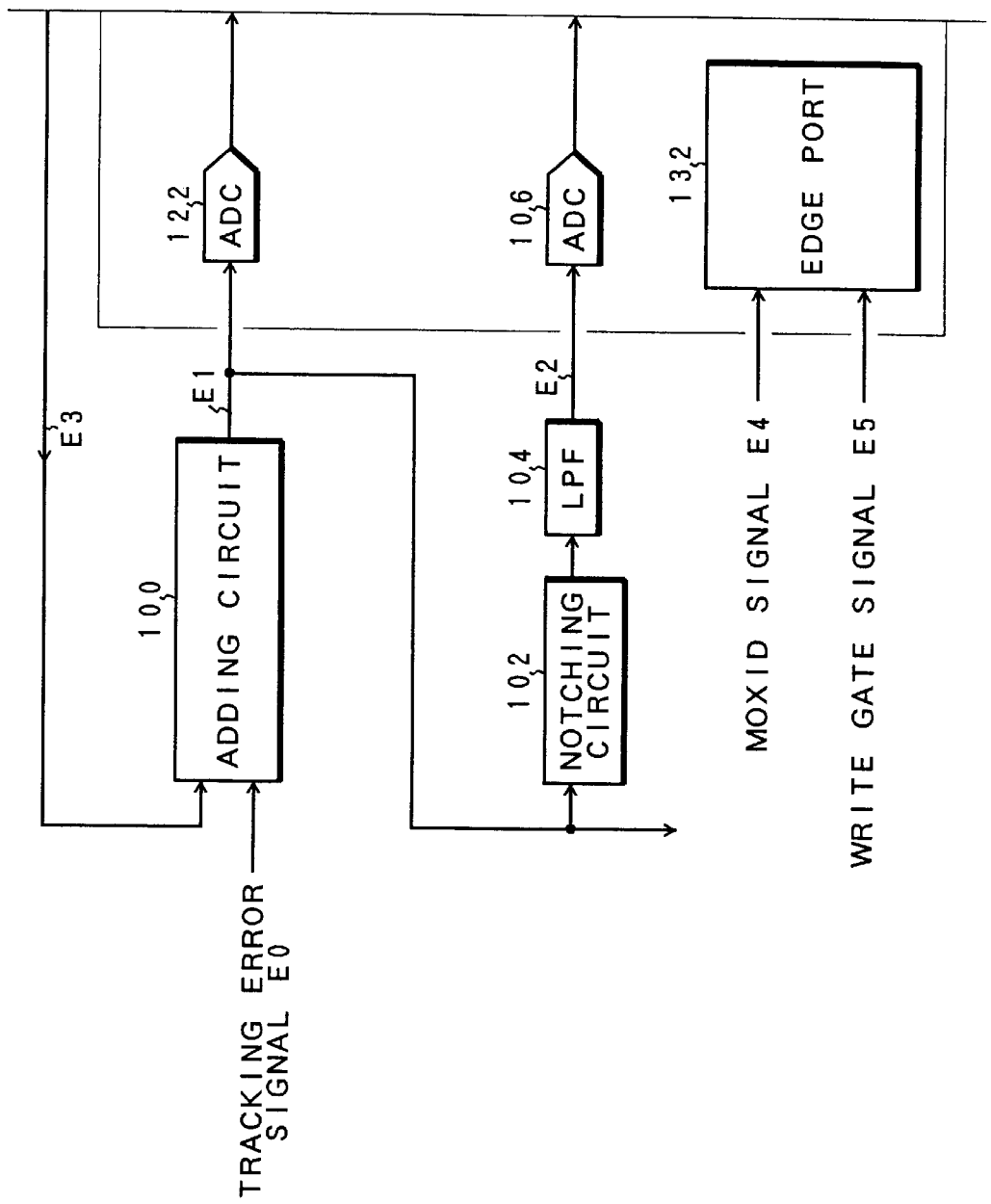
FIG. 5A

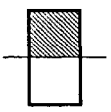
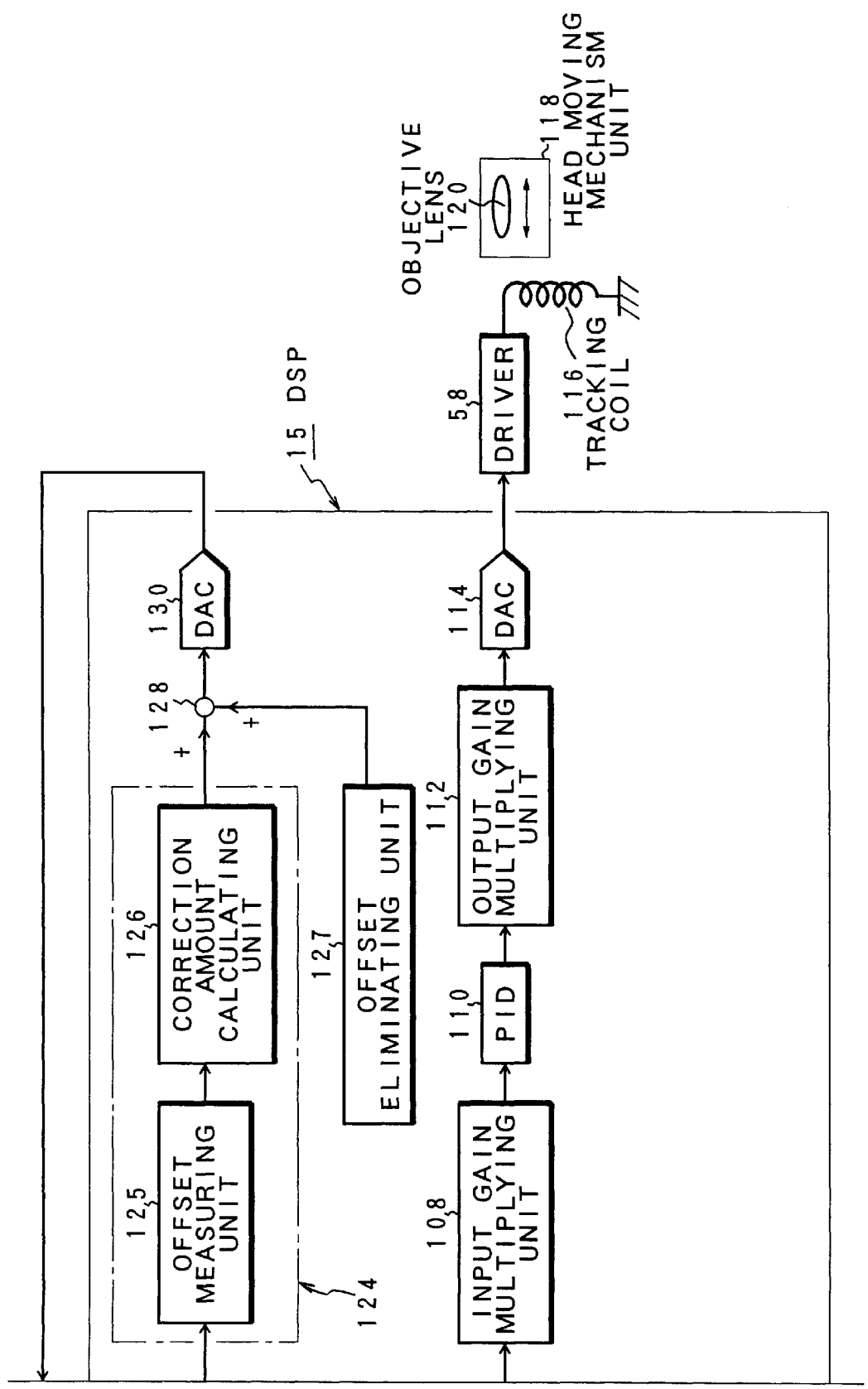
FIG. 5B

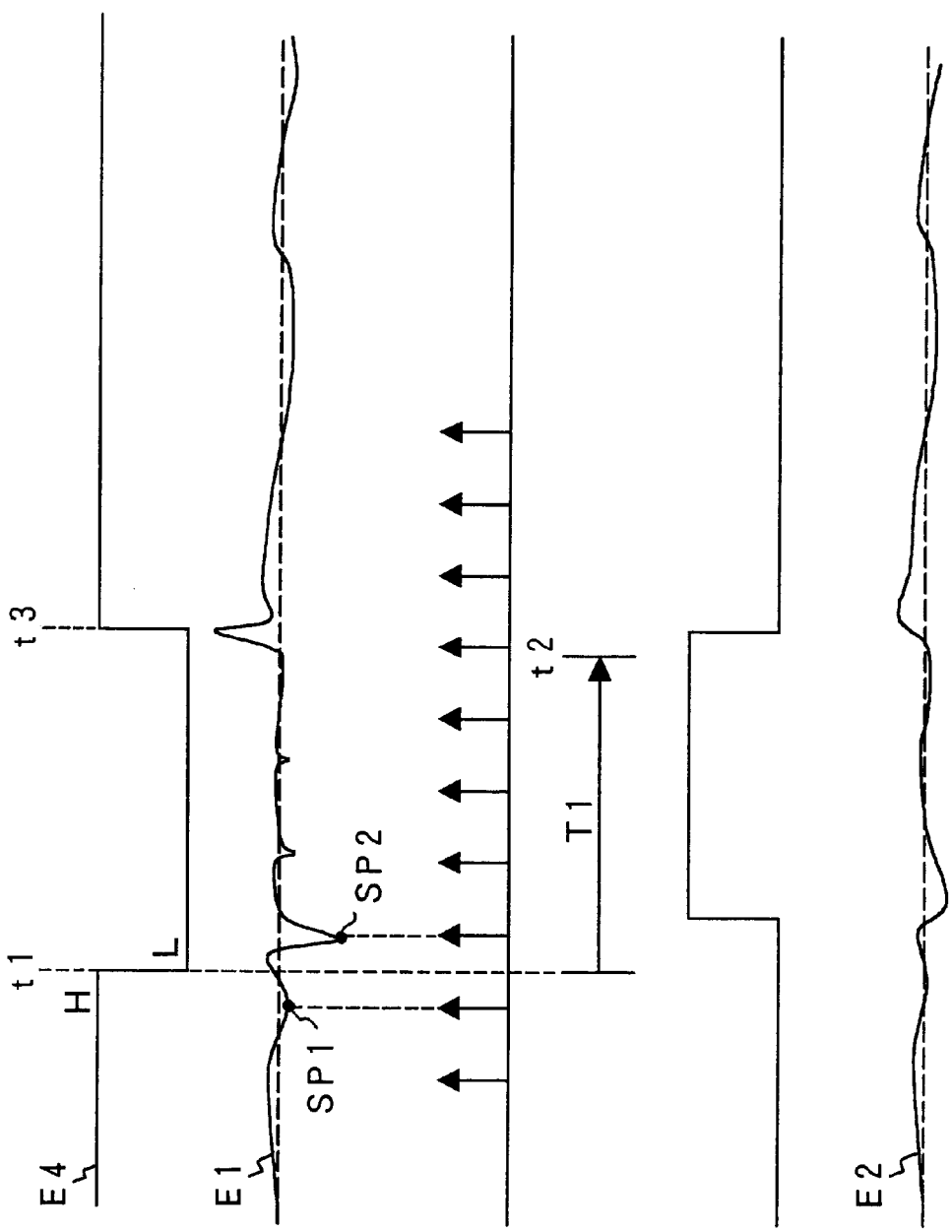

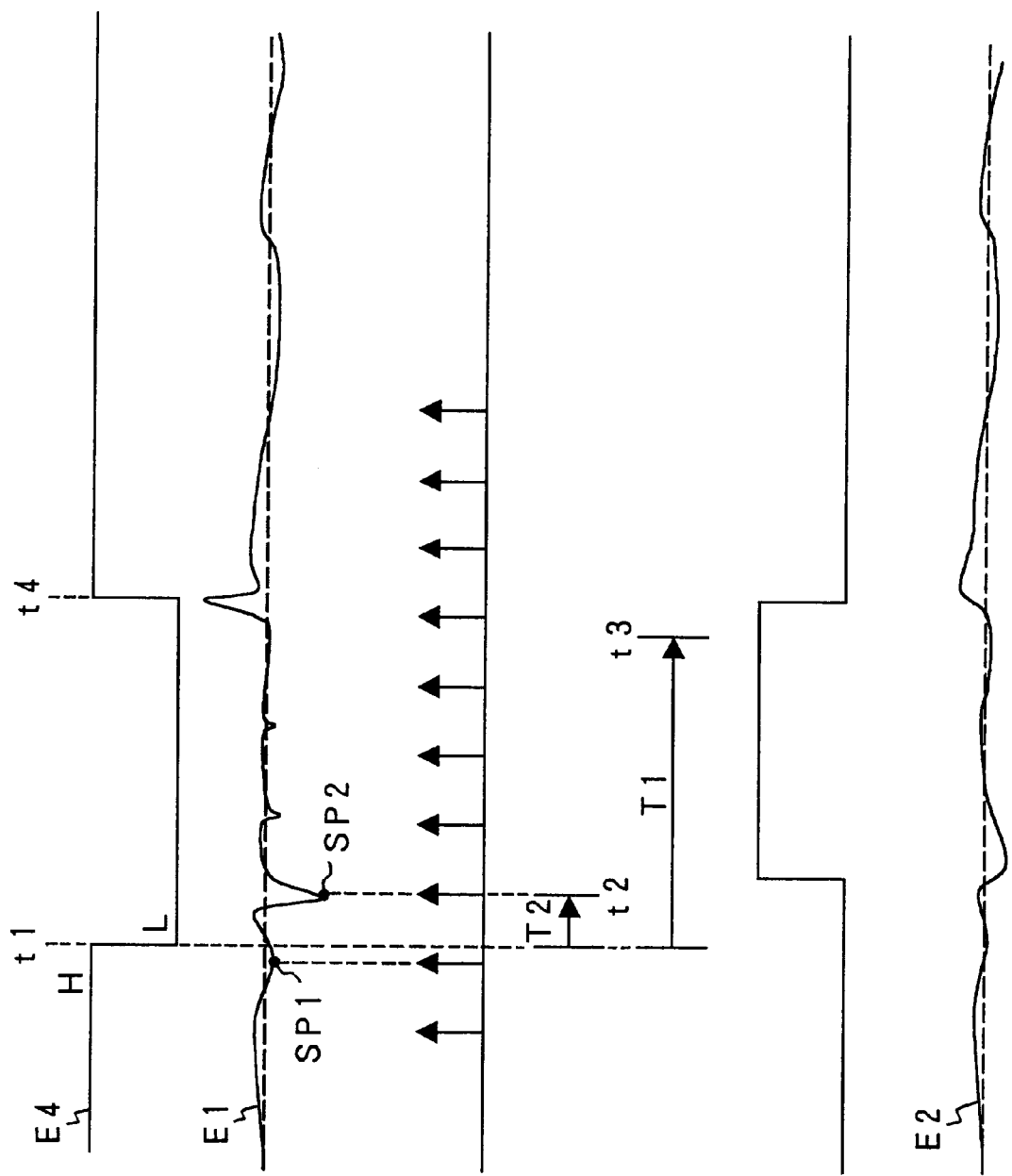

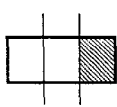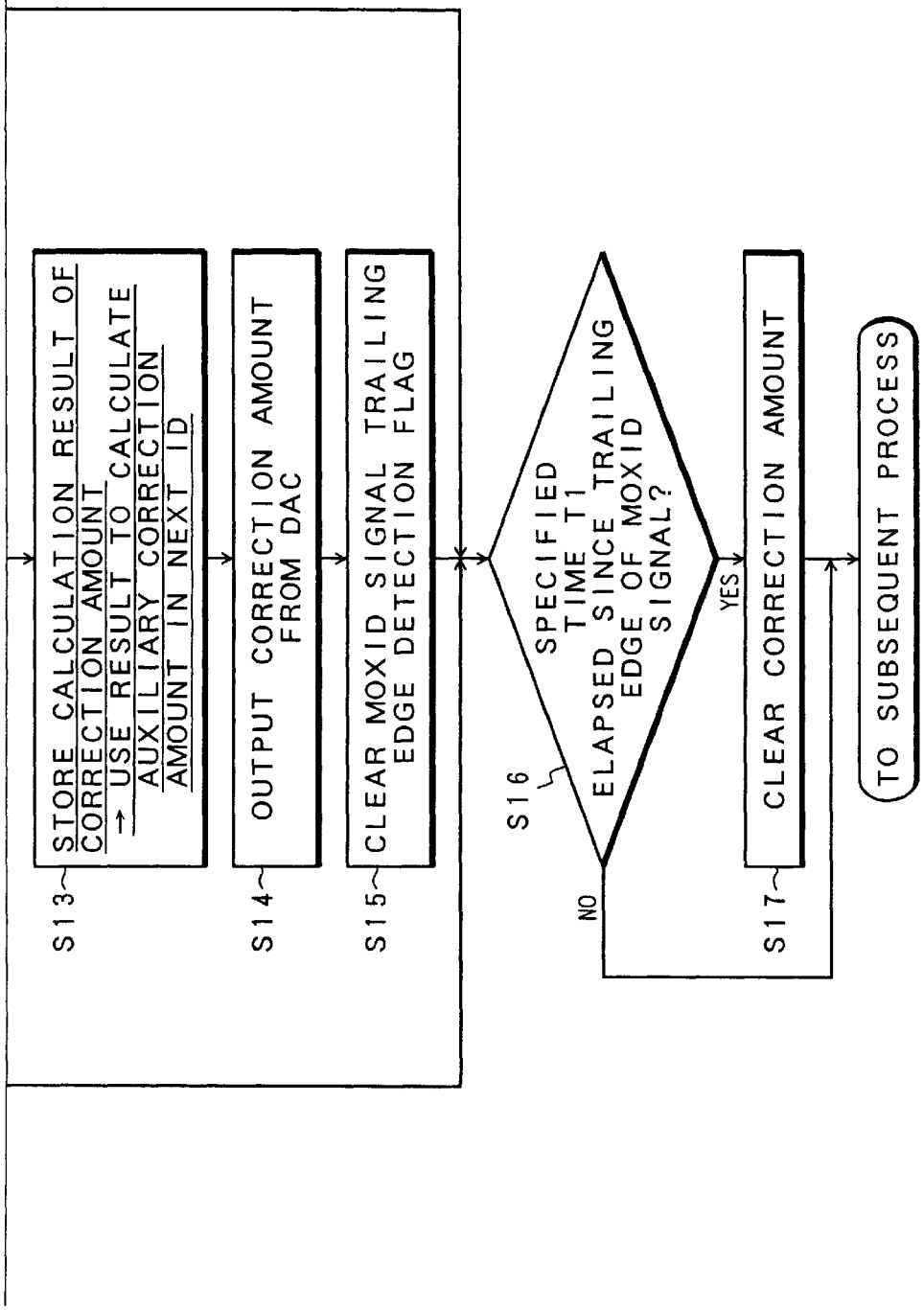

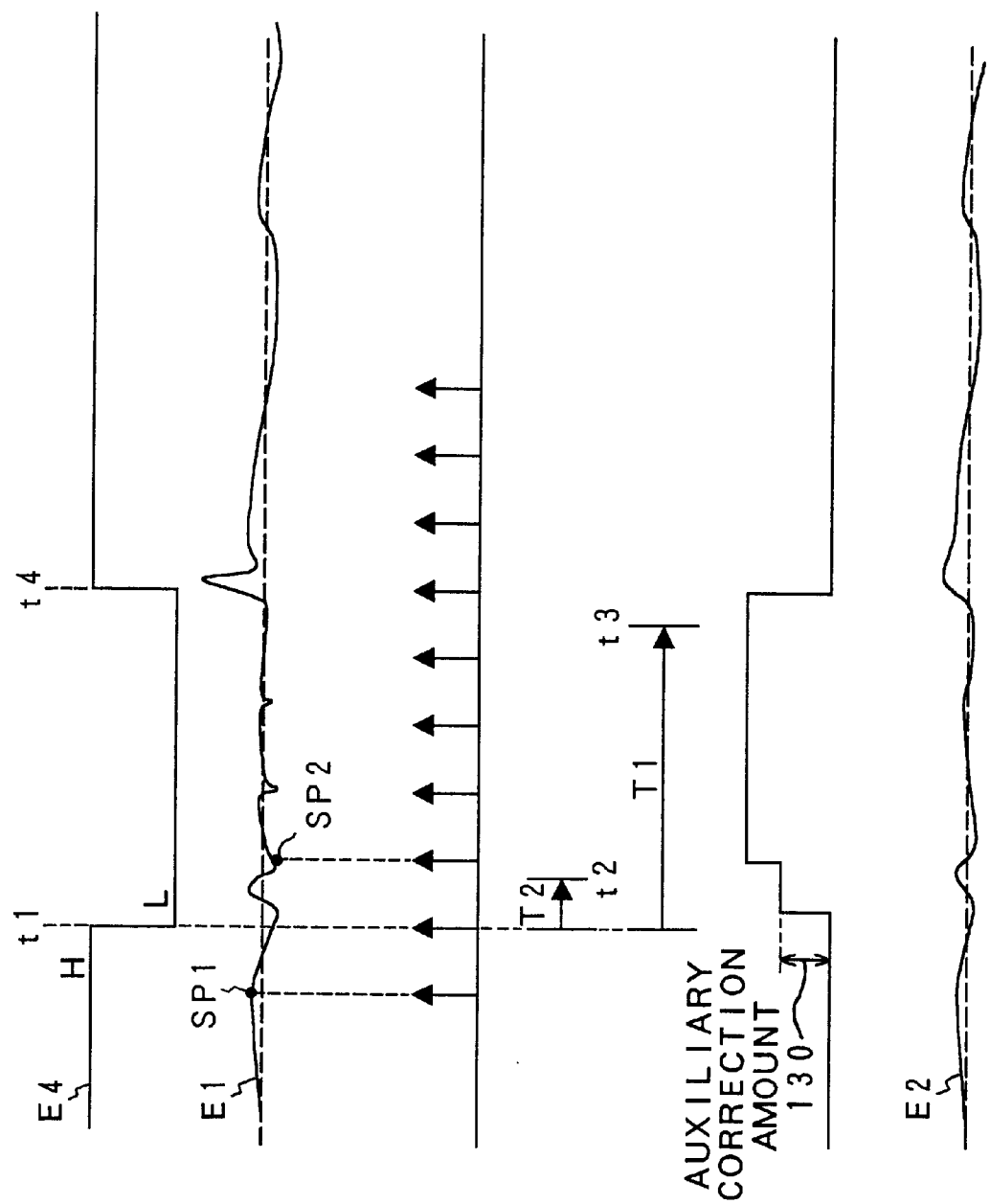

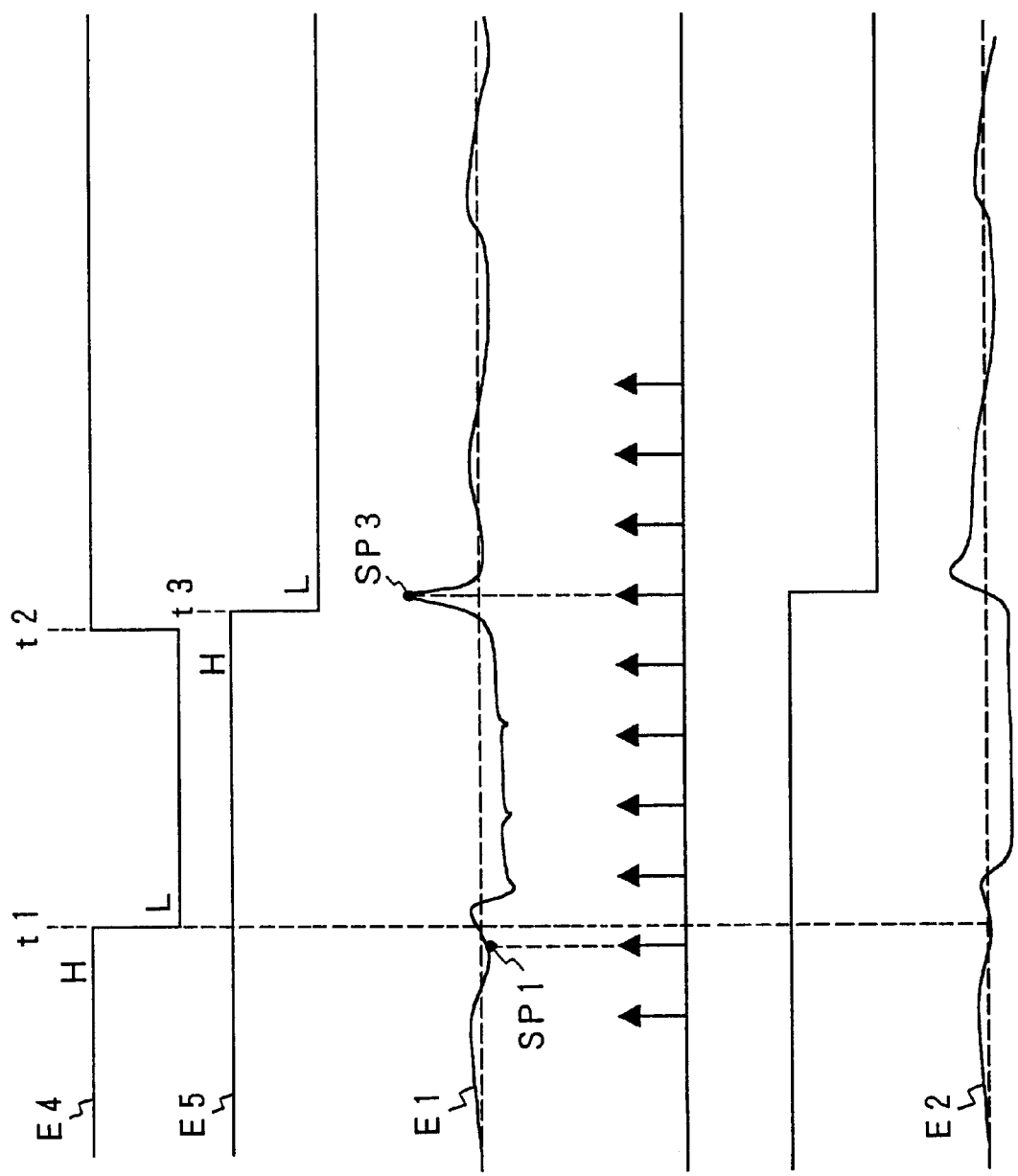

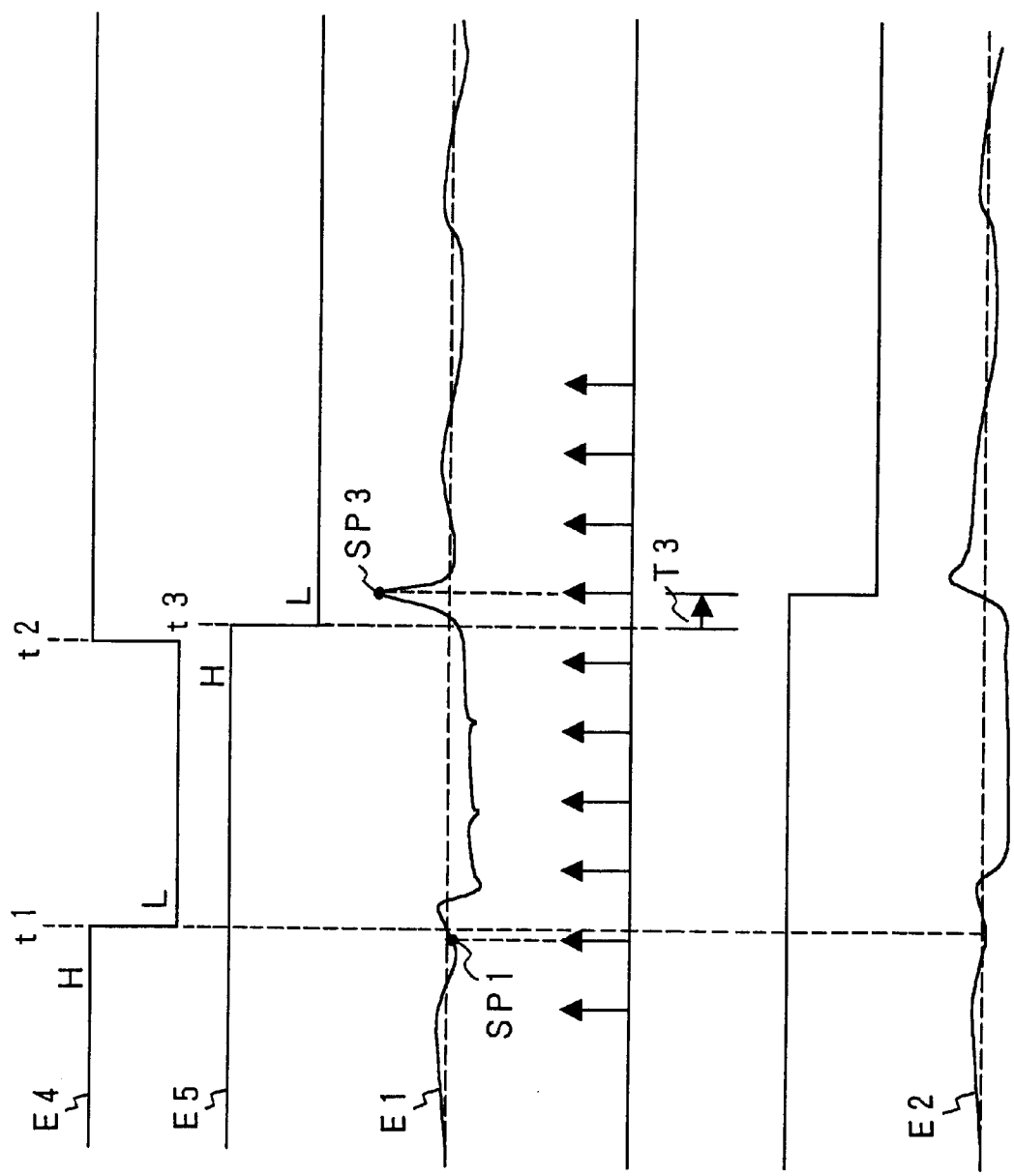

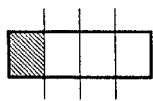
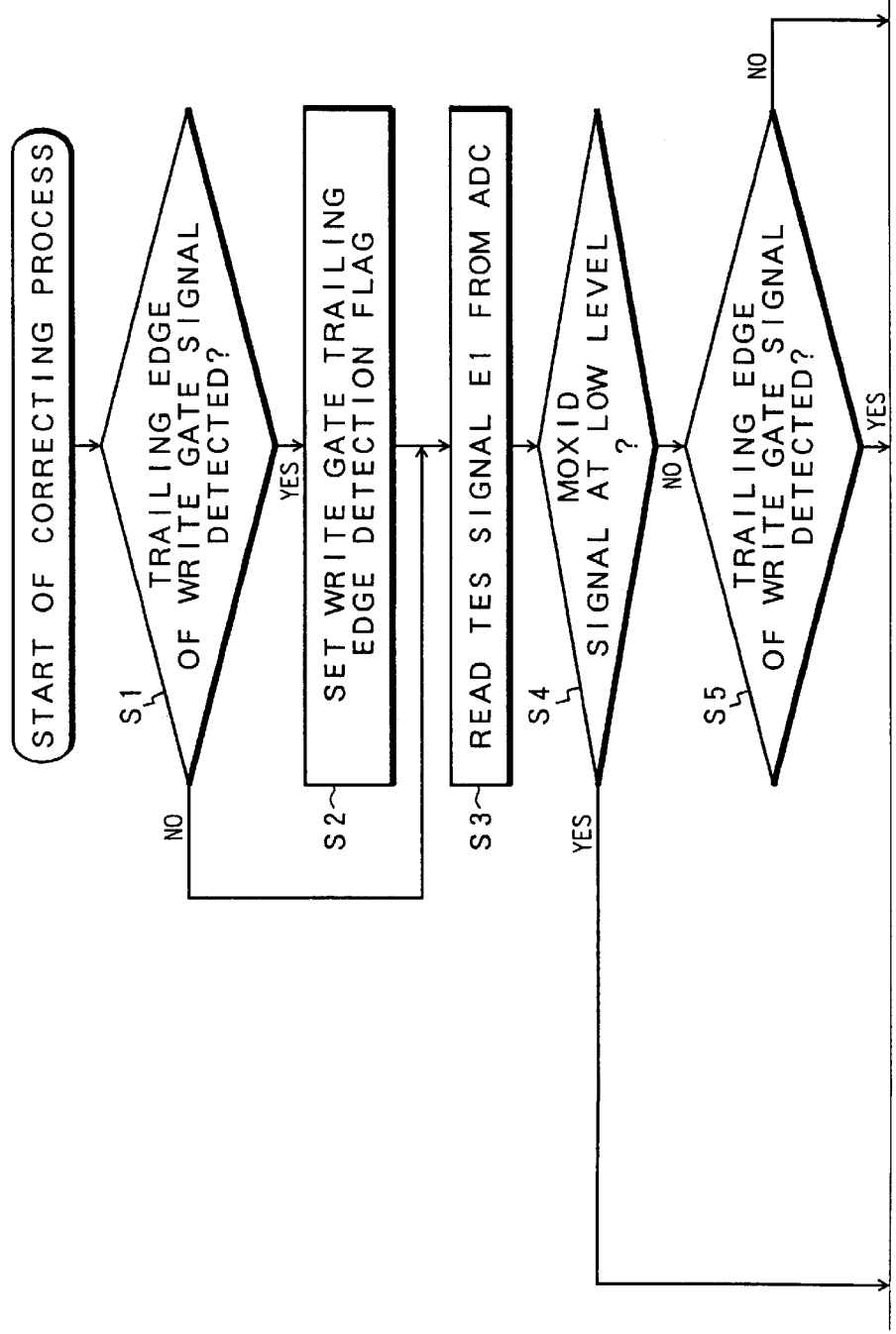
FIG. 19A

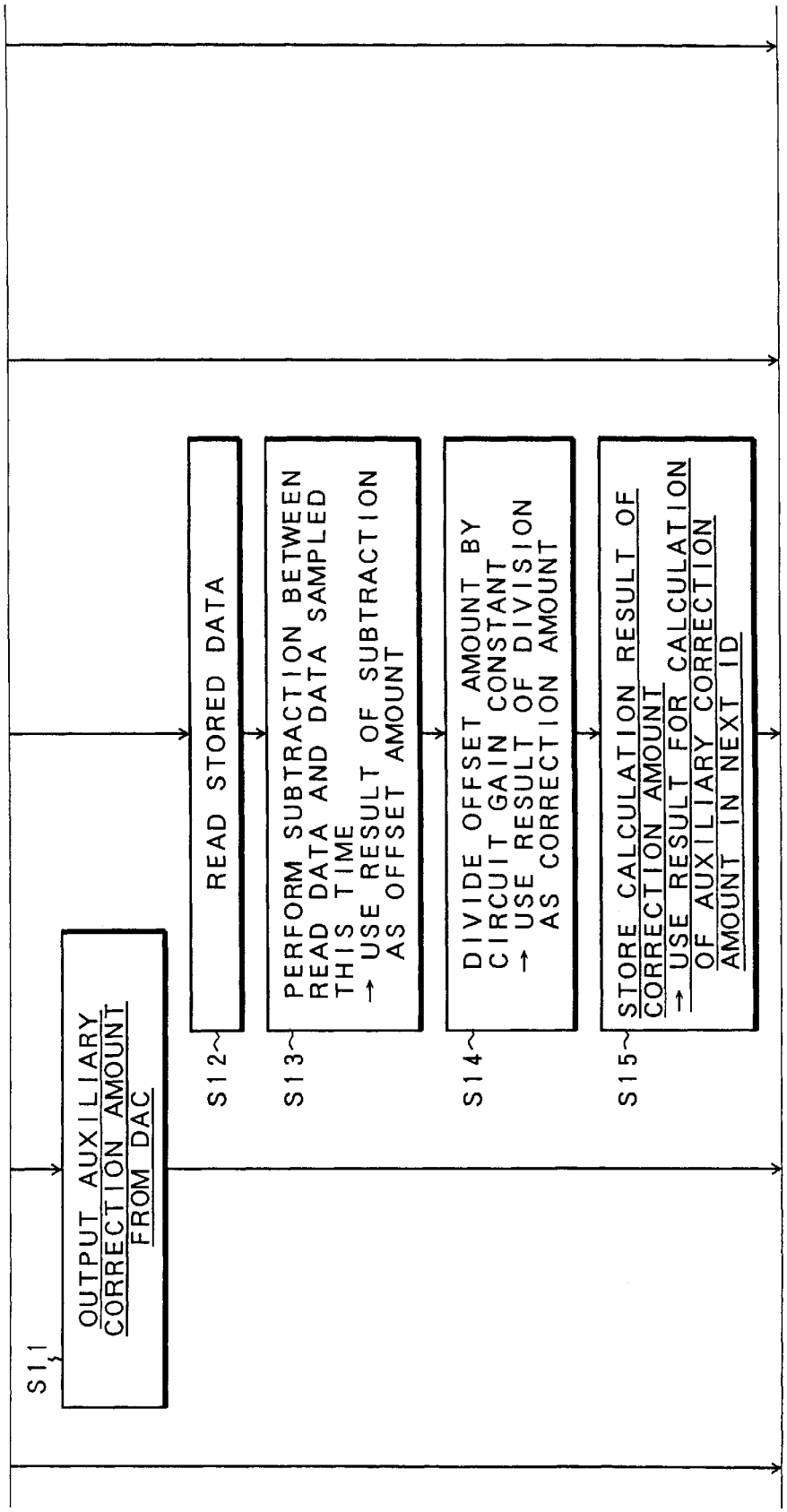

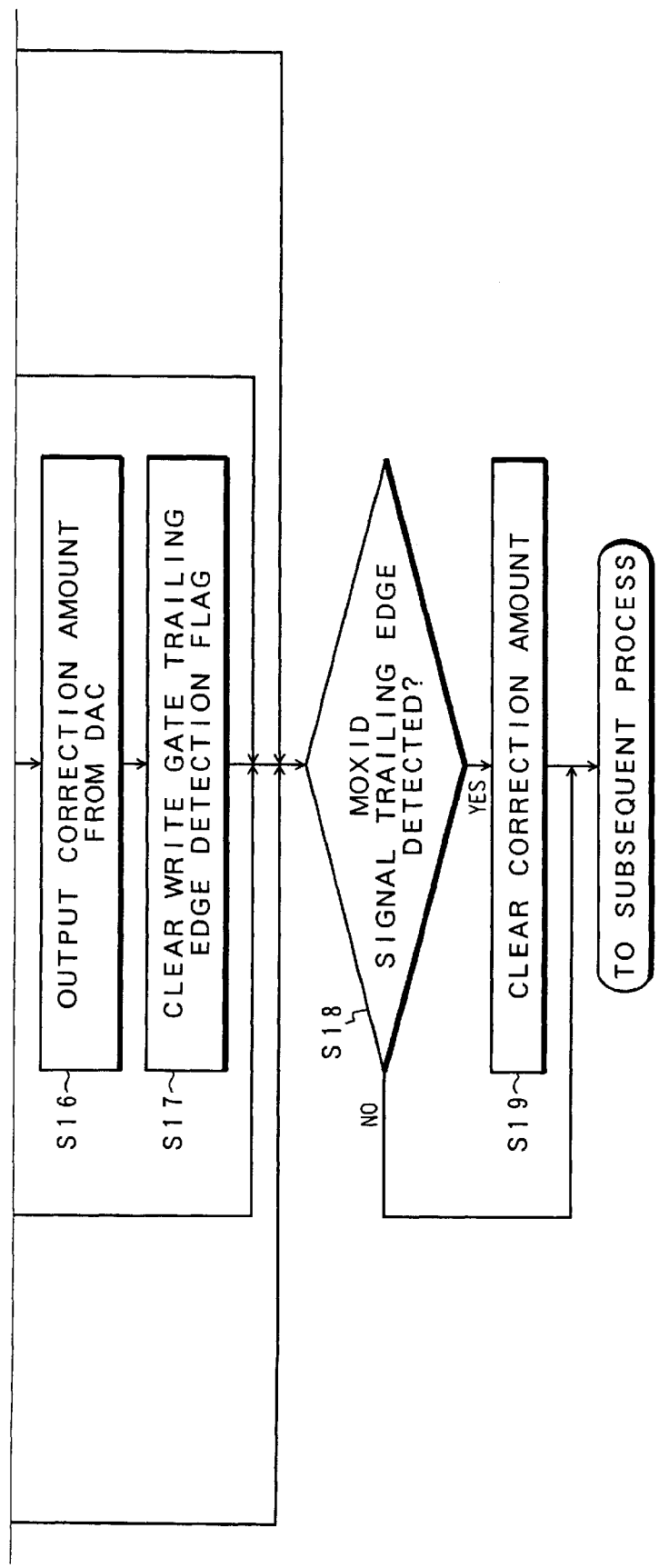
FIG. 19D

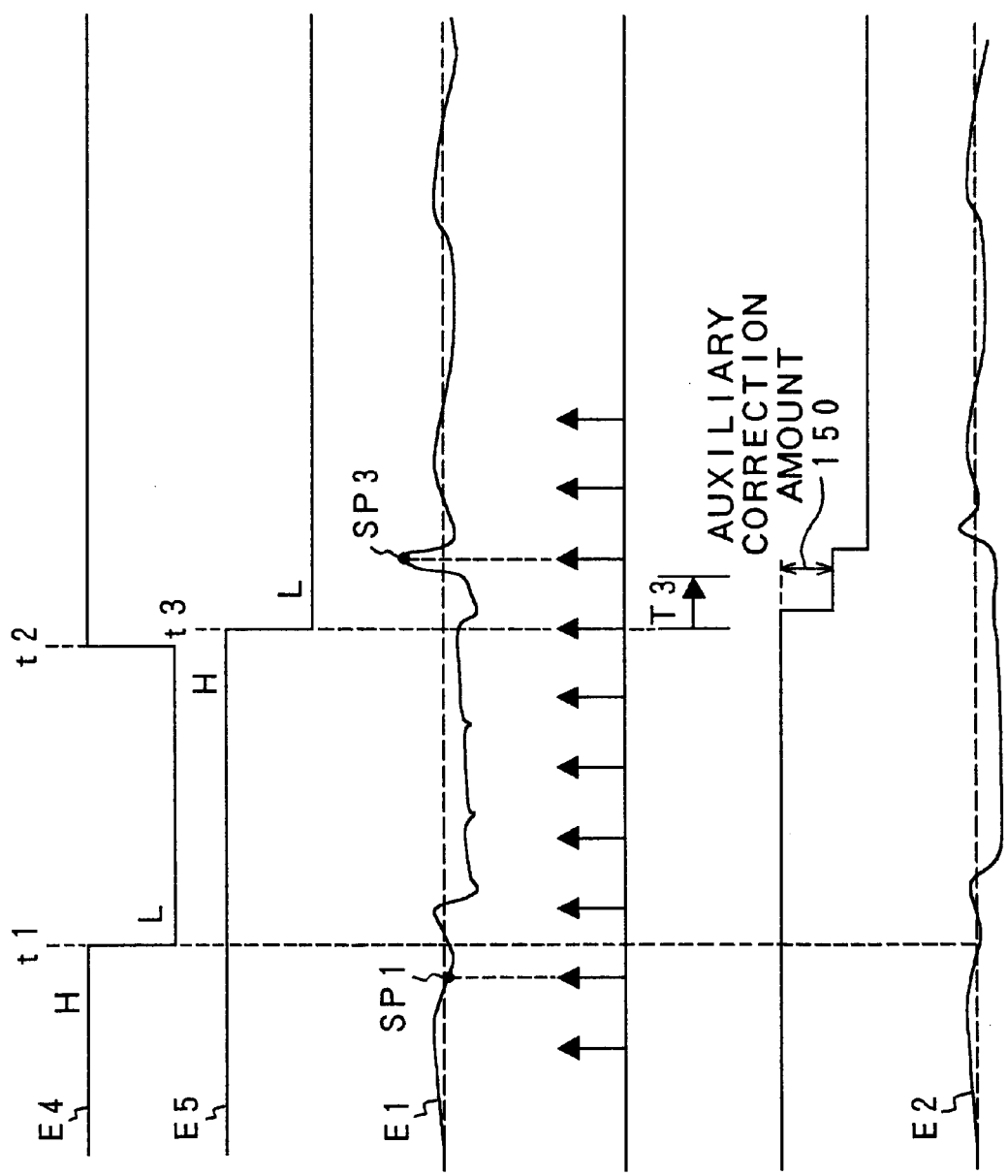

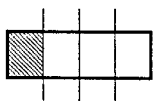
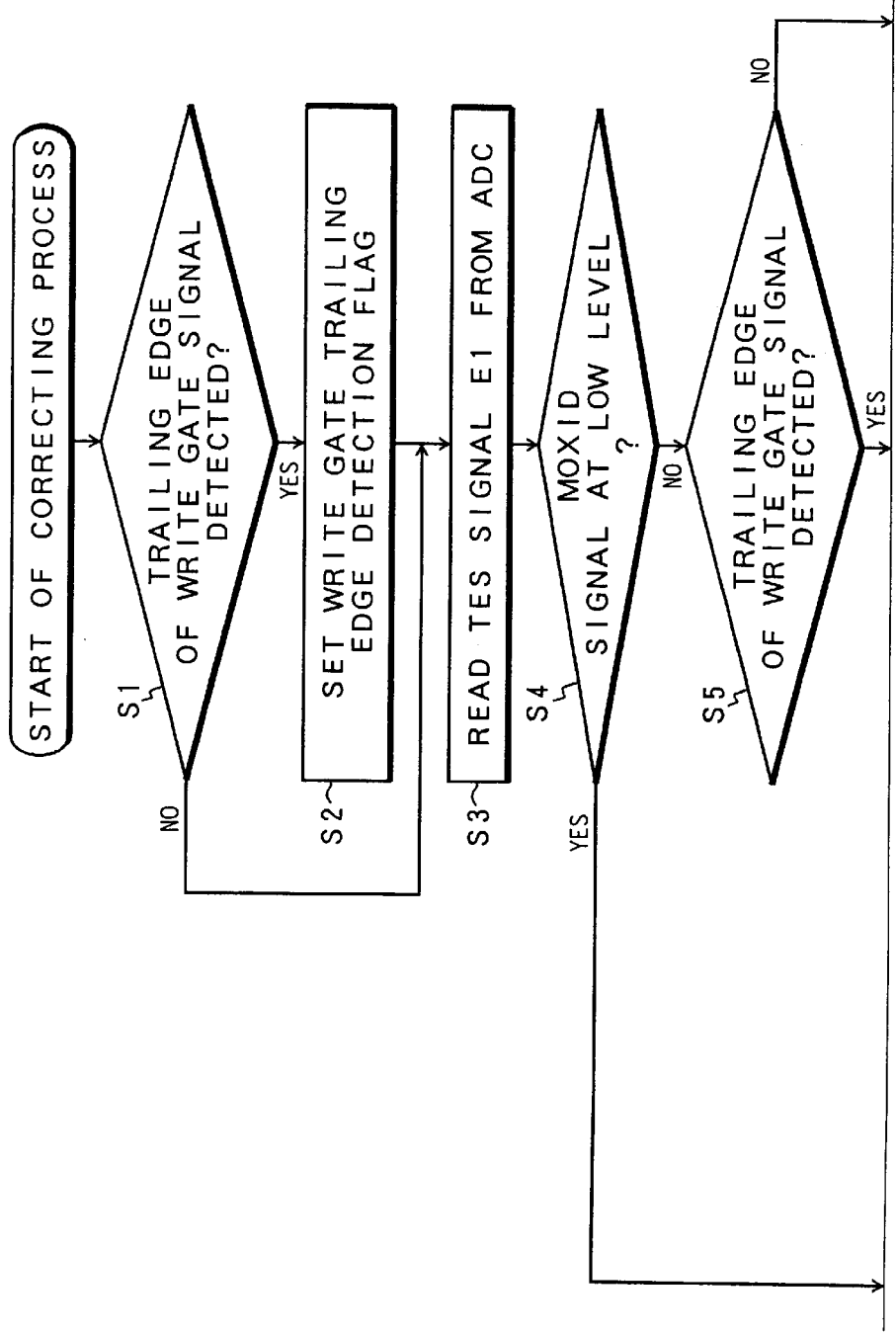
FIG. 21A

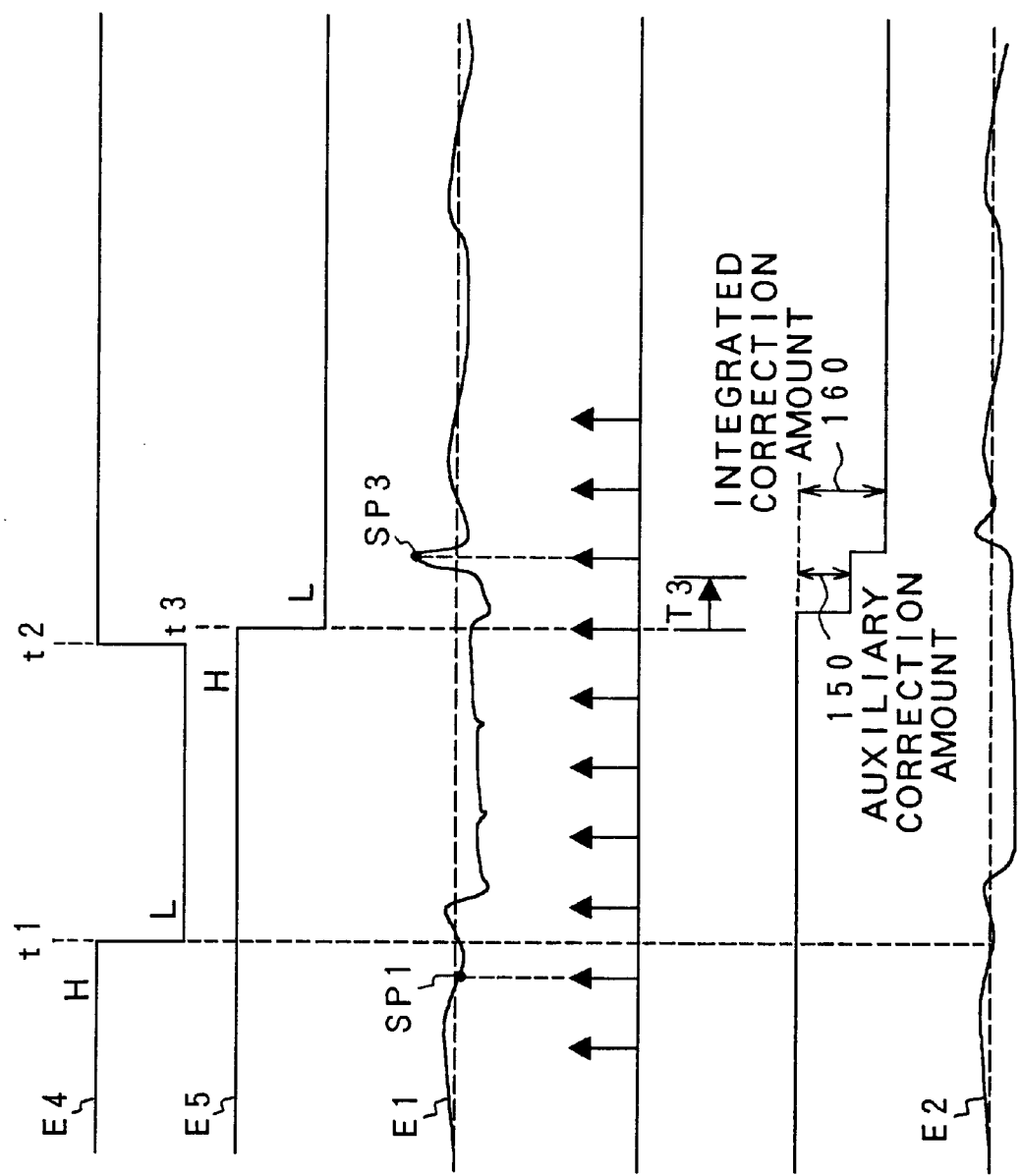

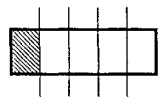
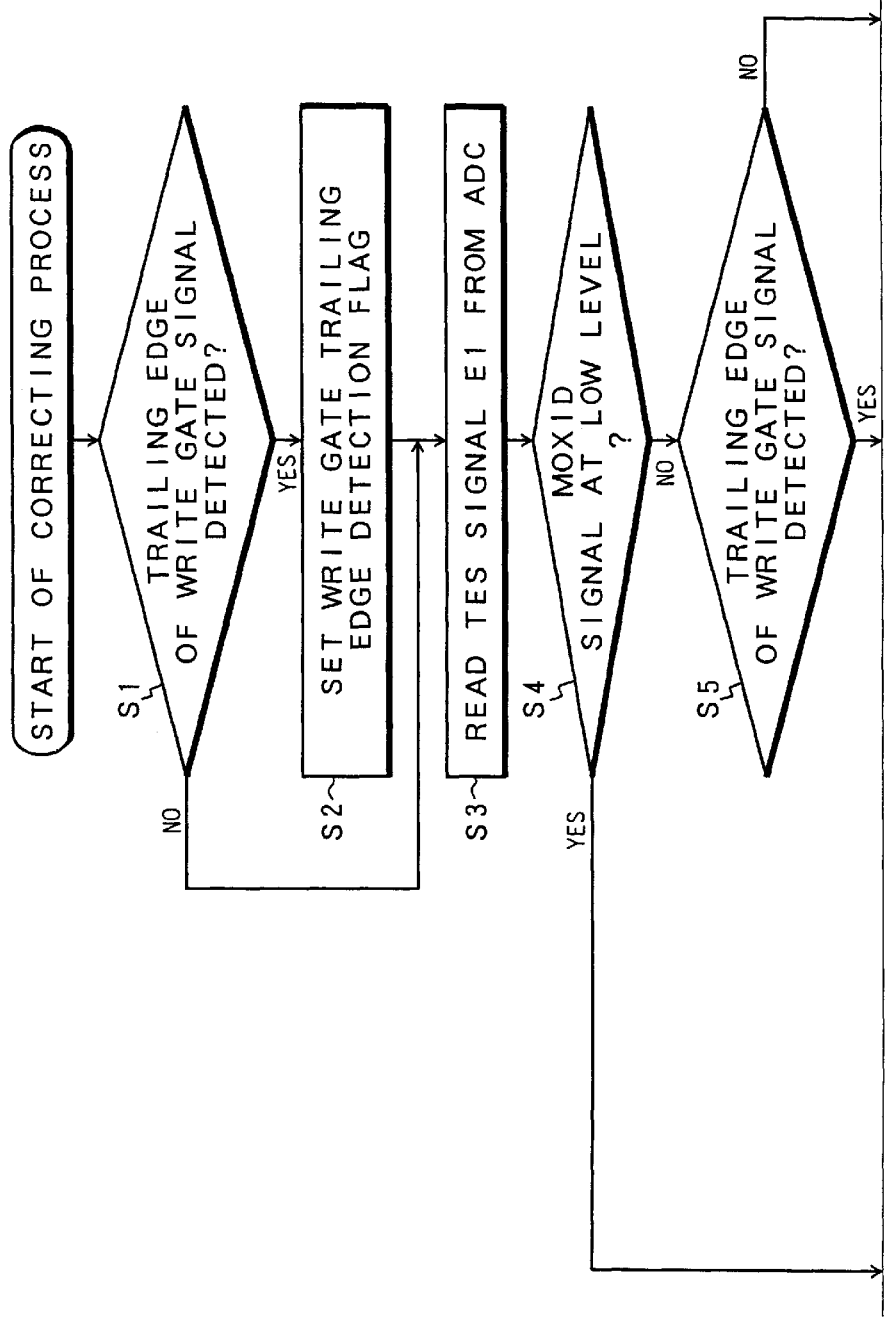
FIG. 23A

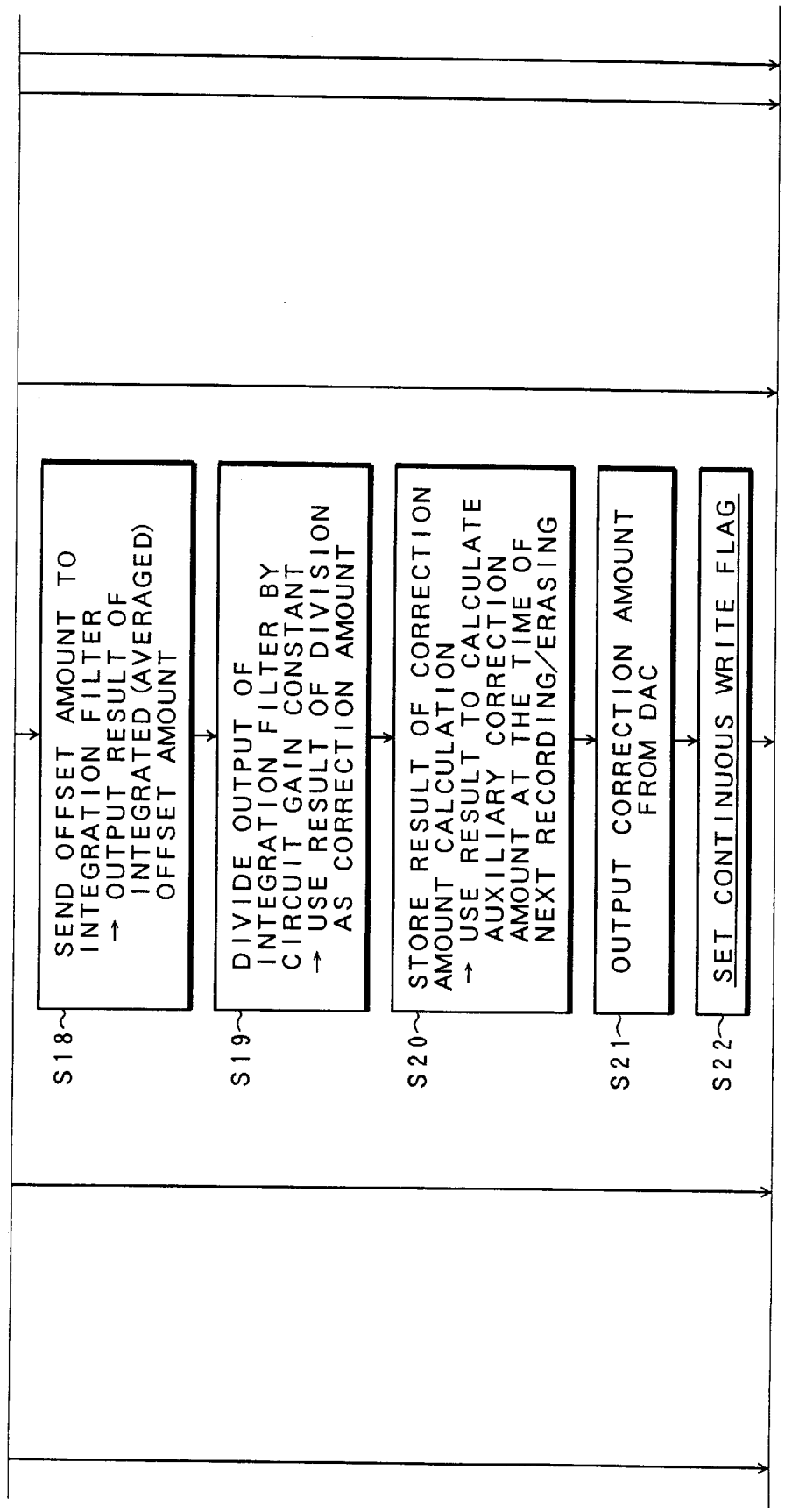

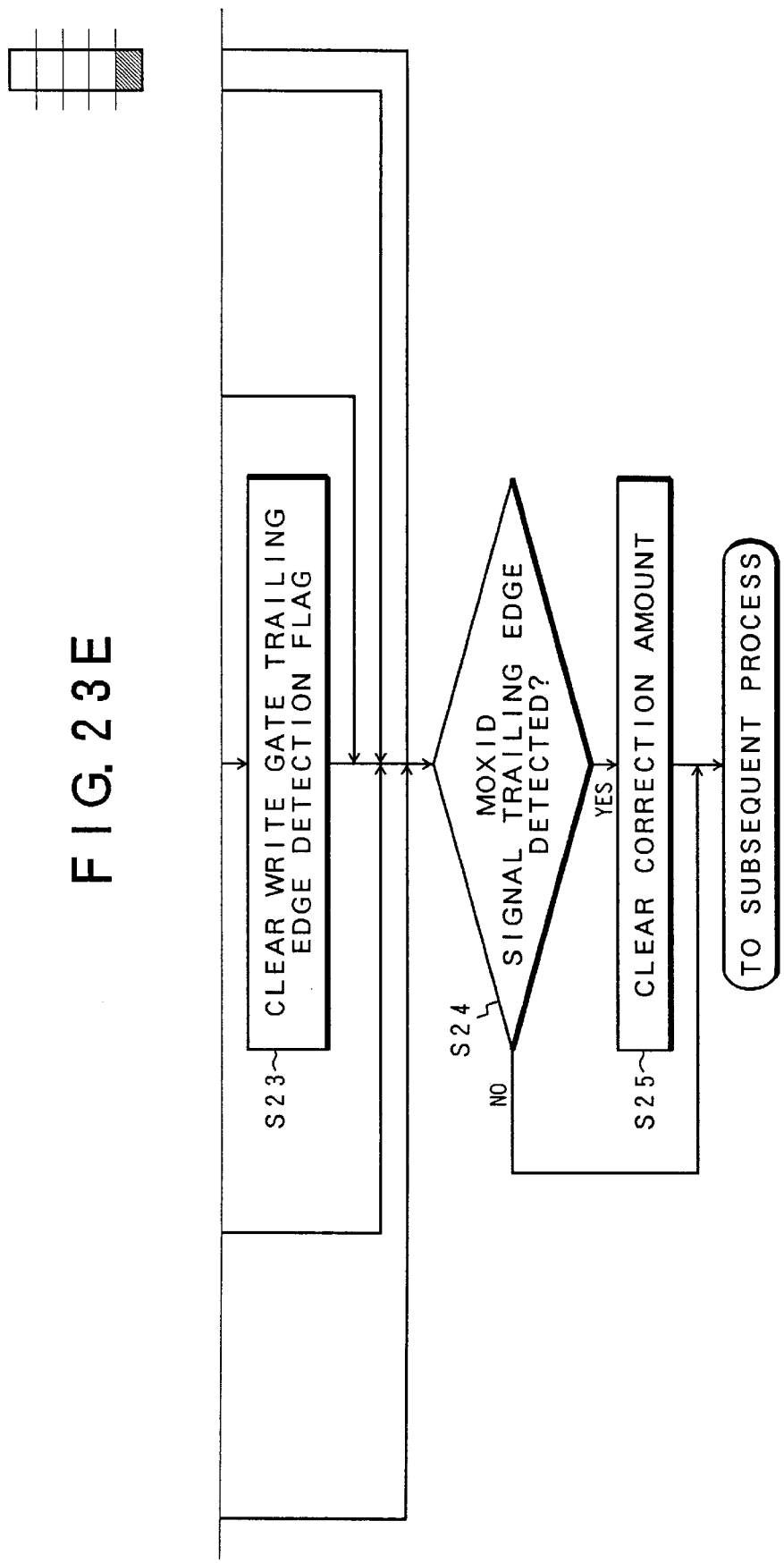

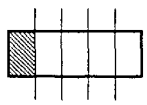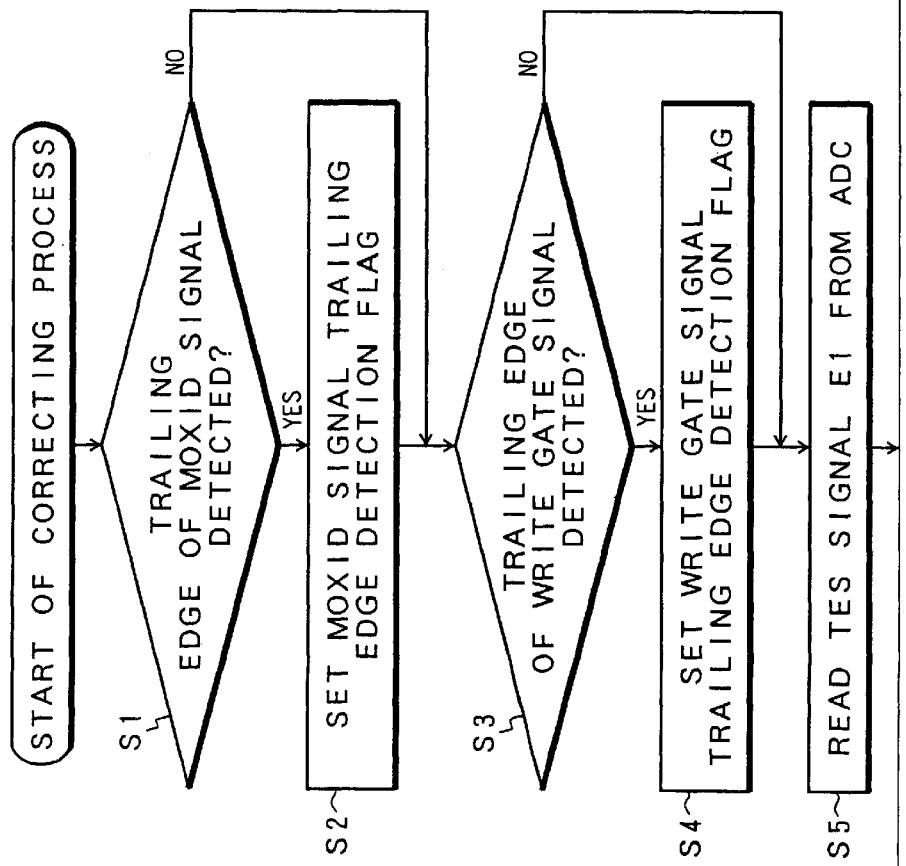
FIG. 25A

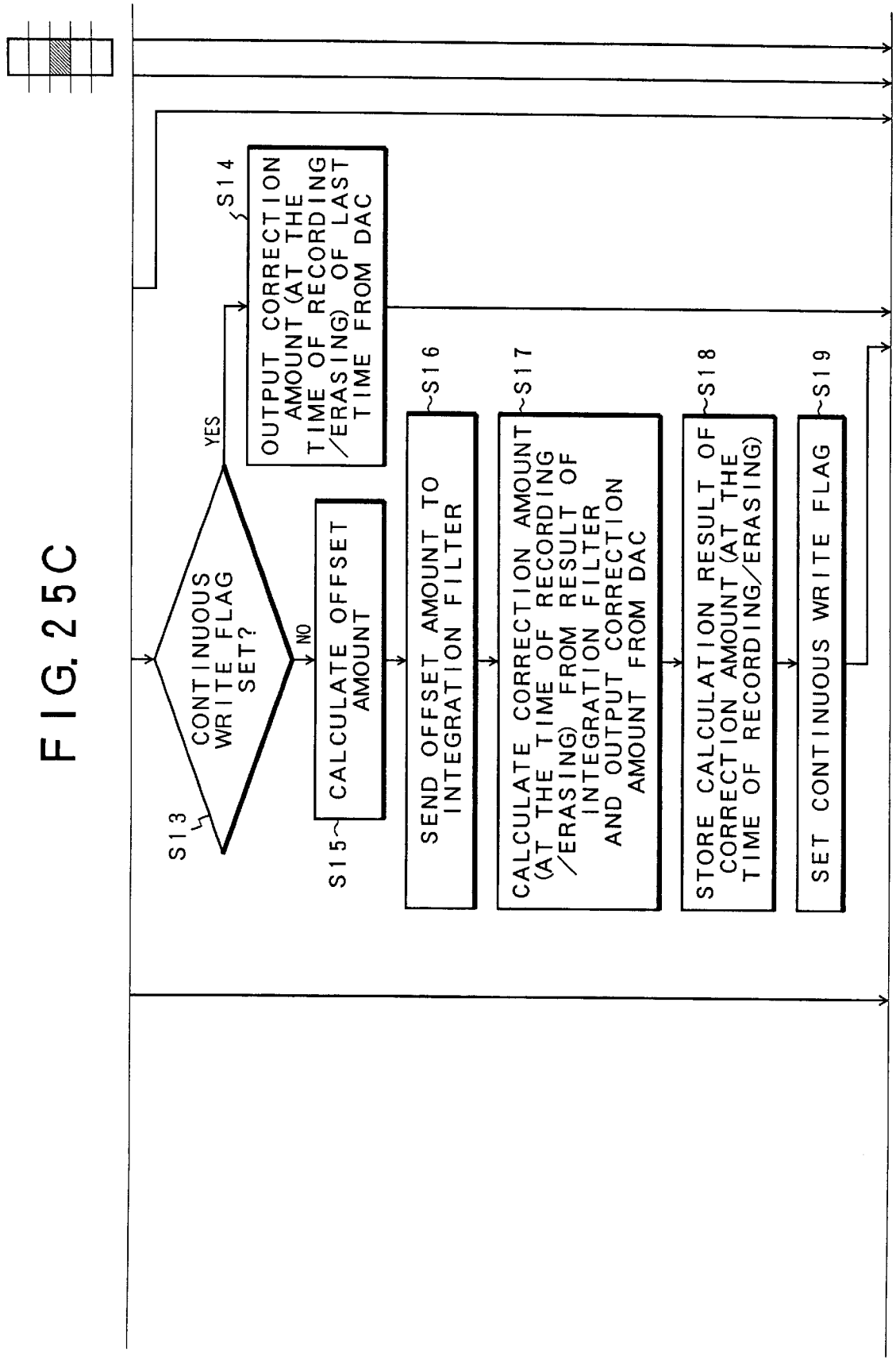

OPTICAL STORAGE APPARATUS

BACKGROUND OF THE INVENTION

1. Field of the Invention

The present invention relates to an optical storage apparatus for positioning an objective lens for irradiating a medium with a light beam from a light source to a target position on a medium by a tracking control and a focusing control and performing reproduction, recording, or erasure. More particularly, the invention relates to an optical storage apparatus for measuring and correcting an offset in a servo error signal caused by a change in an amount of reflection light from a medium.

2. Description of the Related Arts

Attention is paid to an optical disk as a removable storage medium as a core of multimedia which has rapidly been developing in recent years, and a magnetooptic disk (MO), a phase change optical disk (PD), and the like exist. An optical disk drive using such an optical disk as a storage medium has an objective lens for irradiating a medium with a light beam from a laser light source, which is mounted on an actuator movable in the radial direction of the medium, and performs a servo control of positioning the light beam to a target track position on the medium and positioning the objective lens so as to achieve focus on the medium by moving the objective lens in an optical axis direction. Such a servo control is performed by generating a servo error signal (a tracking error signal and a focusing error signal) indicative of a deviation from the target position of the objective lens on the basis of reflection light from the medium and positioning the objective lens to the target position on the basis of the servo error signal (tracking control and focusing control). Since the servo error signal used for the servo control is generated by receiving the reflection light from the medium by a photodetector, an amount of light received by the photodetector changes according to an amount of the reflection light from the medium and a light emitting power itself of the laser light source. Consequently, an offset component is generated in the servo error signal, and the servo stability deteriorates. The phenomenon of occurrence of an offset in the servo error signal due to a change in the amount of reflection light received by the photodetector will be described as follows. Although the phenomenon will be described with respect to a track system here, the phenomenon with respect to the focusing system is similar.

FIG. 1 shows a construction of a tracking error signal generating circuit. Specifically, the tracking error signal generating circuit includes: a photodetecting unit 300 having a pair of photodetectors 302 and 304 for receiving reflection light from a medium and performing a photoelectric conversion; current-to-voltage converters 306 and 308 for converting currents ia and ib from the photodetectors 302 and 304 to voltages Va and Vb, respectively; a subtractor 310 for obtaining a difference (Va−Vb) of the two voltage signals Va and Vb derived by the conversion by the current-to-voltage converters 306 and 308; an adder 312 for obtaining a sum (Va+Vb); and a divider 314 for performing division between outputs of the subtractor 310 and the adder 312 and outputting the result as a tracking error signal E10. Although there is a case that the output of the subtractor 310 is used as a tracking error signal, generally, in order to suppress variations in amplitude according to the reflection light amount, the output of the subtractor 310 is divided by the total amount of reflection light calculated by the adder 312, thereby making the amplitude of the tracking error signal constant. Consequently, an ideal output of the tracking error signal E10 is obtained as follows.

$$E10=(Va-Vb)/(Va+Vb)$$

When individual differences in the current-to-voltage converters 306 and 308 are considered and it is assumed that a small offset Vofs exists on the output Va side, the track error signal E10 is obtained as follows.

$$E10=\{(Va+Vofs)-Vb\}/\{(Va+Vofs)+Vb\}$$

The offset Vofs is a small offset voltage which is always constant irrespective of currents supplied to the current-to-voltage converters 306 and 308. When the outputs Va and Vb of the current-to-voltage converters 306 and 308 have sufficiently large values, an influence of the offset Vofs is small and an influence on the tracking error signal E10 is also a little. When the difference between each of the outputs Va and Vb and the offset Vofs is too small to ignore the relation between the outputs Va and Vb and the offset Vofs, a change amount of the offset with respect to the amplitude of the tracking error signal E10 becomes too large. Conventionally, to deal with the offset change in the tracking error signal due to variations in the amount of the reflection light from the medium, an offset correction is performed in such a manner that a tracking error signal is fetched by an A/D converter in a DSP (Digital Signal Processor), when a change in the reflection light amount is detected, an offset amount is measured, a correction amount is calculated from the offset amount and, after that, the correction amount is added to the tracking error signal in the DSP (JP11328696a and U.S. patent application Ser. No. 09/196,098).

FIG. 2 shows a conventional tracking servo control unit. The tracking error signal E10 generated in FIG. 1 is supplied to an adding circuit 200 for correcting an offset, and an arbitrary correction amount from a DSP 205 is added to the tracking error signal E10 to thereby correct the offset. Unnecessary frequency band components in an offset-corrected tracking error signal E11 are eliminated by a notching circuit 202 and a low pass filter 204 and, after that, the resultant signal is fetched as a tracking error signal E12 by an A/D converter 206 in the DSP 205. The DSP 205 supplies the tracking error signal fetched by the A/D converter 206 to a correction amount detecting unit 224. An offset amount caused by a change in the amount of the reflection light in a sector ID area at the time of reproduction or in a data area at the time of recording or reproduction is measured, a correction amount to cancel out the offset amount is calculated and added to the output of the A/D converter 206 at an addition point 222, and an offset-corrected tracking error signal E13 is outputted. The correction amount detecting unit 224 uses an MOXID signal E14 and a write gate signal E15 supplied as signals for detecting a change in the reflection light to an edge port 232. As shown in FIG. 3A, the MOXID signal is a logical signal which becomes at the H level in the data area in a medium sector and becomes at the L level in an ID area between sectors. Since the amount of reflection light decreases in the ID area, by using the MOXID signal, an offset is measured in the ID area and corrected. FIG. 3B shows the tracking error signal E10 inputted to the adding circuit 200, and an offset occurs in the ID area where the MOXID signal E14 becomes at the L level. FIG. 3C shows sampling timings of the A/D converter 206, the tracking error signal E12 in FIG. 3D which has passed the notching filter 202 and the low pass filter 204 is sampled at timings of arrows to be converted to digital data, and the digital data is fetched. The correction amount detecting unit 224 measures an offset amount from a difference between sample values before and after the detection start timing in the ID area, calculates a correction amount having an amplitude of FIG. 3E from the measured offset amount, outputs the correction amount for a predetermined time, and adds the correction amount at the addition point 222, thereby obtaining the offset-corrected tracking error signal E13 as shown in FIG. 3F. The track error signal E13 in which the offset caused by a change in the reflection light amount has been corrected passes through an input gain multiplying unit 208, a PID computing unit 210, an output gain multiplying unit 212, and a D/A converter 214 and is outputted from the DSP 205. By the output, a driving current is passed from a power amplifier 215 as a driver to a tracking coil 216 to thereby position an objective lens 220 mounted on an actuator 218 to the track center of a target track. The DSP 205 is also provided with a D/A converter 230 of an offset eliminating unit 226. A correction amount to cancel out an offset brought about by a cause other than the change in the reflection light amount is fixedly added to the adding circuit 200, thereby correcting the offset. At the time of recording or erasing, by using the MOXID signal E14 and the write gate signal E15, an offset associated with an increase in the reflection light in the data area subsequent to the ID area is measured and corrected.

In such a conventional tracking servo control unit, however, since the tracking error signal E12 read by the DSP 205 via the A/D converter 206 is derived by passing the tracking error signal E10 generated by the tracking error signal generating circuit of FIG. 1 to the filters such as the notching filter 202 and the low pass filter 204, as obvious from a comparison between the signal waveform of FIG. 3B before passing through the filters and that of FIG. 3D after passing through the filters, a delay occurs also in an offset in the tracking error signal in the ID area and the waveform becomes dull. Conventionally, the tracking error signal E12 having such a delay and a dull waveform is fetched by the A/D converter 206 into the DSP 205 and is subjected to the offset correction. It is consequently difficult to, for example, determine the timing of measuring the offset amount from the MOXID signal E14. Particularly, in the case of the recording process, an offset (decrease in the reflection light amount) is caused also by the ID area just before a recording process, and an offset (increase in the reflection light amount) is caused also by the recording operation performed in the data area. There is a limitation in the offset correction, so that a problem that the offset cannot be sufficiently cancelled out occurs. In recent years, the rotational speed of an optical disk tends to be increasing, so that reliability of the calculation of the correction amount based on the measurement of the offset amount and promptness of the correction effect of cancelling out the offset are required. From this viewpoint as well, the correcting process using the tracking error signal which has passed the filters is limited.

SUMMARY OF THE INVENTION

According to the invention, there is provided an optical storage apparatus in which a servo control at the time of reproduction, recording, and erasing is stabilized and stability of a whole drive is improved by accurately detecting and correcting an offset amount in a servo error signal caused in association with a change in an amount of reflection light.

The invention is directed to an optical storage apparatus having: an actuator capable of positioning an objective lens for irradiating a medium with a light beam from a light source to a target position on the medium; a servo error signal generating circuit which generate a servo error signal indicative of a deviation from a target position of the objective lens on the basis of reflection light from the medium; an offset correcting circuit (adding circuit) for correcting an offset by adding an arbitrary correction amount to a servo error signal outputted from the tracking error signal generating circuit; a filter which eliminate an unnecessary frequency component from the servo error signal outputted from the offset correcting circuit; and a servo control unit which position the objective lens to a target position on the medium on the basis of the servo error signal outputted from the filter.

(Fundamental Construction)

According to the invention, the optical storage apparatus is characterized by including: an offset measuring unit which receive the servo error signal E1 which does not pass through the filter and measuring an offset amount in the servo error signal, caused by a change in an amount of reflection light; and a correction amount calculating unit which calculate a correction signal to cancel out the offset amount and outputting the correction signal to perform correction to the offset correcting circuit for an offset generating period. According to the invention as described above, the tracking error signal before being passed to the filter is received, an offset is measured, and the correction amount is calculated from the measured offset and used for correction. Consequently, a change in the offset due to a change in the amount of reflection light directly appears in the tracking error signal before being passed to the filter. As a result, the offset amount can be detected with high precision, and time for applying the correction amount is relatively easily determined. In addition, the offset-corrected servo error signal is passed through the filters and fetched by a servo control unit by a DSP. Consequently, there is also an advantage that, even if the timing of the offset correction is deviated more or less and an offset remains, the offset is filtered by the filter after that, so that an influence of a slight deviation in the correction timing can be eliminated. As a result, tracking in the ID area at the time of reproduction and tracking in the data area at the time of recording or erasing becomes stable, and the stability of the entire drive is improved. Since all of the changes from the conventional technique can be dealt in the DSP, the invention can be realized without increasing the cost by adding a new circuit part or the like.

The offset measuring unit receives a light amount change detection signal indicative of a change in an amount of reflection light from the medium and measures an offset amount from a difference between a servo error signal just before a detection start timing of the light amount change detection signal and a servo error signal just after the detection start timing. In this case, the correction amount calculating unit outputs a correction amount calculated on the basis of the offset amount to the offset correcting circuit for a period of time in which a light amount change is detected from the light amount change detection signal. The offset measuring unit may receive a light amount change detection signal indicative of a change in an amount of reflection light from the medium and measures an offset amount from a difference between a servo error signal just before a detection start timing of the light amount change detection signal and a servo error signal at a time point after elapse of predetermined time T1 since the detection start timing. Consequently, the servo error signal in which an offset appears can be measured with reliability in a state where the tracking is in the ID area, so that accuracy and reliability of measurement of an offset are increased. The correction amount calculating unit may output a correction amount calculated on the basis of the offset amount to the offset correcting circuit for predetermined time T1 since the detection start timing of the light amount change detection signal. The correction amount calculating unit outputs an auxiliary correction amount obtained by multiplying a correction amount of last time by a constant smaller than 1 to the offset correcting circuit for a period of time from the detection start timing of the light amount change detection signal until a correction amount based on the offset detection is calculated and outputted. Consequently, even when there is a time delay between the appearance of the offset in the servo error signal and the start of the correction, by correcting the offset by using the auxiliary correction amount obtained by multiplying the correction amount of last time by a coefficient ranging, for example, 0.5 to 0.75, the effect of cancelling out the offset can be further increased. The offset measuring unit calculates an offset amount on the basis of a plurality of past detection results. Therefore, an adverse influence on the offset correction in the case where a change which is not purely due to the reflection light amount, such as a medium defect, appears in the servo error signal can be reduced.

(Offset Correction in ID Area)

The invention is constructed as follows to correct an offset in the ID area necessary at the time of reproduction. First, the offset measuring unit receives a first logical signal (MOXID signal) indicating whether a light beam following a track in a medium is in a data area to which data can be recorded or in an ID area recorded between sectors, and measures an offset amount in the servo error signal on the basis of a detection timing of the ID area in the first logical signal. The correction amount calculating unit outputs a correction amount calculated based on the offset amount to the offset correcting circuit so as to perform correction for a period of detection of the ID area by the first logical signal. Specifically, the offset measuring unit measures an offset amount from a difference between a servo error signal just before a start timing of detecting the ID area by the first logical signal and a servo error signal just after the start timing. The correction amount calculating unit outputs a correction amount calculated on the basis of the offset amount to the offset correcting circuit for predetermined time T1 since the start timing of detection of the ID area by the first logical signal. The offset measuring unit measures an offset amount from a difference between a servo error signal just before the start timing of the ID area detection by the first logical signal and a servo error signal at a time point after elapse of predetermined time T2 since the start timing. At this time, the correction amount detecting unit outputs a correction amount calculated on the basis of the offset amount to the offset correcting circuit for predetermined time T1 since the start timing of detection of the ID area by the first logical signal. The correction amount calculating unit outputs an auxiliary correction amount obtained by multiplying a correction amount of last time by a constant to the offset correcting circuit for a period of time since the start timing of detection of the ID area by the first logical signal until the correction amount based on the offset detection is calculated and outputted. Further, the offset measuring unit calculates an offset amount on the basis of a plurality of past detection results.

(Offset Correction during Recording or Erasing)

The offset measuring unit receives a first logical signal (MOXID signal) indicating whether a light beam following a track in a medium is in a data area to which data can be recorded or an ID area recorded between sectors and a second logical signal (write gate signal) indicating whether the apparatus is recording data to the medium or erasing data in the medium, and measures an offset amount in the servo error signal being recorded or erased on the basis of a first logical signal and a second logical signal. In this case, the correction amount calculating unit outputs a correction amount calculated on the basis of the offset amount measured during the recording or erasing to perform correction to the offset correcting circuit. As described above, offsets caused by light amount changes which are different in the ID area and the data area subsequent to the ID area occur during recording or erasing. By using two kinds of logical signals corresponding to the different light amount changes, the offset can be accurately measured and corrected. Specifically, the offset measuring unit measures an offset amount from a difference between a servo error signal just before a start timing of detection of the ID area by the first logical signal and a servo error signal just after start of recording or erasing by the second logical signal. The correction amount calculating unit outputs a correction amount calculated on the basis of the offset amount during the recording or erasing by the second logical signal to the offset correcting circuit. The offset measuring unit detects an offset amount from a difference between a servo error signal just before the start timing of detection of the ID area by the first logical signal and a servo error signal after elapse of predetermined time T3 since the start of recording or erasing by the second logical signal. Consequently, the servo error signal can be measured at the timing when the offset appears due to a change in the reflection light amount by the start of recording or erasing. In this case, the correction amount calculating unit outputs a correction amount calculated on the basis of the offset amount during the recording or erasing by the second logical signal to the offset correcting circuit. The correction amount calculating unit outputs an auxiliary correction amount obtained by multiplying a correction amount of last time by a constant to the offset correcting circuit for a period of time since the start timing of recording or erasing by the second logical signal until the correction amount based on the offset detection is calculated and outputted. The correction amount calculating unit cancels out the offset also in the period until the correction amount is outputted. The offset measuring unit calculates an offset amount on the basis of a plurality of past detection results, thereby suppressing an adverse influence due to a medium defect or the like. In the case of continuously recording or erasing data to/from a plurality of sectors, the correction amount calculating unit continuously uses a correction amount calculated for the first sector for second and subsequent sectors. Further, the servo error signal generating circuit is a tracking error signal generating circuit which generate a tracking error signal indicative of a deviation from a target position in a medium track center of the objective lens on the basis of reflection light from the medium. The servo error signal generating circuit also includes a focusing error signal generating circuit which generate a focusing error signal indicative of a deviation from a focus position of the objective lens on the medium on the basis of reflection light from the medium.

The above and other objects, features, and advantages of the present invention will become more apparent from the following detailed description with reference to the drawings.

BRIEF DESCRIPTION OF THE DRAWINGS

FIGS. 3A to 3F are time charts of waveforms of respective parts in an offset correcting process in FIG. 2;

FIGS. 4A and 4B are block diagrams of an optical disk drive to which the present invention is applied;

FIGS. 5A and 5B are block diagrams of a tracking servo control unit which perform an offset correcting process of the present invention;

FIGS. 7A to 7F are time charts of signals of respective parts in the first embodiment of FIG. 6;

FIGS. 9A to 9G are time charts of signals of respective parts in the second embodiment of FIG. 6;

FIGS. 10A to 10C are a flowchart of a third embodiment of correcting an offset in an ID area according to the present invention;

FIGS. 11A to 11G are time charts of signals of respective parts in the third embodiment of FIGS. 10A to 10C;

FIGS. 16A to 16F are time charts of signals of respective parts in the fifth embodiment of FIG. 15;

FIGS. 18A to 18G are time charts of signals of respective parts in the sixth embodiment of FIGS. 17A to 17C;

FIGS. 19A to 19D are flowcharts of a seventh embodiment of correcting an offset at the time of recording/erasing according to the invention;

FIGS. 20A to 20G are time charts of signals of respective parts in the seventh embodiment of FIGS. 19A to 19D;

FIGS. 21A to 21D are flowcharts of an eighth embodiment of correcting an offset at the time of recording/erasing according to the invention;

FIGS. 22A to 22G are time charts of signals of respective parts in the eighth embodiment of FIGS. 21A to 21D;

FIGS. 23A to 23E are flowcharts of a ninth embodiment of correcting an offset at the time of recording/erasing according to the invention;

FIGS. 25A to 25E are flowcharts of a tenth embodiment of correcting an offset in an ID area and at the time of recording/erasing according to the present invention.

DETAILED DESCRIPTION OF THE PREFERRED EMBODIMENTS

Figure 1:
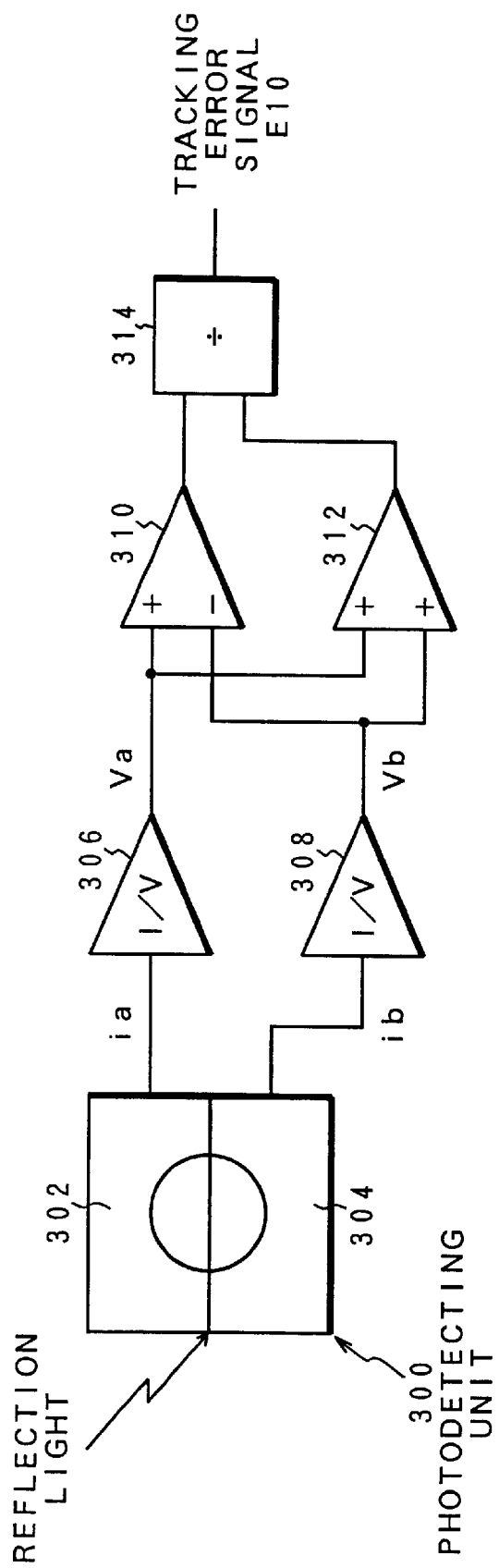
FIG. 1 is a circuit block diagram of a conventional tracking error signal generating circuit.
Figure 2:
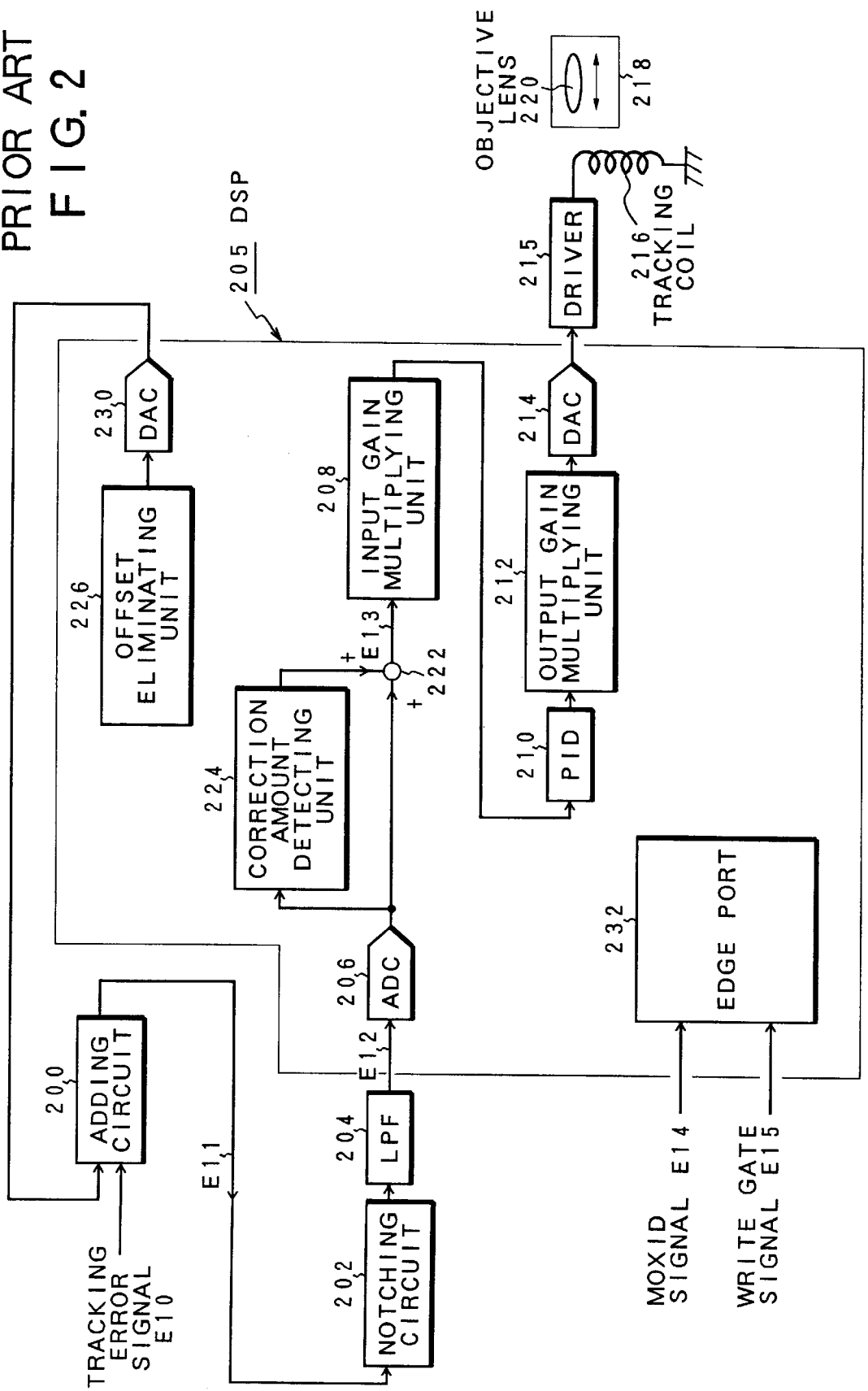
FIG. 2 is a block diagram of a conventional tracking servo control unit.

FIGS. 4A and 4B are block diagrams of an optical disk drive as an optical storage apparatus to which an offset correcting process of the invention is applied. As an example of a storage medium, a magnetooptic disk (MO) cartridge is used. The optical disk drive is constructed by a controller 10 and an enclosure 12. The controller 10 has an MPU 14 to perform an overall control, an interface controller 16 to transmit/receive data to/from a host, an optical disk controller (ODC) 18 having a formatter and an ECC function necessary to read/write data from/to a medium, and a buffer memory 20. For the optical disk controller 18, an encoder 22, a laser diode control circuit 24, and a laser diode unit 30 are provided as a write system. As a read system for the optical disk controller 18, a detector 32, a head amplifier 34, a read LSI circuit 28, and a decoder 26 are provided. The detector 32 detects return light from a magnetooptic disk and outputs an ID signal and an MO signal via the head amplifier 34 to the read LSI circuit 28. The read LSI circuit 28 generates a read clock and read data from the received ID signal and MO signal and outputs the read clock and read data to the decoder 26. An environment temperature in the apparatus detected by a temperature sensor 36 is supplied to the MPU 14, and a light emitting power in the laser diode unit 30 is optimized on the basis of the environment temperature. Further, the MPU 14 controls a spindle motor 40 via a driver 38 and also controls an electromagnet 44 via a driver 42. The electromagnet 44 supplies an external magnetic field at the time of recording and erasing when the MO cartridge is used. In the case of a super-resolution magnetooptic medium (MSL medium) in a 1.3 GBMO cartridge, the electromagnet 44 supplies an external magnetic field also at the time of reproduction.

A DSP 15 has a function of a servo control unit 62 for positioning an objective lens mounted on a head actuator to a target position in a magnetooptic disk on the basis of a servo error signal. The servo control unit 62 has two functions of a tracking control of positioning the objective lens to a target track position in a medium and a focusing control of controlling the objective lens so as to achieve focus on the medium. In correspondence with the servo control unit 62, a photodetector 46, a focusing error signal generating circuit 48, a tracking error signal generating circuit 50, and a track zero cross (TZC) detecting circuit 52 are provided. Each of the photodetector 46 and the tracking error signal generating circuit 50 has the same circuit construction as that in FIG. 1. For example, in the case of adopting a knife edge method as a focusing optical system, the focusing error signal generating circuit 48 can generate a focusing error signal by the same circuit construction as that of the tracking error signal generating circuit in FIG. 1. A tracking error signal E0 from the tracking error signal generating circuit 50 is input into the adding circuit 100. The offset correcting signal E3 from DSP 15 is input into the other side of the adding circuit 100. The tracking error signal E1 from the adding circuit 100 is input into the track zero cross detecting circuit 52, as well as into the notching circuit 102, and further is given into DSP15 through the low pass filter 104 as a tracking error signal E2. The tracking error signal E1 from the adding circuit 100 is given to DSP 15 directly. Functions of a circuit part on the low pass filter 104 from the adding circuit 100 will be explained in the following description. With respect to the focusing control, the servo control unit 62 in the DSP 15 drives a focusing actuator 56 by a driver 54 to position the objective lens to a focus position in the optical axis direction. With respect to the tracking control, the servo control unit 62 drives a head actuator 60 using a VCM via a driver 58 to position the objective lens to the target track center on the medium.

FIGS. 5A and 5B are block diagrams showing functions of the offset correcting process in the present invention in the case where the servo control unit 62 of FIG. 4A and 4B serves as a tracking servo control unit as an example. A tracking error signal E0 outputted from the tracking error signal generating circuit 50 in FIG. 4B is supplied to one of inputs of an adding circuit 100 operating as an offset correcting circuit, and a tracking error signal E1 from the adding circuit 100 is directly fetched by an A/D converter 122 in the DSP 15 so as to be used for an offset correcting process. An offset correcting signal E3 outputted from a D/A converter 130 in the DSP 15 is supplied to the other input of the adding circuit 100, so that a standing offset amount of the tracking error signal E0 can be cancelled out by setting a correction amount from an offset eliminating unit 127. For this purpose, the A/D converter 122 converts the offset-cancelled tracking error signal E1 outputted from the adding circuit 100 by sampling of the A/D converter 122 to digital data, fetches the digital data, and supplies the digital data to a correction amount detecting unit 124. The correction amount detecting unit 124 has an offset measuring unit 125 and a correction amount calculating unit 126. The offset measuring unit 125 measures an offset included in the tracking error signal E0 by a change in the amount of the reflection light from the medium. On the basis of the measured offset amount, the correction amount calculating unit 126 calculates a correction amount to be added to the tracking error signal E0 by the adding circuit 100 to thereby cancel out the offset. The standing offset correction amount calculated by the offset eliminating unit 127 is added to a signal indicative of the correction amount sent from the correction amount detecting unit 124 at an addition point 128. A resultant signal is converted by the D/A converter 130 to the analog offset correction signal E3. By adding the offset correction signal E3 to the tracking error signal E0 in the adding circuit 100, the offset amount in the tracking error signal E0 is cancelled out. The tracking error signal E1 outputted from the adding circuit 100 is also passed through a notching circuit 102 and an uncharing low pass filter (LPF) 104 where unnecessary frequency band components (components of frequencies twice as high as the sampling frequency or higher) are eliminated. A resultant signal as a tracking error signal E2 is sampled by an A/D converter 106 in the DSP 15 to thereby obtain digital data and the digital data is fetched. The tracking error signal E1 outputted from the adding circuit 100 is also inputted to the TZC circuit 52 in FIG. 4B. The tracking error signal E2 fetched by the A/D converter 106 into the DSP 15 is multiplied by an input gain by an input gain multiplying unit 108. The input gain is used to absorb variations in input sensitivities by a circuit constant and signal sensitivity. For low pass compensation and phase advance, the tracking error signal data normalized by the input gain multiplying unit 108 is passed to a PID filter 110, multiplied by an output gain obtained when the tracking servo loop is closed by an output gain multiplying unit 112, and resultant data is outputted as a control instruction value (current instruction value) via a D/A converter 114. The output gain in the output gain multiplying unit 112 is to absorb variations in sensitivity of the output system such as driving sensitivity of the driver and acceleration of the actuator. The control instruction signal outputted from the D/A converter 114 drives a tracking coil 116 via the driver 58 using a power amplifier. By driving the tracking coil 116, the tracking servo control of moving an objective lens 120 mounted on a head moving mechanism unit 118 of the head actuator in the radial direction of the medium so as to be positioned in a target position is performed. An MOXID signal E4 and a write gate signal E5 are inputted to an edge port 132 of the DSP 15. The MOXID signal E4 is a logical signal (first logical signal) indicating whether the current tracking position is in the data area or ID area in the medium sector. When the current tracking position is in the data area, the MOXID signal E4 is at the H level. When the current tracking position is in the ID area, the MOXID signal E4 is at the L level. Consequently, by monitoring the MOXID signal E4 connected to the edge port 132, the DSP 15 can determine whether the tracking position is in the data area or ID area during tracking. The result of determination of the MOXID signal E4 on the basis of the monitoring of the state of the edge port 132 is used for the offset correction performed by measuring an offset and calculating a correction amount in the correction amount detecting unit 124. On the other hand, the write gate signal E5 is a logical signal (second logical signal) which goes down from the H level to the L level when the apparatus starts a write control (recording control) or an erasing control and, on completion of the write or erase control, which goes up from the L level to the H level. Similarly, the write gate signal E5 is recognized by the DSP 15 via the edge port 132. On the basis of the write gate signal E5, the correction amount detecting unit 124 performs the offset correction in the data area at the time of the write control and erase control.

Figure 6:
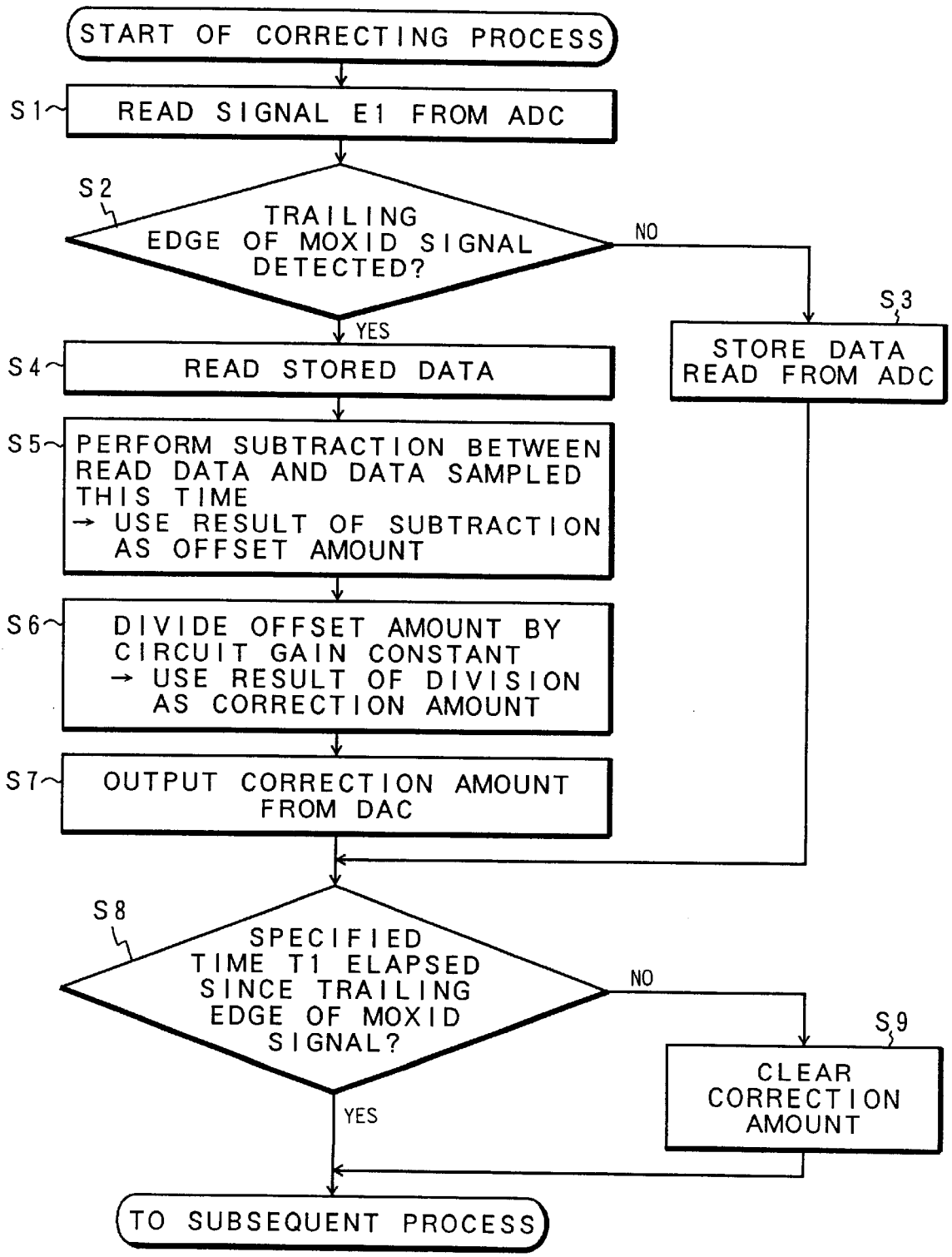
FIG. 6 is a flowchart of a first embodiment of correcting an offset in an ID area according to the present invention.

FIG. 6 is a flowchart of the first embodiment of the offset correction in the ID area according to the present invention. The ID area in a magnetooptic disk is positioned at the head of each sector and information of tracks of a sector and sectors and the like is recorded in the form of pits on a land. Since the ID area has a pit structure in such a manner, the amount of reflection light of the light beam arriving at the ID area is reduced by diffraction. The reason why an offset occurs in the tracking error signal due to the reduction in the reflection light in the ID area is as described above in the explanation of the tracking error signal generating circuit in FIG. 1. The DSP 15 can detect the ID area start timing during tracking, that is, a change in the reflection light amount by the MOXID signal connected to the edge port 132. Consequently, by executing processes according to the flowchart of FIG. 6, an offset component included in the tracking error signal when the light beam arrives at the ID area can be measured and corrected.

The flowchart of FIG. 6 shows only a portion related to the offset correction based on offset measurement and calculation of a correction amount of the present invention in sampling processes performed every sampling frequency to realize the offset correction in the ID area. First, in step S1, the DSP 15 fetches the tracking error signal E1 outputted from the adding circuit 100 via the A/D converter 122 before the tracking error signal E1 is passed to the notching circuit 102 and the low pass filter 104. In step S2, whether the trailing edge of the MOXID signal is detected or not is checked. When the trailing edge is not detected, the program advances to step S3 where tracking error data fetched by sampling is stored. When the trailing edge of the MOXID signal is detected, the process of measuring the offset amount and calculating the correction amount is performed. Specifically, the tracking error data stored in step S4 by the sampling of last time is called. Subtraction is executed between the tracking error data and tracking error data sampled this time in step S5, thereby calculating an offset amount. After calculating the offset amount, the correction amount to correct the offset amount is calculated and outputted from the D/A converter 130. At this time, a gain amount in the adding circuit 100 has to be considered. In step S6, the offset amount is divided by a circuit gain constant to obtain the correction amount. In step S7, the calculated correction amount is outputted from the D/A converter 130 to the adding circuit 100 and is added to the tracking error signal E0, thereby cancelling out the offset. Such an offset correcting process is performed in the entire ID area. A process of clearing the correction amount added at the end position of the ID area is also necessary. Although the timing of clearing the correction amount can be determined by a method of monitoring the rising edge of the MOXID signal E4, in the first embodiment, a clearing timing is set after elapse of specific time T1 since the trailing edge of the MOXID signal in step S8. More specifically, in the sampling process after calculating the correction amount, the elapse of the specific time T1 since the trailing edge of the MOXID signal E4 is monitored in step S8. Before the elapse, the process of clearing the correction amount is not performed and the program continues to the subsequent processes. When the elapse of the specific time T1 is determined, the correction amount is cleared in step S9.

FIGS. 7A to 7F are time charts of waveforms of respective parts in the offset correcting processes in FIG. 6 and show the MOXID signal E4, the tracking error signal E1 used for the offset correction, sampling timings, the specific time T1 after which the correction amount is cleared, the correction amount outputted from the D/A converter 130, and the tracking error signal E2 passed through the notching circuit 102 and the low pass filter 104 and to be fetched by the DSP 15 for the tracking servo control, respectively. As obvious from the time charts, when the MOXID signal E4 goes down to the L level at time t1, an offset amount is calculated as a difference between the tracking error data at a sampling point SP1 of last time in the tracking error signal E1 and tracking error data at a first sampling point SP2 after time t1, and a correction amount based on the offset amount is outputted for the specific time T1 since the time t1. The specific time T1 is set to be slightly shorter than the elapse time of the ID area from the time t1 to time t3.

Figure 8A:
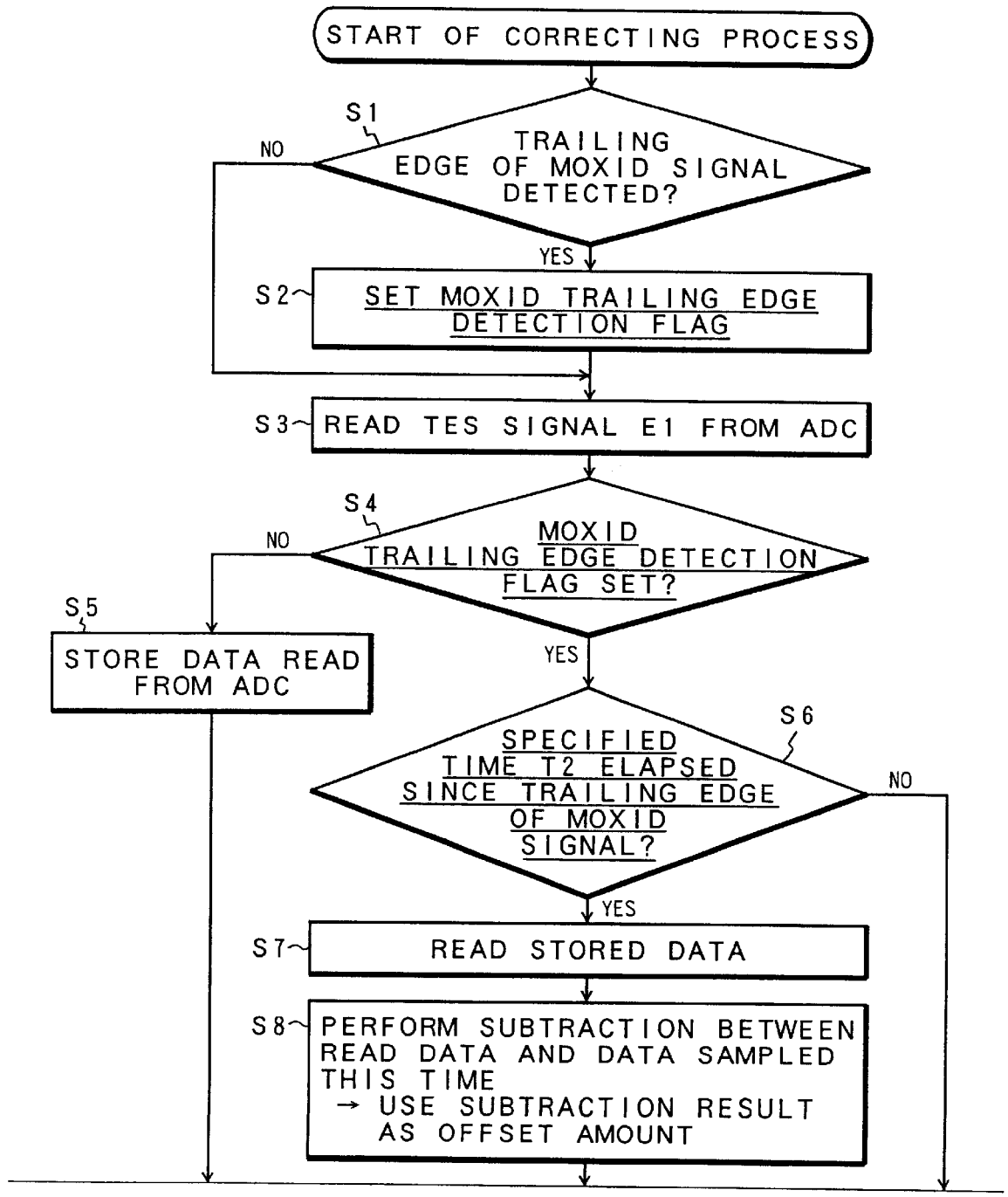
FIGS. 8A and 8B are flowcharts of a second embodiment of correcting an offset in an ID area according to the present invention.
Figure 8B:
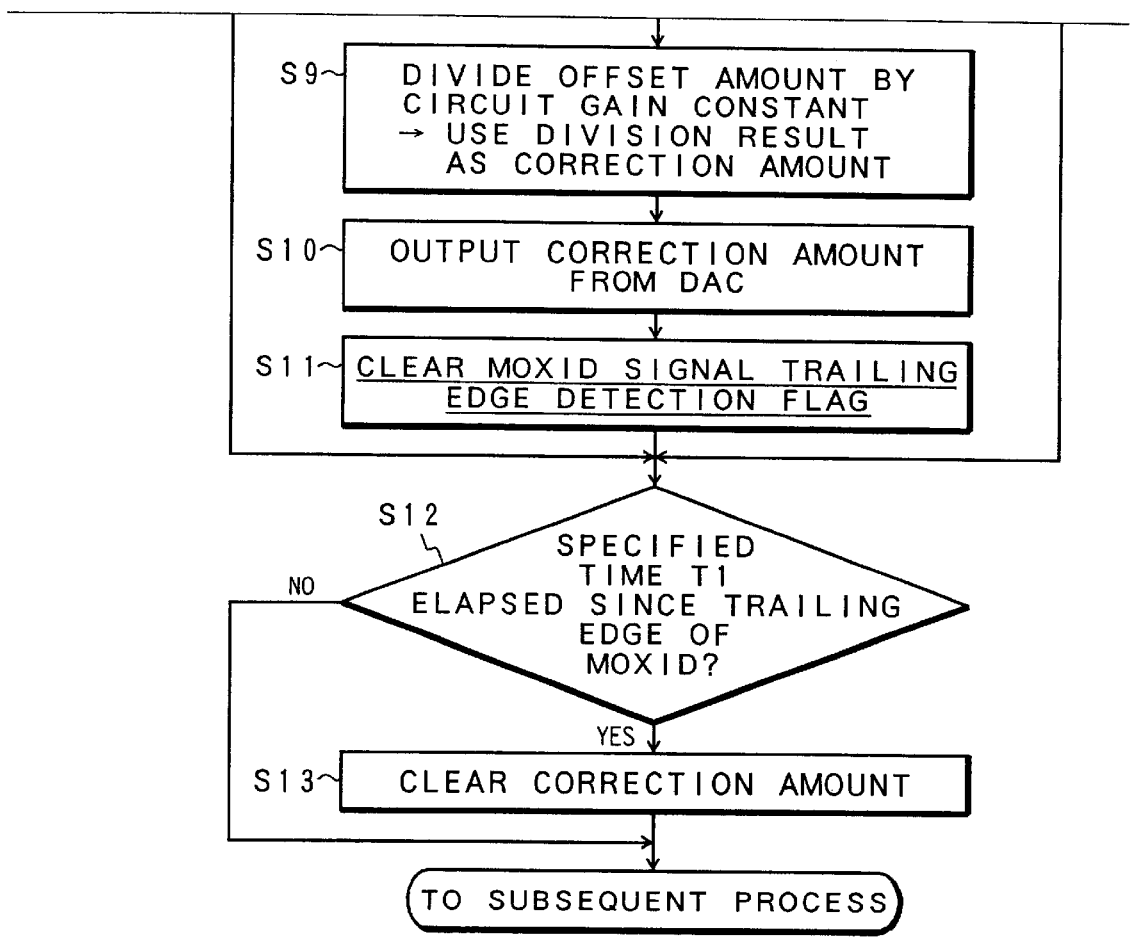

FIGS. 8A and 8B are flowcharts of a second embodiment of offset correction in the ID area. FIGS. 9A to 9G are time charts of signal waveforms of respective parts. In the first embodiment of FIG. 6 and FIGS. 7A to 7F, at the time when the trailing edge of the MOXID signal E4 is recognized, the offset amount is detected by the difference between the tracking error data at the first sampling point SP2 and the tracking error data at the immediately preceding sampling point SP1. When the tracking error data fetched at the first sampling immediately after the trailing of the MOXID signal E4 is used for the calculation of the offset amount, however, there is a case that the tracking error data at the sampling point SP2 before the offset appears in the tracking error signal is sampled and used for the calculation. In the second embodiment of FIGS. 8A and 8B, therefore, the tracking error data is sampled at a timing after the MOXID signal goes down and an offset certainly occurs in the tracking error signal, so that the offset amount can be calculated accurately.

In the flowchart of FIGS. 8A and 8B, in order to realize processes for calculating the offset amount with reliability, underlined processes in steps S2, S4, and S6 are added to the flowchart of the first embodiment of FIG. 6. In the processes for calculating the offset amount with reliability, time is monitored also after the detection of the trailing edge of the MOXID signal E4. A flag indicative of detection of the trailing edge is therefore necessary. When the trailing edge of the MOXID signal E4 is detected in step S1, a trailing edge detection flag is set in step S2. That is, when the trailing edge of the MOXID signal is detected in step S1, an MOXID signal trailing edge detection flag is set in step S2. Before the MOXID signal goes down, the program advances from step S1 to step S3 where the tracking error signal E1 is fetched by the A/D converter 122, and whether the MOXID signal trailing edge detection flag is set or not is checked in step S4. When the flag is not set, the tracking error data fetched is stored in step S5. In the case where the trailing edge detection flag is set in step S4, whether specific time T2 has elapsed since the trailing edge or not is checked in step S6. When the specific time T2 has elapsed, in a manner similar to steps S4 to S7 in FIG. 6, the offset amount and the correction amount are calculated and, further, a correction is performed by outputting the correction amount in steps S7 to S10. The trailing edge detection flag is cleared in step S11. In a manner similar to the first embodiment of FIG. 6, the correction amount is cleared in steps S12 and S13 when the specific time T1 has elapsed since the trailing edge of the MOXID signal. In the second embodiment, as obvious from the time charts of FIGS. 9A to 9G, the tracking error data at the sample point SP2 is fetched at the first sampling timing after the elapse of the specific time T2 since the time t1 at which the MOXID signal E4 goes down, and the offset amount can be calculated as the difference between the fetched tracking error data and the tracking error data at the sample point SP1 just before the time t1. Consequently, the offset amount can be accurately measured at a timing at which the offset amount has certainly already appeared in the tracking error signal in the ID area.

Figure 10A:
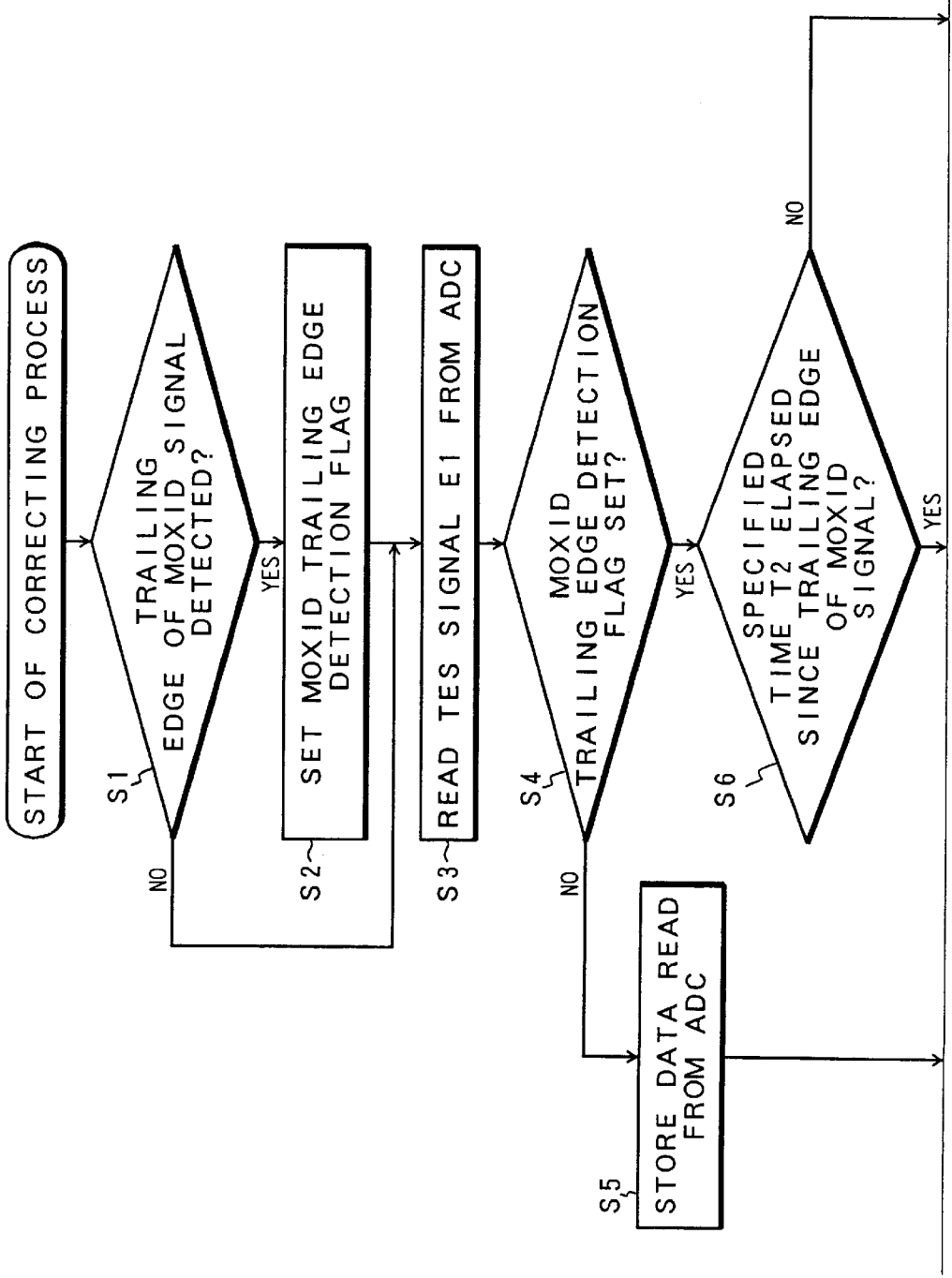
Figure 10B:
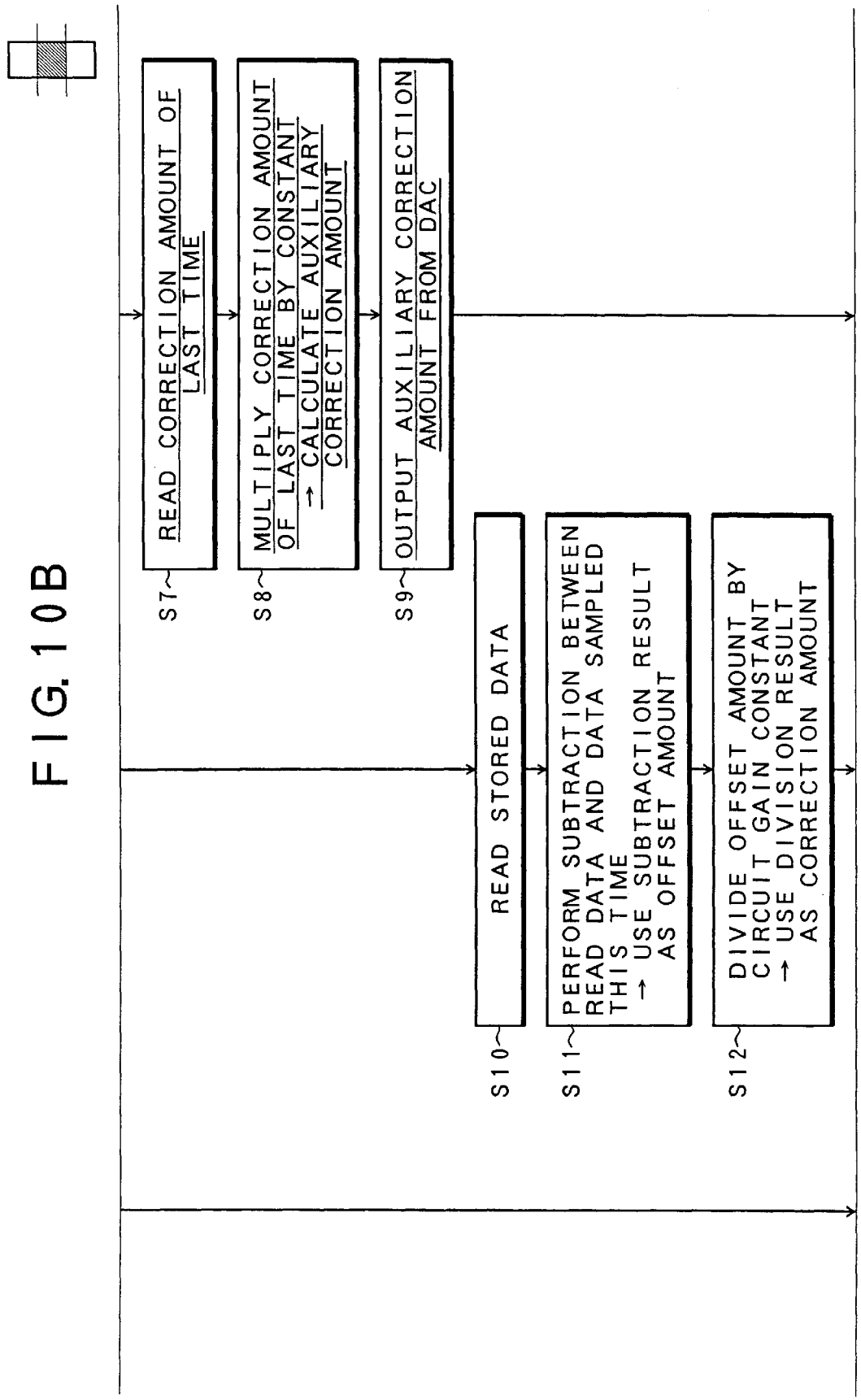

FIGS. 10A to 10C are flowcharts of a third embodiment of the offset correcting process in the ID area according to the invention. FIGS. 11A to 11G show time charts of signal waveforms of respective parts. In the second embodiment of FIGS. 10A to 10C, calculation of the offset amount, calculation of the correction amount and, further, correction of the offset after elapse of the specific time T2 since the trailing edge of the MOXID signal are performed with the intention of performing the processes certainly after the offset occurs. As a result, the timing of the offset correction is naturally delayed. In the case of intentionally delaying the timing of the offset correction as described above, during a period from the calculation of the correction amount to the cancellation of the offset from the tracking error signal, the offset is left as it is in the tracking error signal. Although the signal is passed through the filters, if the influence of the offset is exerted also on the tracking error signal E2, the correction effect is reduced in half.

In a third embodiment of FIGS. 10A to 10C, during the period from the trailing edge of the MOXID signal to the start of the offset correction, a value obtained by multiplying the correction amount of the offset calculated in the preceding ID area by a constant smaller than 1 is used as an auxiliary correction amount and is added to the tracking error signal E0 to perform correction. The correction amount of last time is multiplied by a constant in consideration of a change in waveform until the offset occurs fully. It is empirically considered that about 0.5 to 0.75 is proper as the constant used to calculate the auxiliary correction amount. In the flowchart of FIGS. 10A to 10C, in order to realize the process of adding the auxiliary correction amount, underlined processes in steps S7, S8, S9, and S13 are added to the flowchart of the second embodiment of FIGS. 8A and 8B. Consequently, until the specific time T2 is elapsed since the trailing edge of the MOXID signal in step S6, the correction amount of last time is read in step S7, the correction amount of last time is multiplied by a constant which lies in the range from about 0.5 to 0.75 to thereby calculate the auxiliary correction amount in step S8, and the auxiliary correction amount is outputted from the D/A converter 130 to the adding circuit 100 and added to the tracking error signal E0 in step S9, thereby correcting the offset by using the auxiliary correction amount. In the case where the specific time T2 has elapsed since the trailing edge of the MOXID signal in step S6, the calculation of the offset amount, calculation of the correction amount, and output of the correction amount are performed in steps S10 to S12. Subsequently, in step S13, in association with the process of adding the auxiliary correction amount, the calculation result of the correction amount is stored for the calculation of the auxiliary correction amount in the next ID area. In the processes of the third embodiment of FIGS. 10A to 10C, the auxiliary correction amount is calculated in step S8 at every sampling until elapse of the specific time T2 since the detection of the trailing edge of the MOXID signal. It is also possible not to calculate the auxiliary correction amount every time but to add a branching process so as to calculate the amount only once in the beginning. Alternatively, it is also possible to perform a process of calculating and storing the auxiliary correction amount in the next ID area at the time of calculating the correction amount and unconditionally outputting the already calculated auxiliary correction amount at the time of next detection of the trailing edge of the MOXID signal.

In the time charts of the third embodiment of FIGS. 11A to 11G, for the specific time T2 since the time t1 at which the MOXID signal E4 goes down, an auxiliary correction amount 130 calculated from the correction amount of last time is outputted. As a result, even when the offset correcting process is started at the first sampling timing after elapse of the specific time T2, it can be prevented that the offset caused by the time delay remains and exerts an influence on the servo control unit. The tracking error data at the sample point SP2 of the first sampling timing after the elapse of the specific time T2 is a signal from which the offset has been eliminated by using the auxiliary correction amount 130. The difference between the tracking error data at the sample point SP2 and that at the sample point SP1 just before the ID area is reduced by the amount corresponding to the eliminated offset. A value obtained by adding a correction amount calculated by measuring the offset to the auxiliary correction amount 130 is used as a correction amount used after that.

Figure 12A:
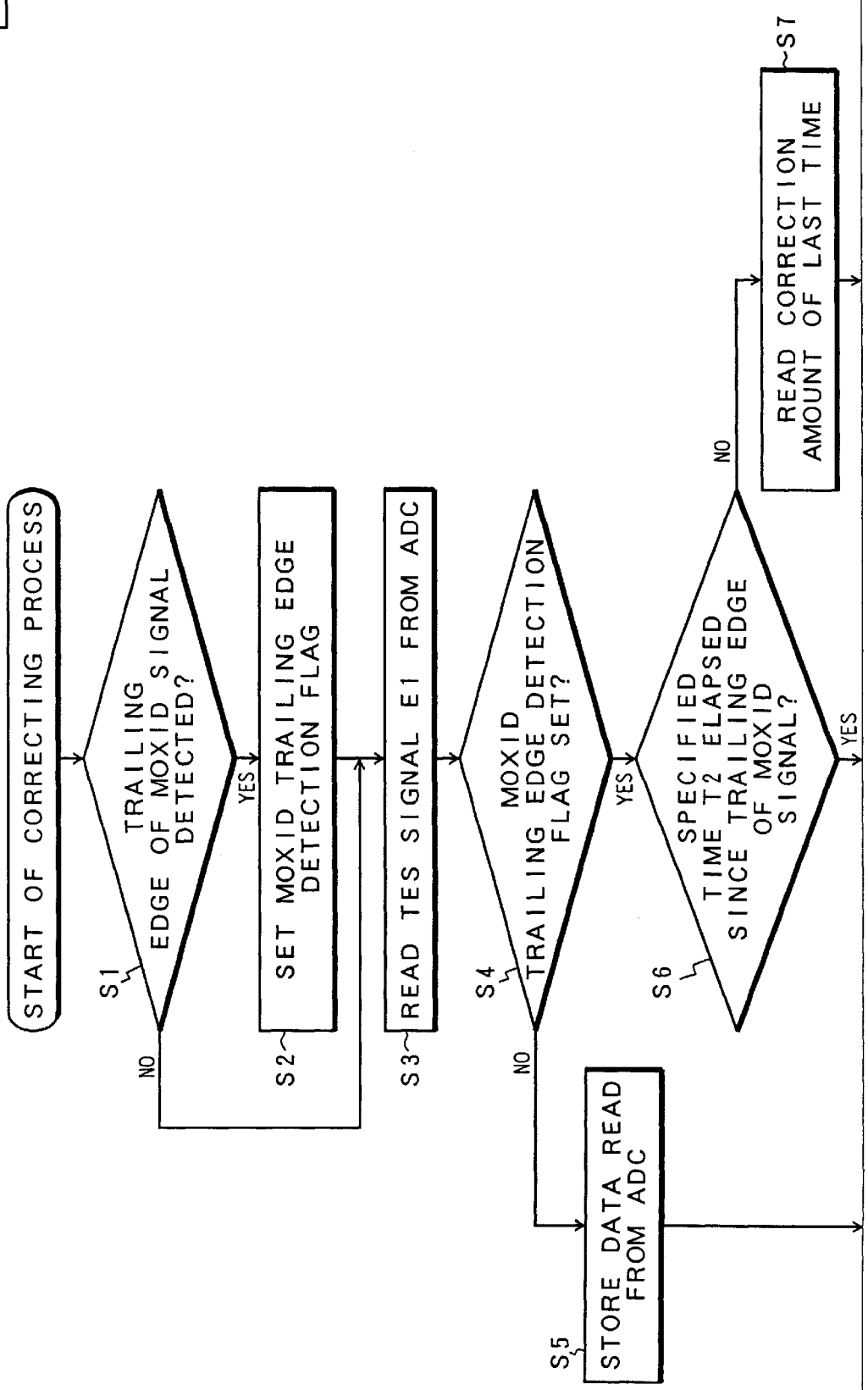
FIGS. 12A to 12C are flowcharts of a fourth embodiment of correcting an offset in an ID area according to the present invention.
Figure 12B:
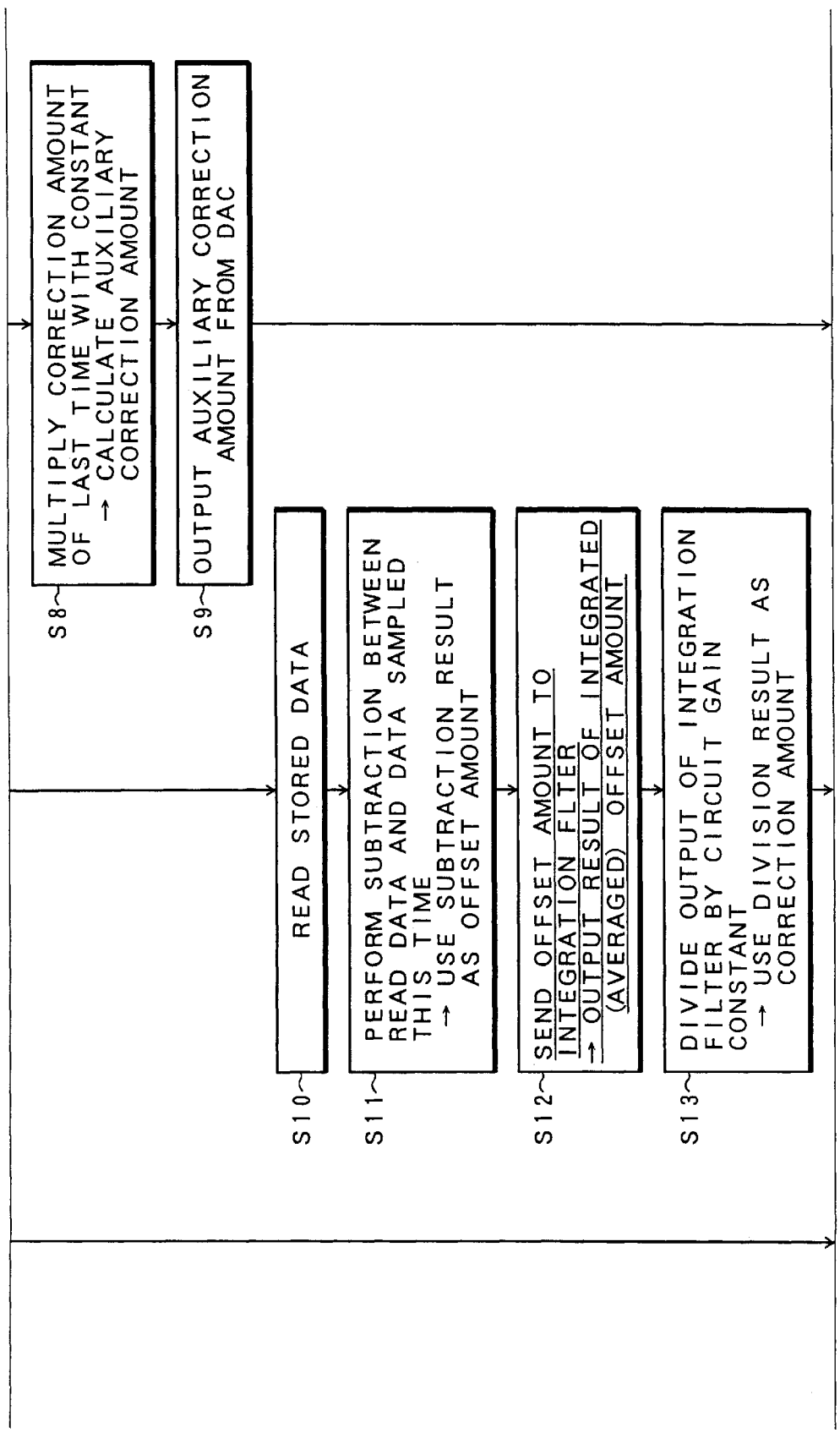
Figure 12C:
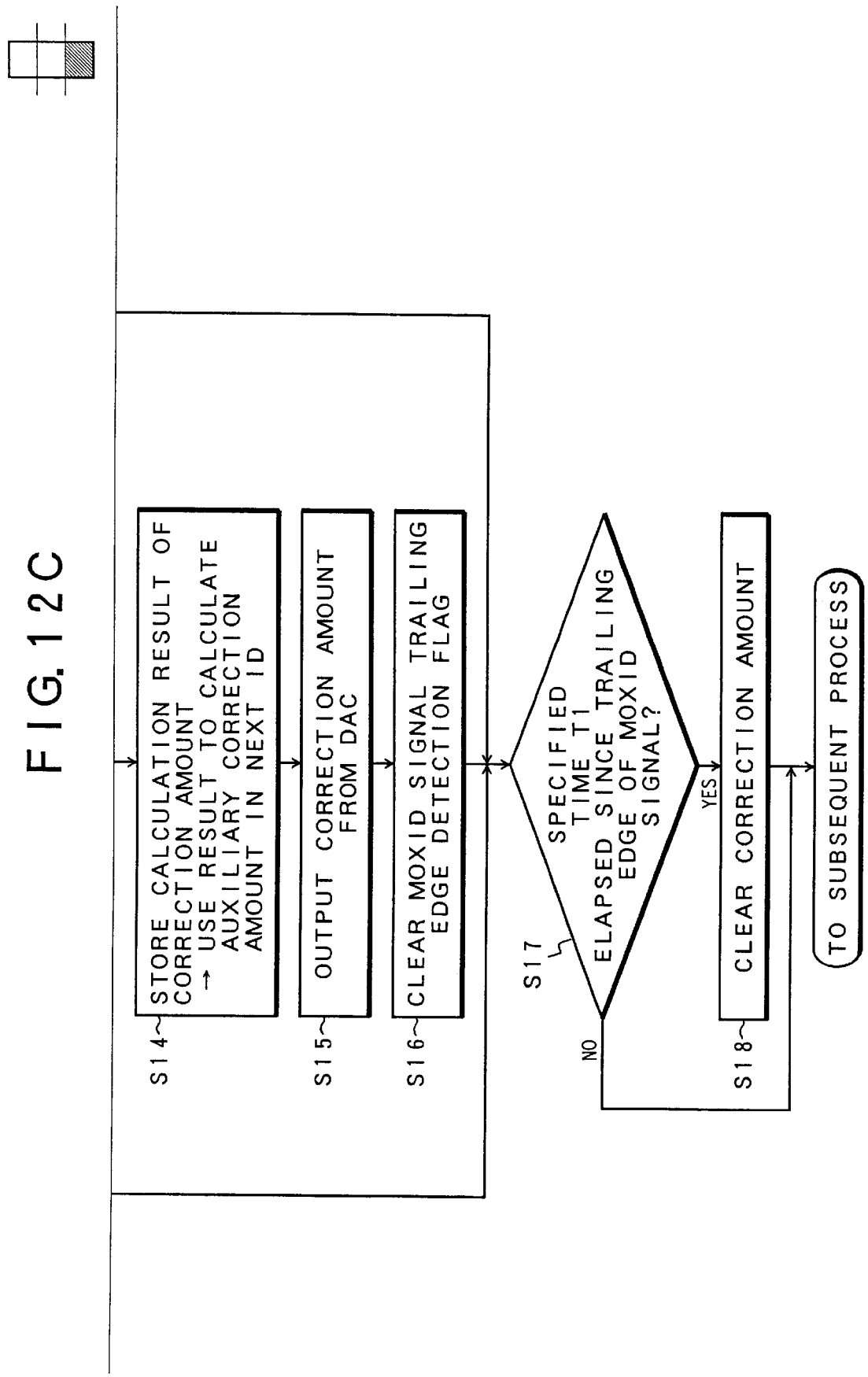
Figure 13:
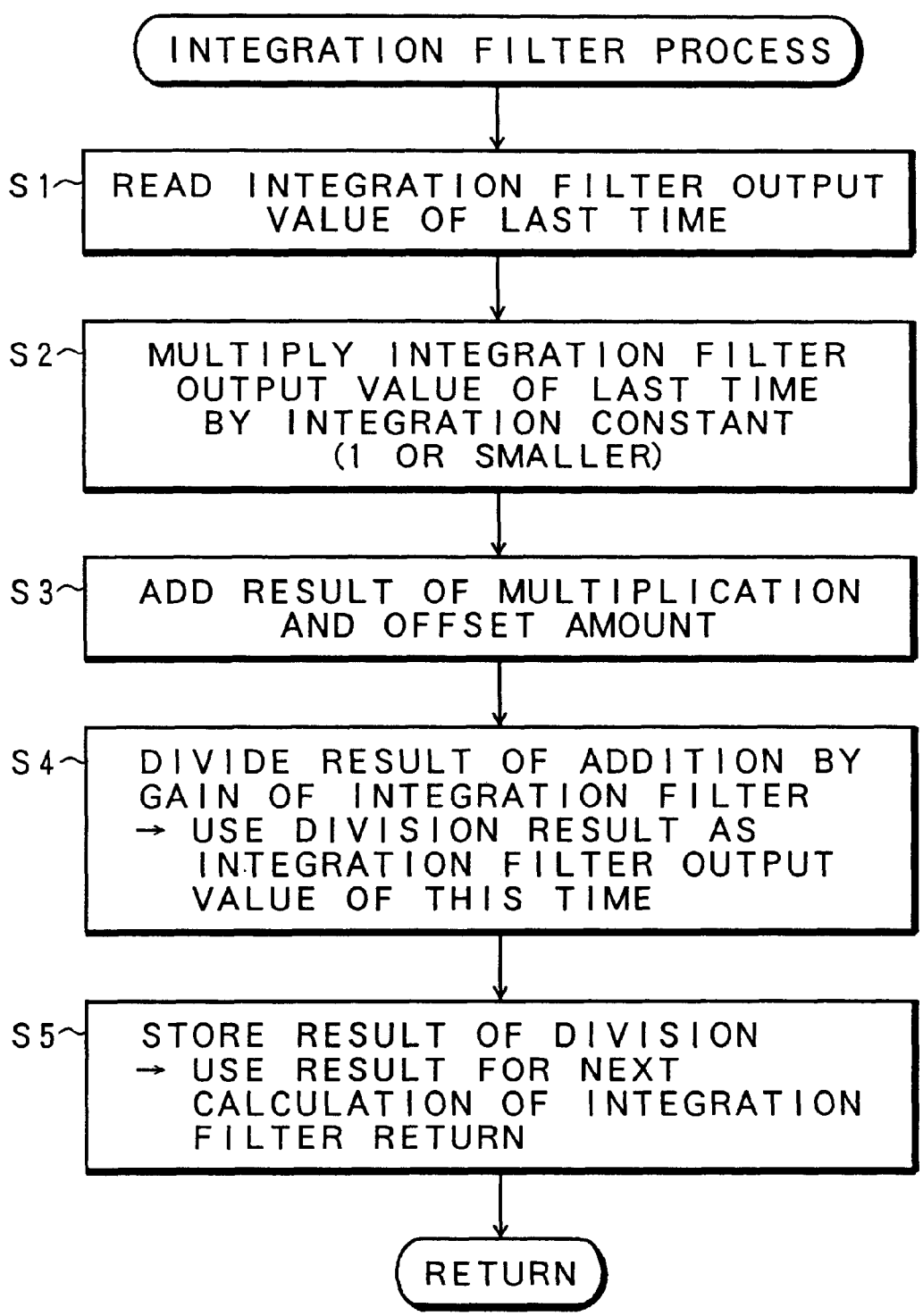
FIG. 13 is a flowchart of an integration filter process in FIG. 12B.
Figures 14A, 14B, 14C, 14D, 14E, 14F, 14G:
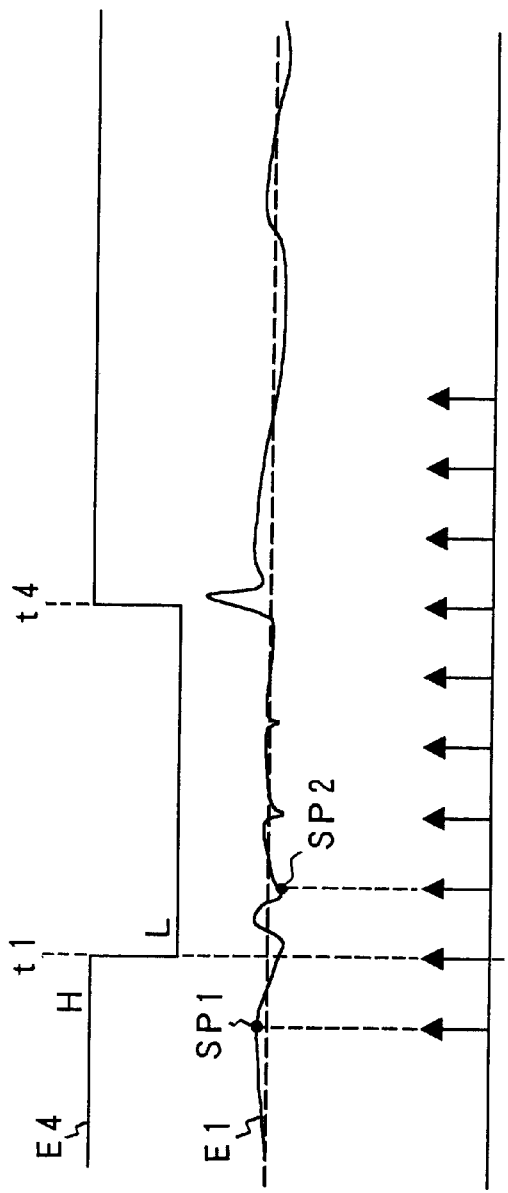
FIGS. 14A to 14G are time charts of signals of respective parts in the fourth embodiment of FIGS. 12A to 12C.

FIGS. 12A to 12C show a flowchart of a fourth embodiment of an offset process in the ID area according to the invention. FIG. 13 shows a flowchart of an integration filter process in the fourth embodiment. Further, FIGS. 14A to 14G show time charts of signal waveforms of respective parts in the fourth embodiment. In the foregoing first to third embodiments, only an offset amount obtained in the ID area for the offset correction is used as an input for calculating the correction amount. When a change which is not purely due to the reflection light amount but is caused by, for example, a medium defect in the ID area appears in the tracking error signal, the correction amount different from a correction amount to be inherently added is added to the tracking error signal, and the offset correction is not therefore accurately performed. In the case of using the auxiliary correction amount as in the third embodiment, there is the possibility that an adverse influence is exerted on the offset correction value obtained by using the auxiliary correction amount in the ID area. In the fourth embodiment of FIGS. 12A to 12C, therefore, by using a plurality of past offset amounts as inputs to calculate the correction amount, the tracking servo control system can be prevented from being made unstable by a sporadic offset calculation result due to a change in the tracking error signal which is not caused by the reflection light amount but is caused by a medium defect or the like.

In the fourth embodiment, specifically, calculated offset amounts are averaged by being passed to the integration filter, and the correction amount is obtained by using the averaged offset amount. Obviously, the averaging process can be performed not only by the method of using the integration filter but also by a method of calculating an average of a plurality of past offset amounts. Similar effects are produced.

In the flowchart of FIGS. 12A to 12C, an underlined process in step S12 is added to the third embodiment of FIGS. 8A and 8B to realize the calculation of the correction amount for averaging the offset amounts by using the integration filter. All of the processes except for the process in step S12 added to average the offset amounts by using the integration filter are not always necessary. For example, in the case of adding a process of averaging offset amounts by using the integration filter in step S13 in the fourth embodiment to the flowchart of the first embodiment of FIG. 6 or the flowchart of the second embodiment of FIGS. 8A and 8B, a similar function can be also realized. In the fourth embodiment, after calculating an offset amount as a result of substraction performed between data sampled this time in step S11 and data sampled last time in step S11, the offset amounts are averaged by being passed to the integration filter in the newly added step S12. The integration filter outputs a value obtained by adding the result derived by multiplying the output value of last time by a constant and an input value of this time, and the output value is expressed by the following equation.

integration filter output value=[(integration filter output value of last time)×(integration constant)+(offset amount of this time)]/ (integration filter gain)

FIG. 13 specifically shows the integration filter process in step S12 in FIG. 12B as a subroutine. In the integration filter process, in step S1, an output value of the integration filter of last time is read and, in step S2, the integration filter output value of last time is multiplied by an integration constant equal to or smaller than 1. In step S3, the result of multiplication and the offset amount are added. In step S4, the result of addition is divided by the gain of the integration filter, and the derived value is used as an integration filter output value of this time. In step S5, the integration filter output value is stored for calculation of the integration filter of the next time. The integration constant used for the calculation of the integration filter output value is one or smaller as a condition. Empirically, a value around 0.8 to 0.9 is appropriate. The integration filter output value calculated in such a manner is used as an integrated correction amount 140 generated subsequent to the auxiliary correction amount 130 in FIG. 14F for correcting the offset in the tracking error signal.

Figure 15:
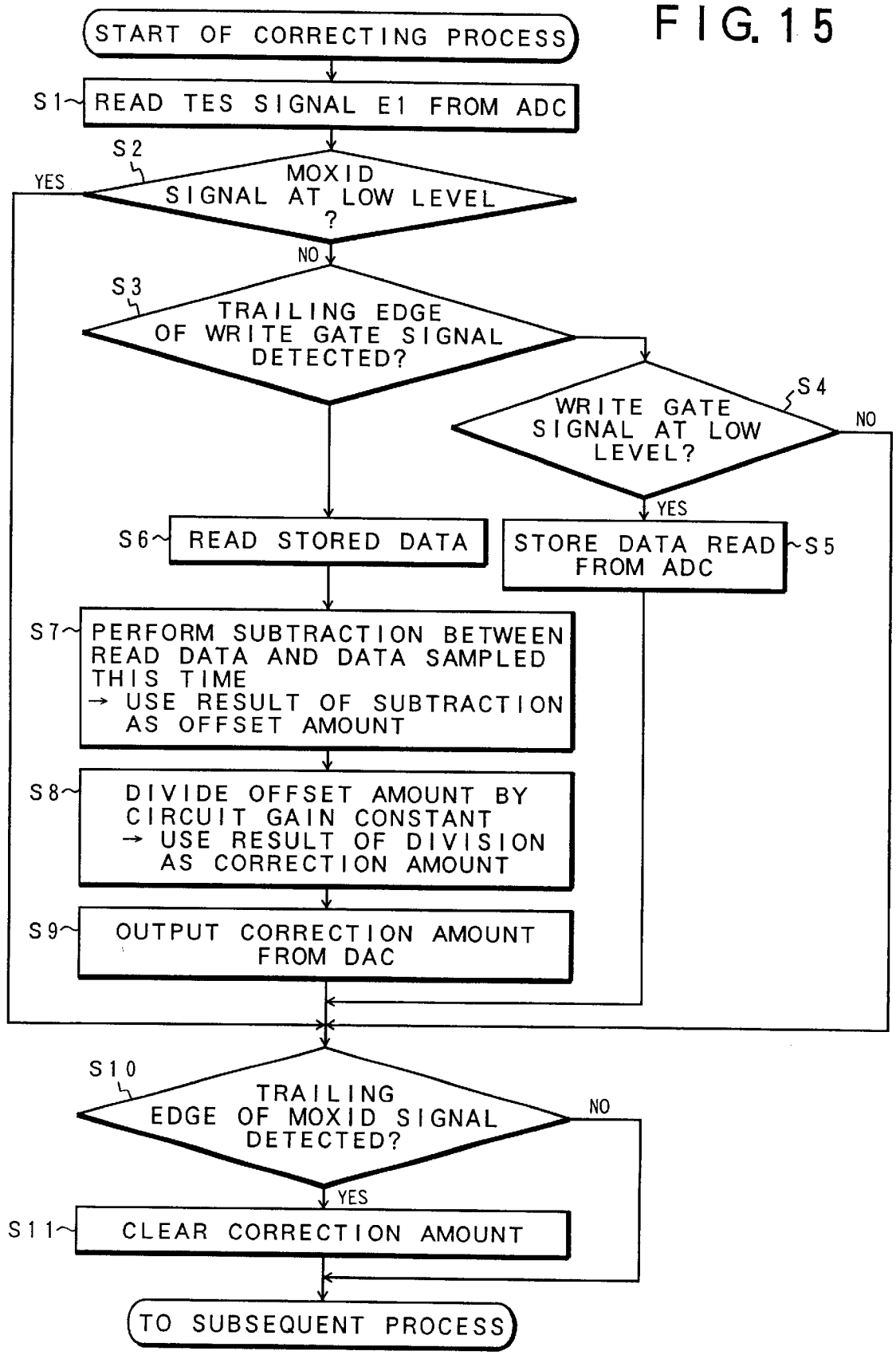
FIG. 15 is a flowchart of a fifth embodiment of correcting an offset at the time of recording/erasing according to the present invention.

FIG. 15 is a flowchart showing a fifth embodiment of an offset correcting process at the time of recording or erasing according to the invention. FIGS. 16A to 16F show signal waveforms of respective parts. In an optical disk drive of the present invention, at the time of erasing information recorded in the data area in the medium or recording information to the data area, the light beam changes to have a stronger intensity as compared with that at the time of reproduction. By the increase in the light emitting amount of the light beam, the amount of reflection light from the medium naturally increases. At the time of recording or erasing, therefore, due to an increase in the amount of reflection light, an offset occurs in the tracking error signal. As shown in FIGS. 5A and 5SB, the write gate signal E5 is connected via the edge port 132 to the DSP 15, which is a logical signal going down to the L level after confirming the target ID area at the time of recording or erasing information to/from the medium. By confirming the trailing edge of the write gate signal E5, the DSP 15 can detect timings of recording and erasing. The rising edge to the H level of the write gate signal E5 is the timing at which the recording or erasing is finished. By the rising edges, the DSP 15 can detect the ending timings of recording and erasing. In a state where the MOXID signal E4 is also connected to the edge port 132 in a manner similar to the write gate signal E5, also by monitoring the MOXID signal E4 which goes down to the L level in the ID area in the sector after the recording or erasing, timings of recording and erasing can be detected. At the start timing of recording or erasing obtained by the trailing edge of the write gate signal E5 as described above, the correction amount detecting unit 124 provided in the DSP measures the offset amount in the tracking error signal at the time of recording or erasing by the offset measuring unit 125, and calculates the correction amount to cancel out the measured offset amount, and can apply the correction amount to the adding circuit 100.

The processes in the flowchart of FIG. 15 are necessary to realize the correction of the offset in the tracking error signal at the time of recording or erasing. The processes only in a part related to the offset correcting process at the time of recording or erasing are extracted from the sampling processes performed every sampling frequency of the A/D converter 122. The process of correcting an offset in the tracking error signal at the time of recording as an example will be described as follows. In step S1, the DSP 15 fetches the tracking error signal E1 to the inside via the A/D converter 122. In step S2, whether the MOXID signal E4 is at the L level or not, that is, whether an offset occurs in the tracking error signal in the ID area or not is checked. When the MOXID signal is not at the L level, that is, when the tracking position is not in the ID area, whether the write gate signal is at the L level indicative of a recording operation or not is checked in step S3. When the write gate signal is not at the L level as well, the program advances to step S4 where the tracking error data fetched by the sampling at this time is stored. When the MOXID signal goes down to the L level in the ID area in step S2, the program advances from step S2 to step S10 and the tracking error data fetched in step S5 is not stored. When the trailing to the L level of the write gate signal is detected in step S3 in a sampling process after that, the program advances to step S6 where the tracking error data stored in the preceding sampling process just before the ID area is called. In step S7, a subtraction operation is performed between the called tracking error data and the tracking error data sampled this time, thereby calculating an offset amount. After the offset amount is calculated, in step S8, the correction amount is calculated by a dividing operation using the circuit gain constant. In step S9, the calculated correction amount is outputted from the D/A converter 130 to the adding circuit 100 and is added to the tracking error signal E0, thereby correcting the offset. After the offset correction of adding the correction amount to the tracking error signal is started, a process of clearing the correction amount at the timing of an end of recording is required. In the fifth embodiment, in the method of clearing the correction amount at the ending timing of recording or erasing, the trailing timing to the L level of the MOXID signal indicative of the start of the ID area in the next sector is used. Specifically, the detection of the trailing edge of the MOXID signal is confirmed in step S10. When the detection of the trailing edge is confirmed, the process of clearing the correction amount is performed in step S11.

By the offset correcting process at the time of recording or erasing in the fifth embodiment as shown in FIG. 15, as the signal waveforms of respective parts in FIGS. 16A to 16F, the difference between the tracking error data at the sample point SP1 which is the sampling timing just before the time t1 at which the MOXID signal E4 goes down to the L level and the tracking error data at the first sample point SP2 after the write gate signal E5 goes down to the L level is calculated as an offset amount, and the correction amount based on the offset amount is outputted up to the trailing edge of the MOXID signal E4 to the L level indicative of the start of the ID area in the next sector.

Figure 17A:
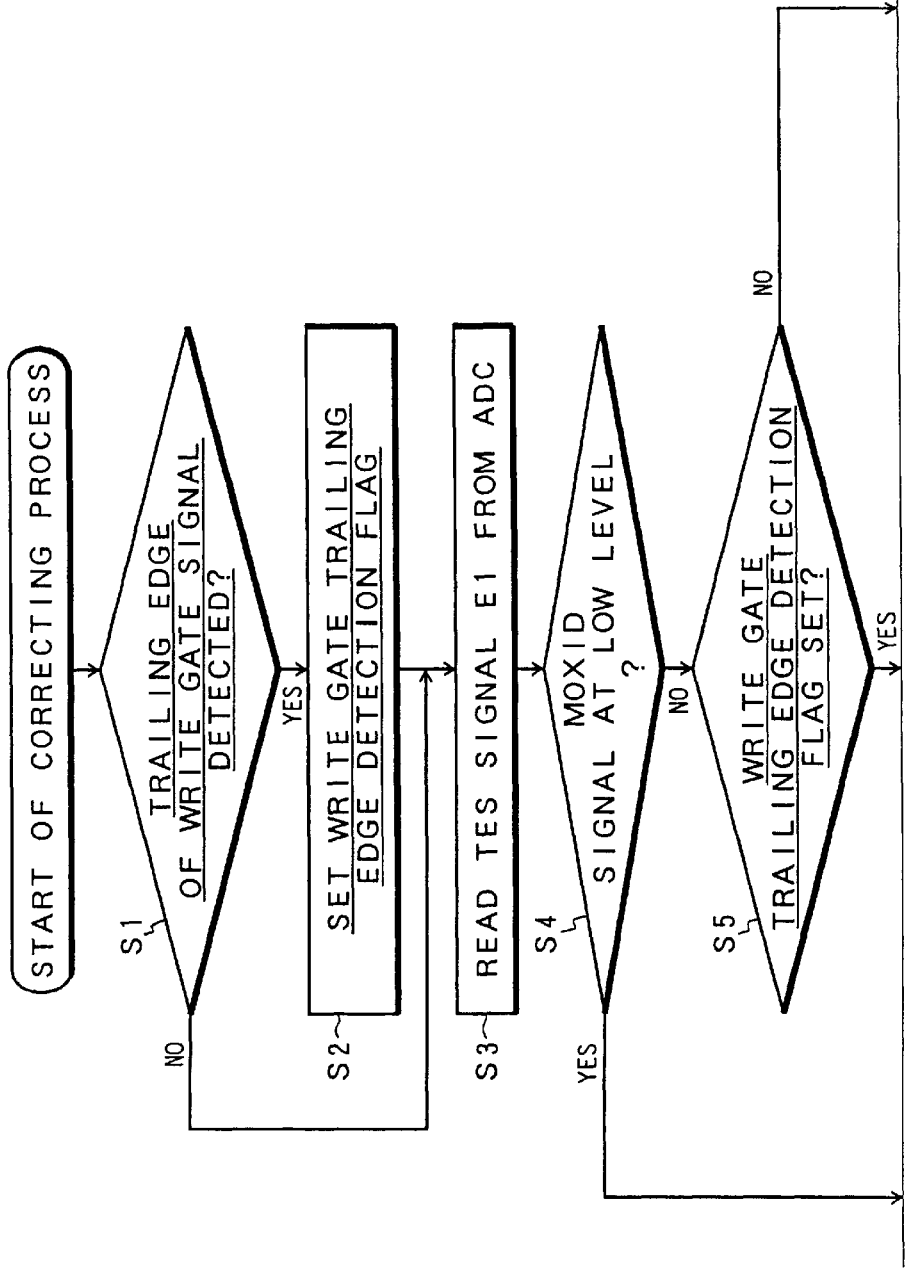
FIGS. 17A to 17C are flowcharts of a sixth embodiment of correcting an offset at the time of recording/erasing according to the present invention.
Figure 17B:
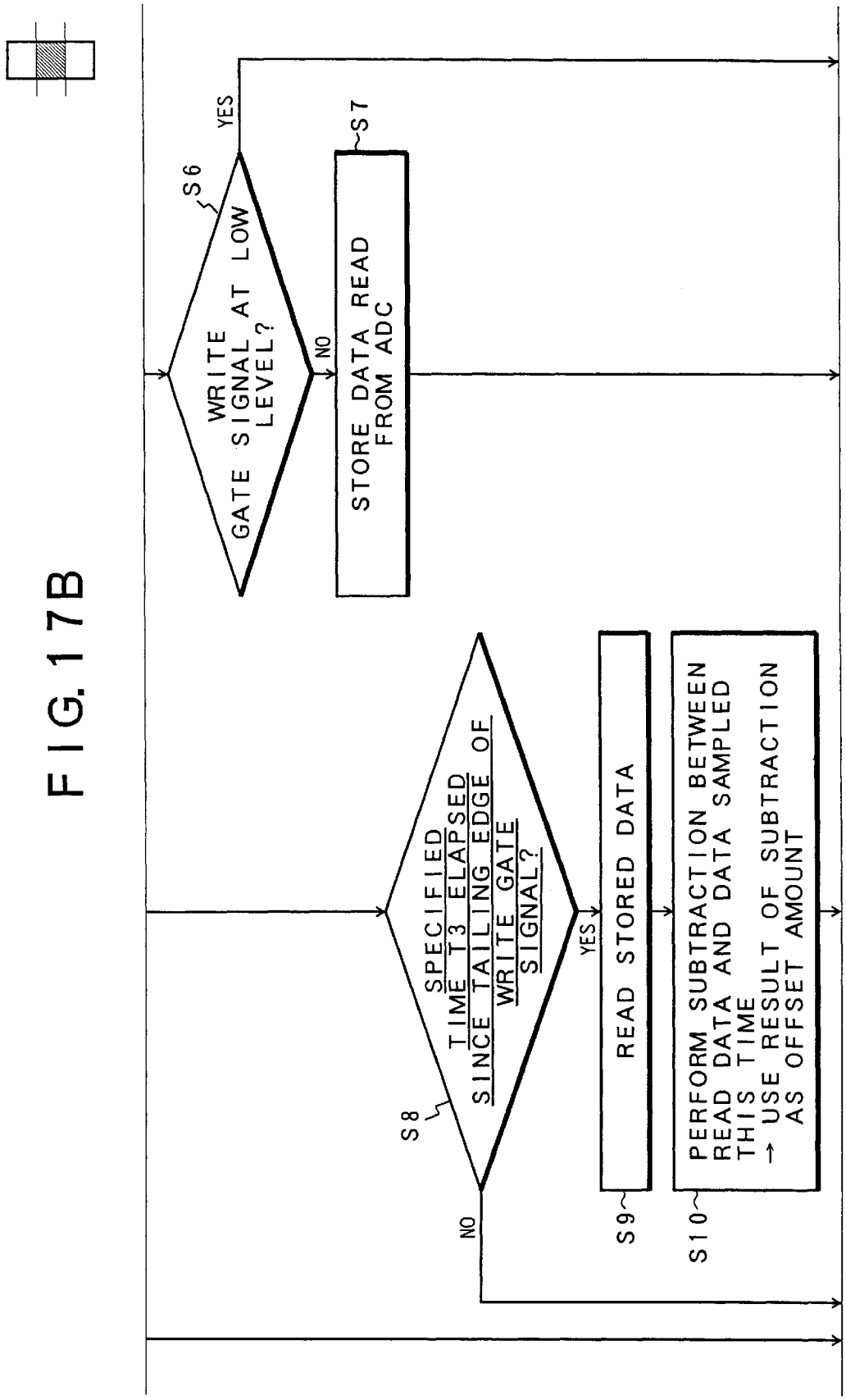
Figure 17C:
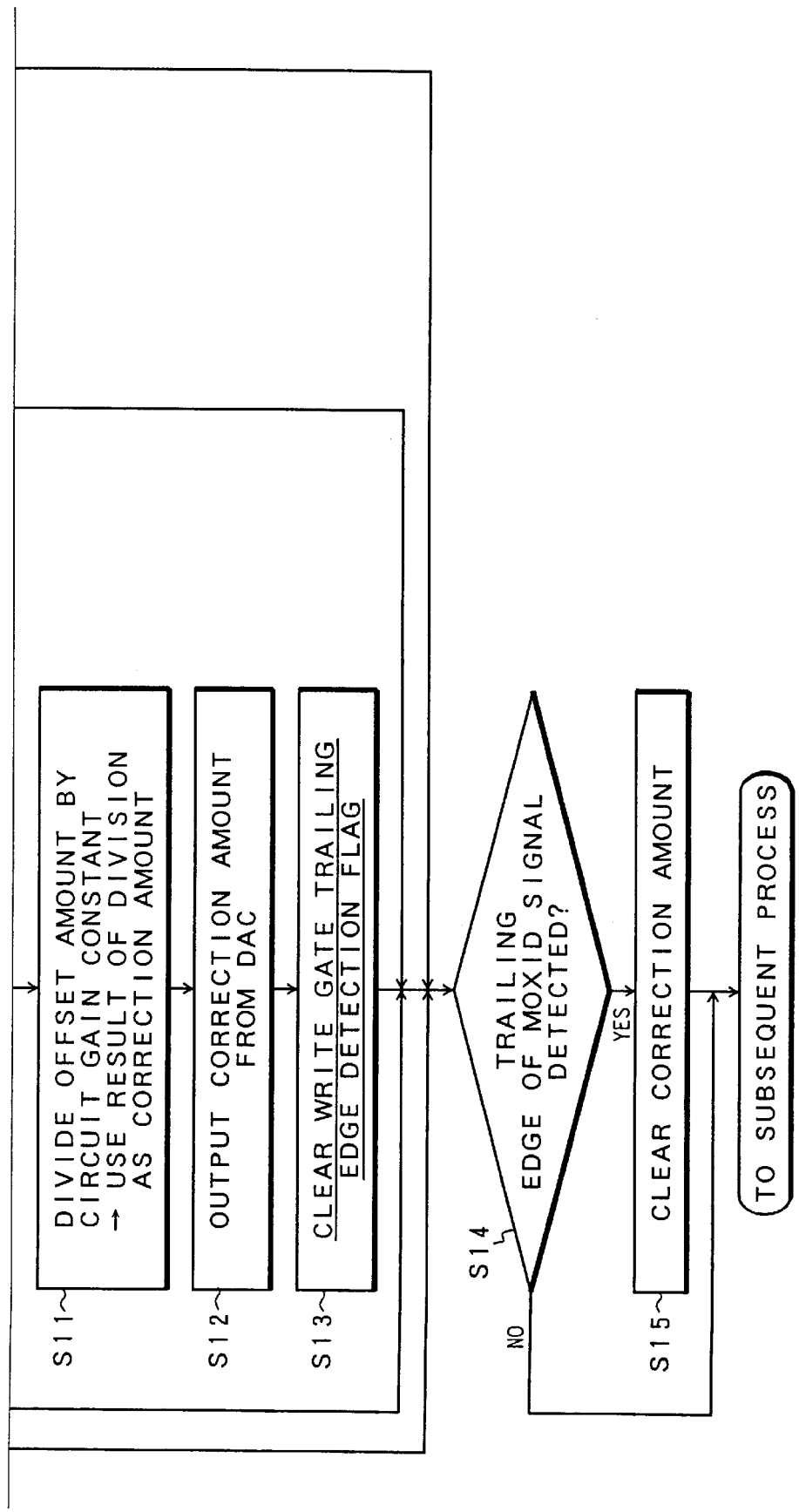
Figure 19B:
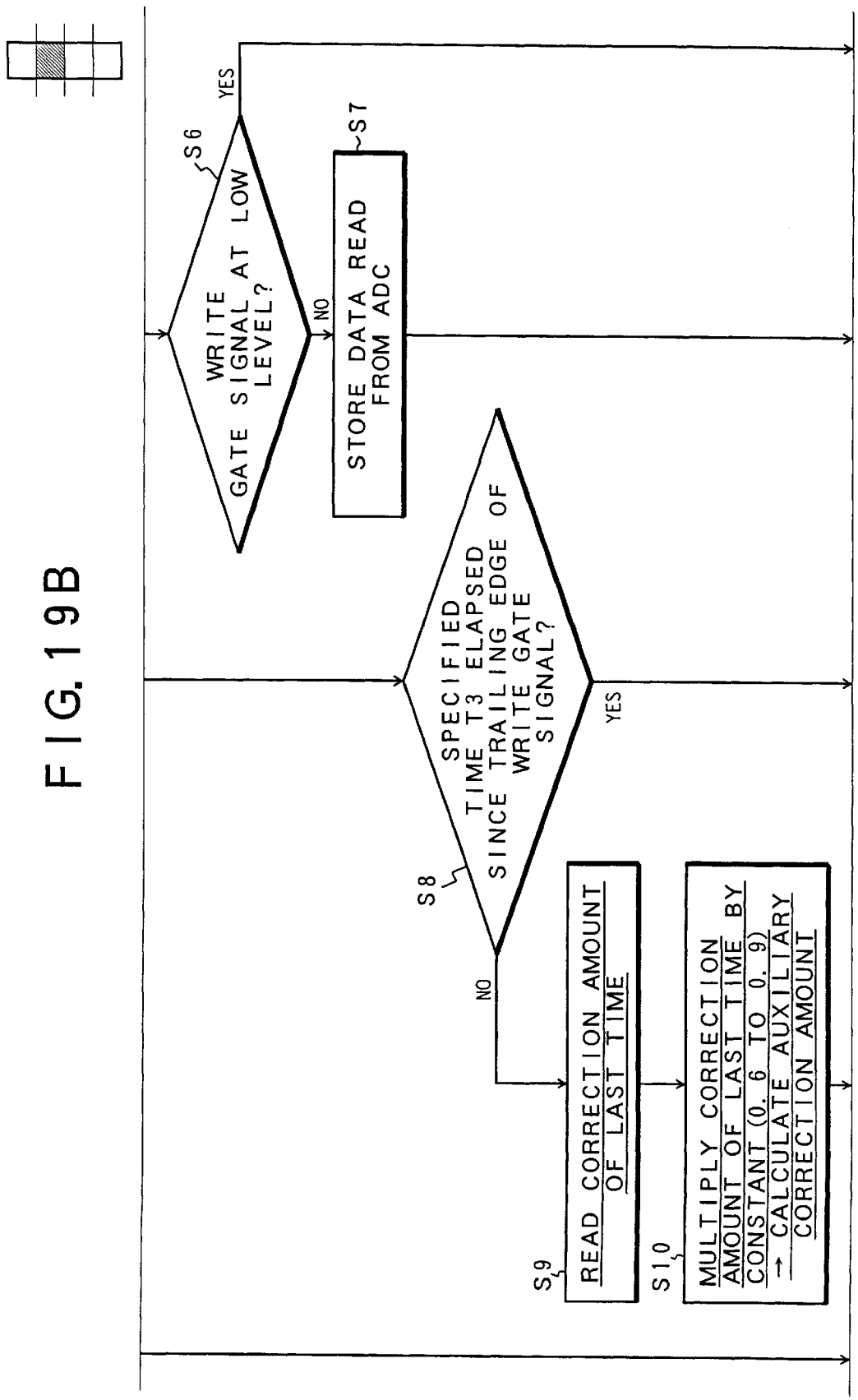
Figure 21B:
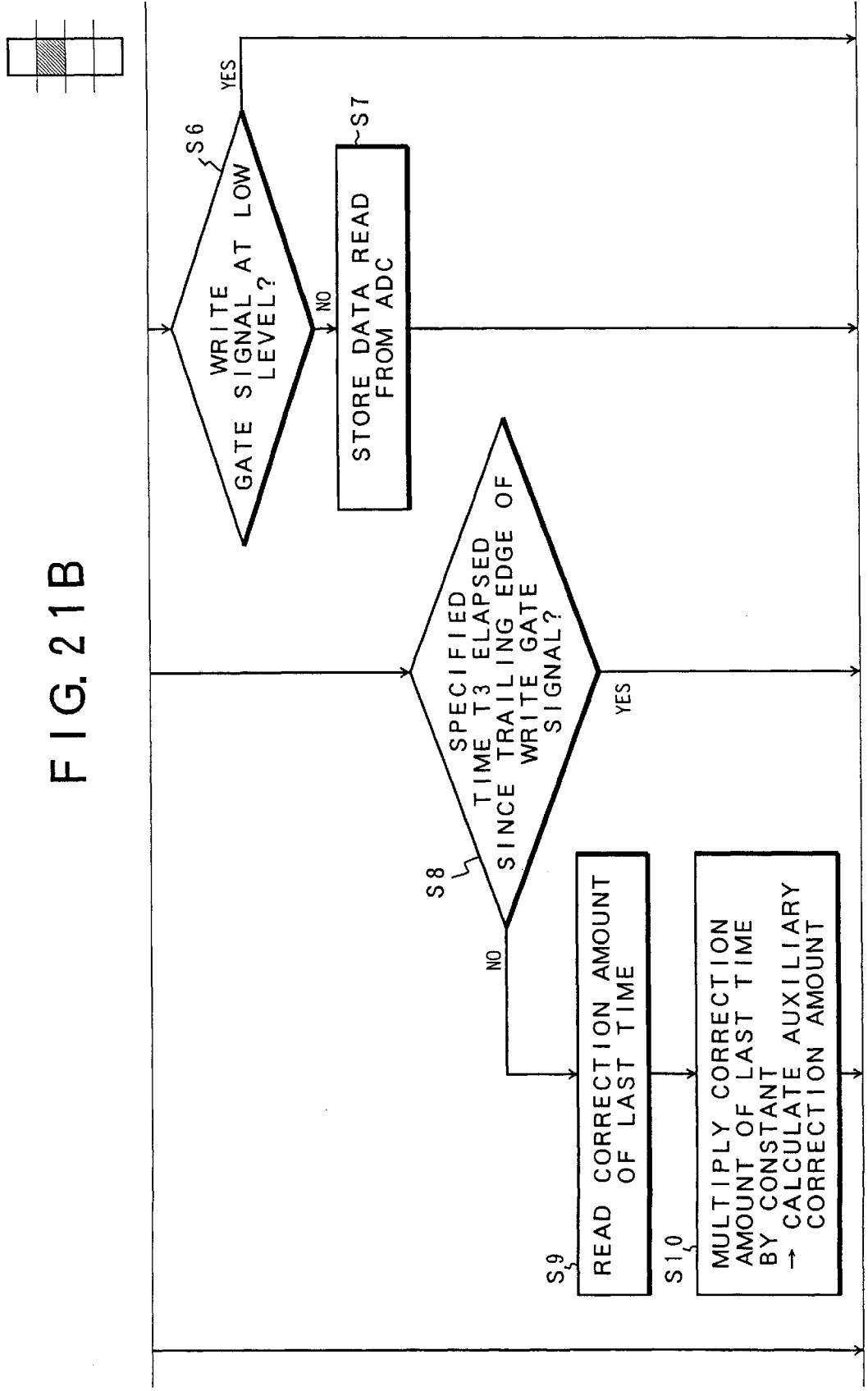
Figure 21C:
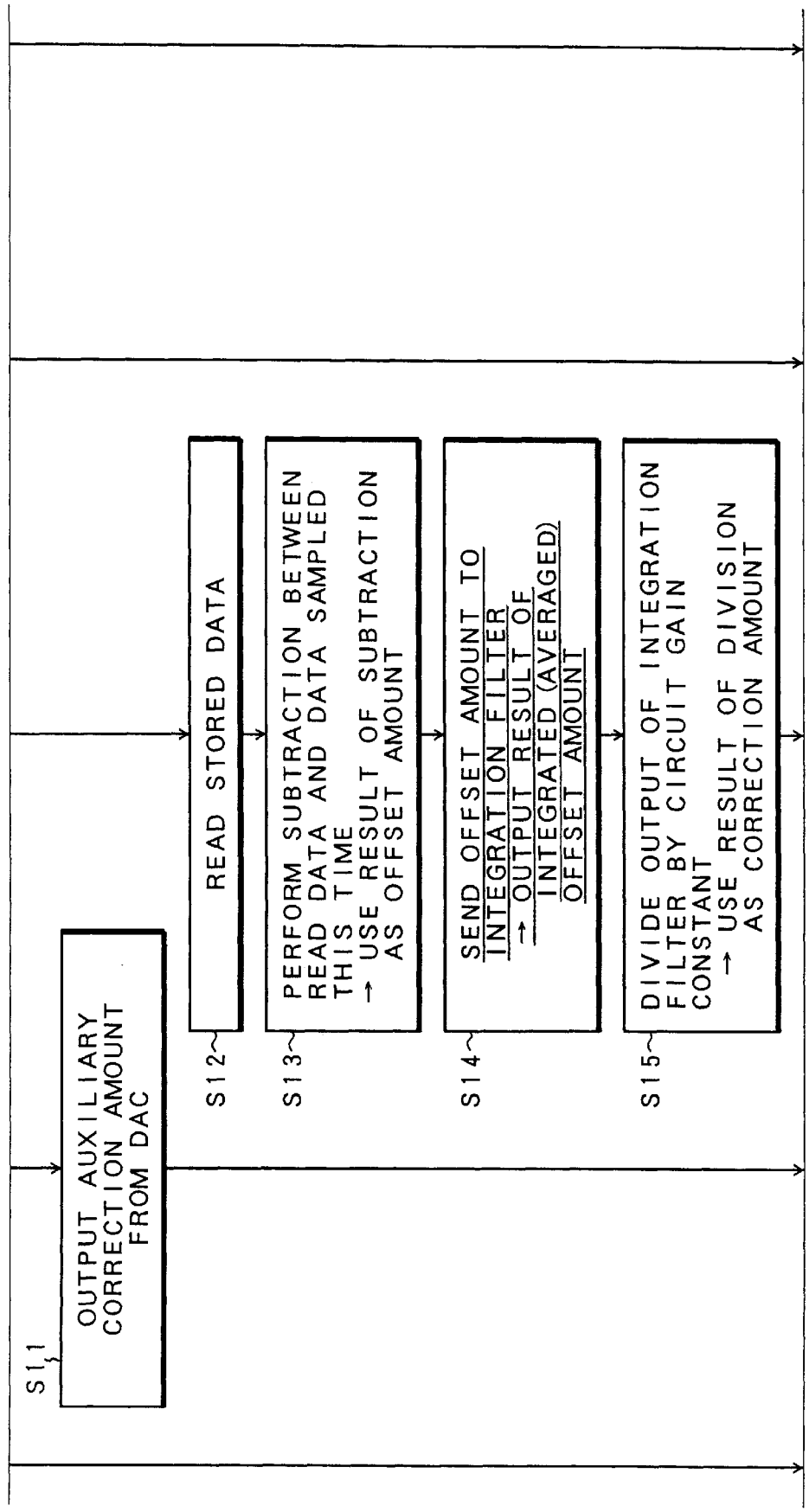
Figure 21D:
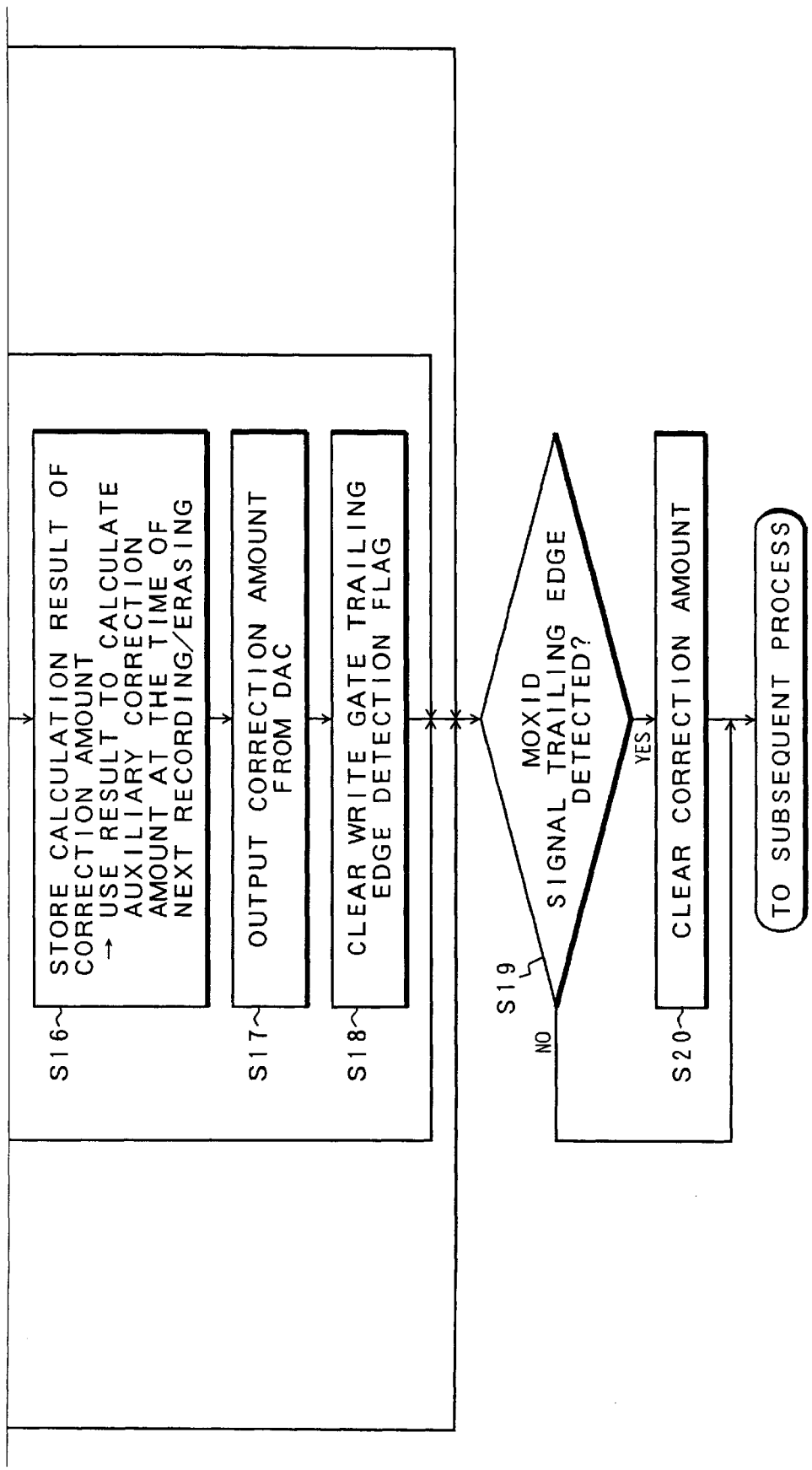
Figure 23B:
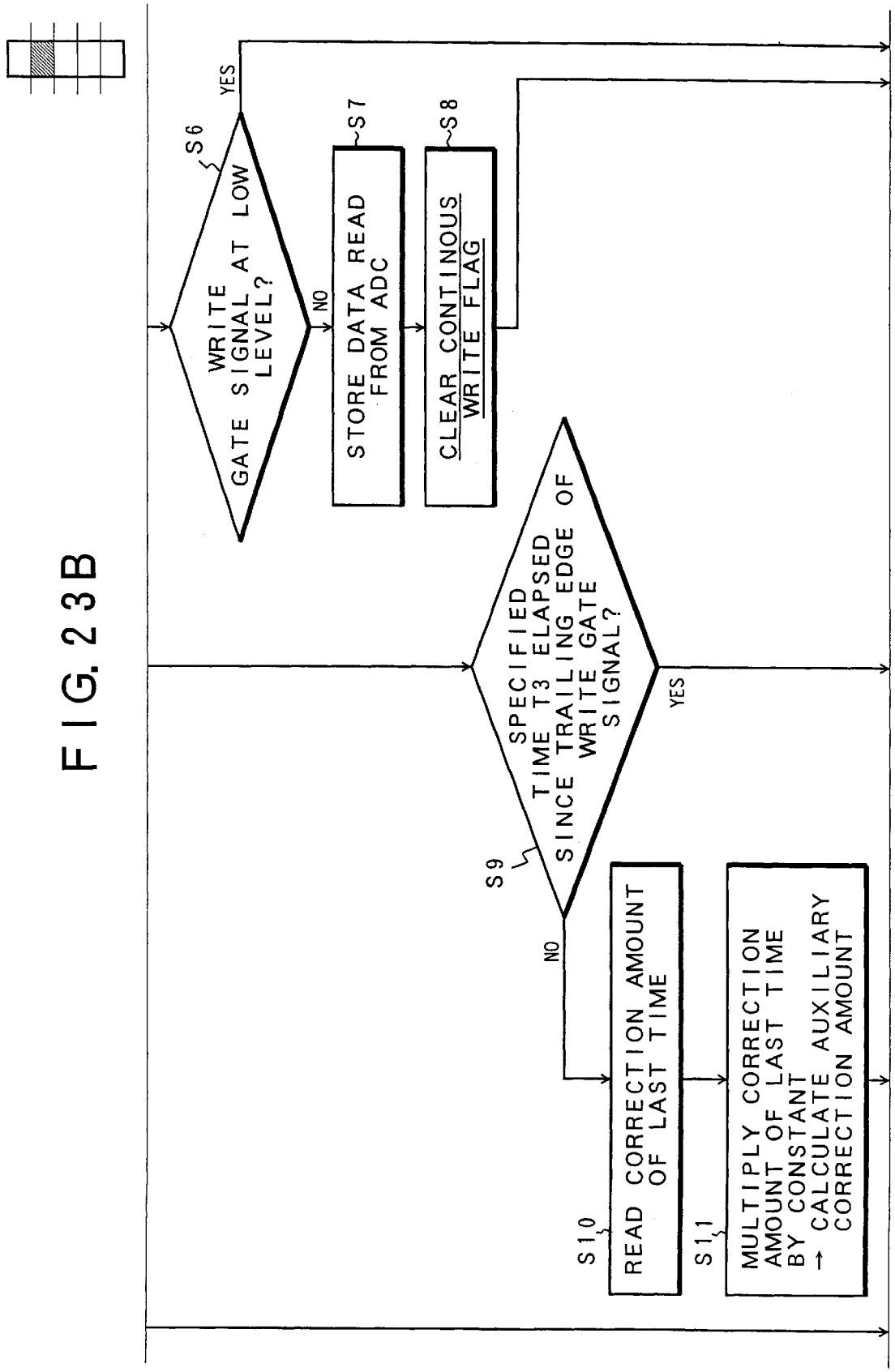
Figure 23C:
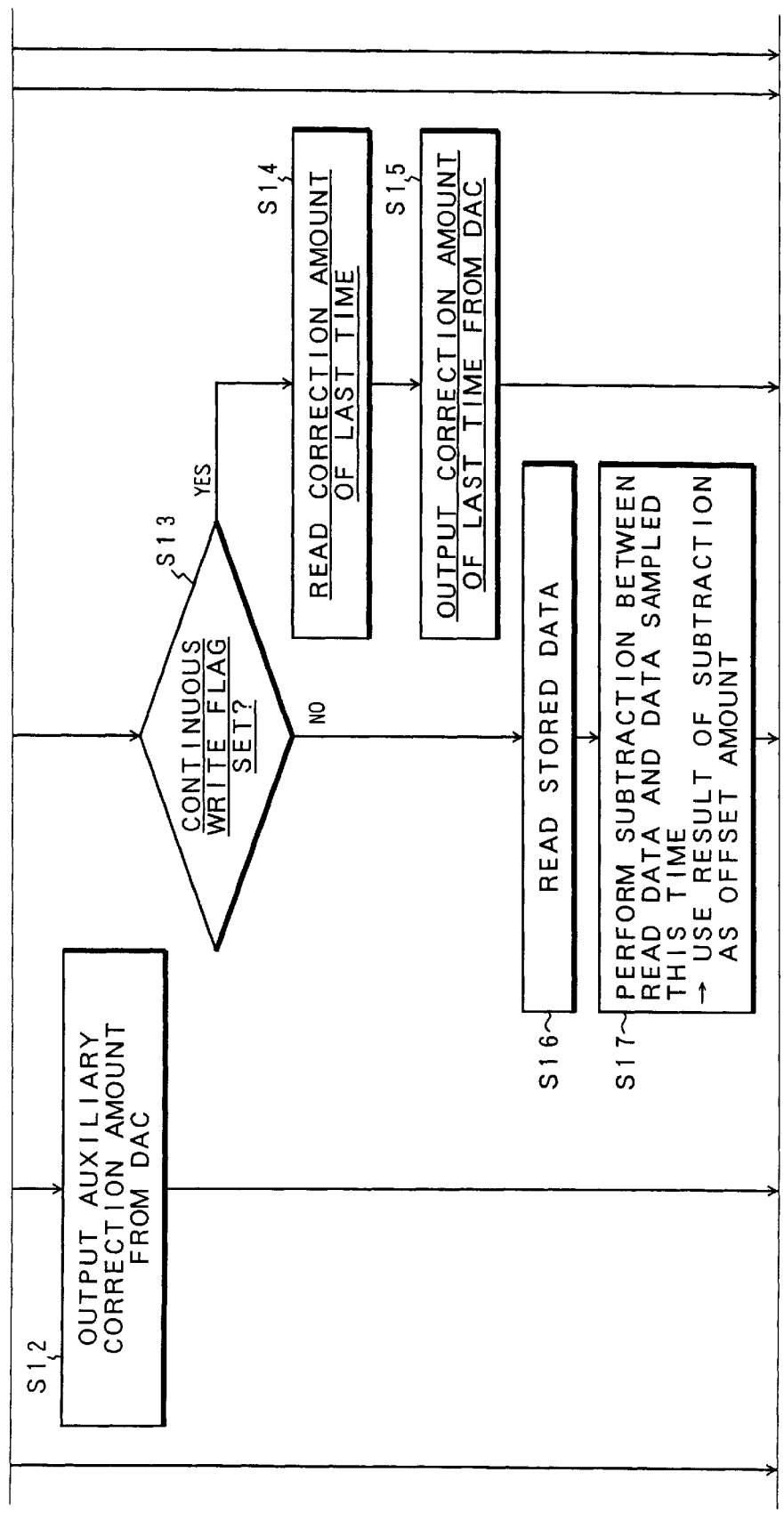
Figures 24A, 24B, 24C, 24D, 24E:
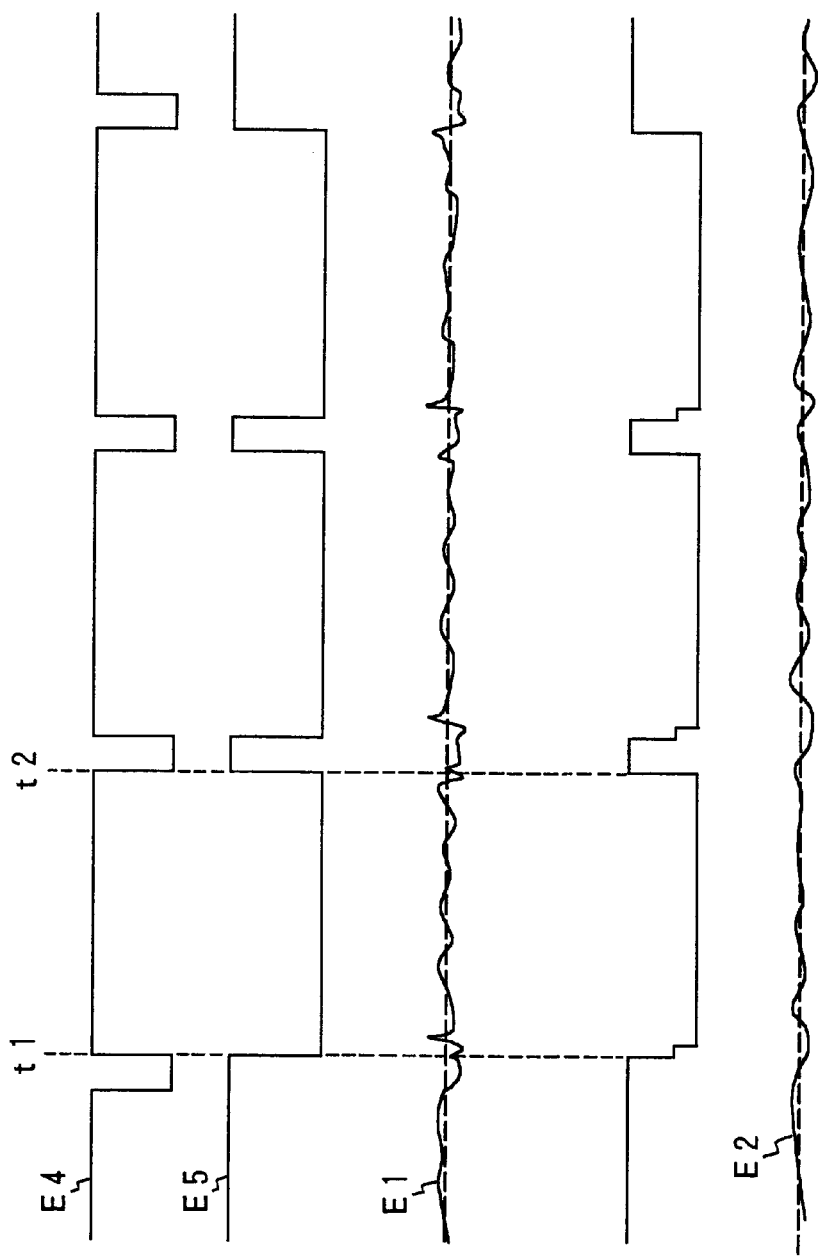
FIGS. 24A to 24E are time charts of signals of respective parts in the ninth embodiment of FIGS. 23A to 23E.
Figure 25B:
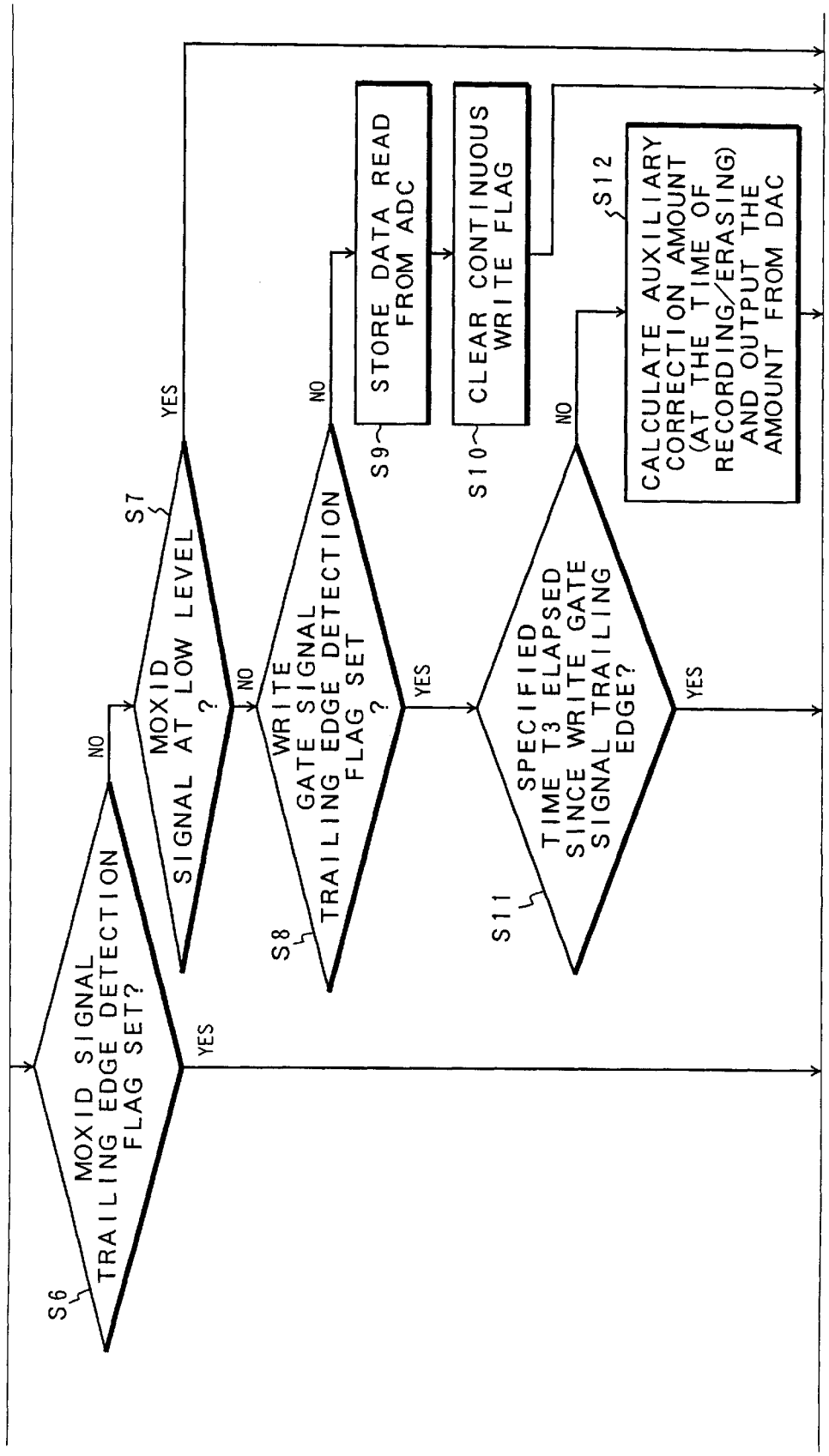
Figure 25D:
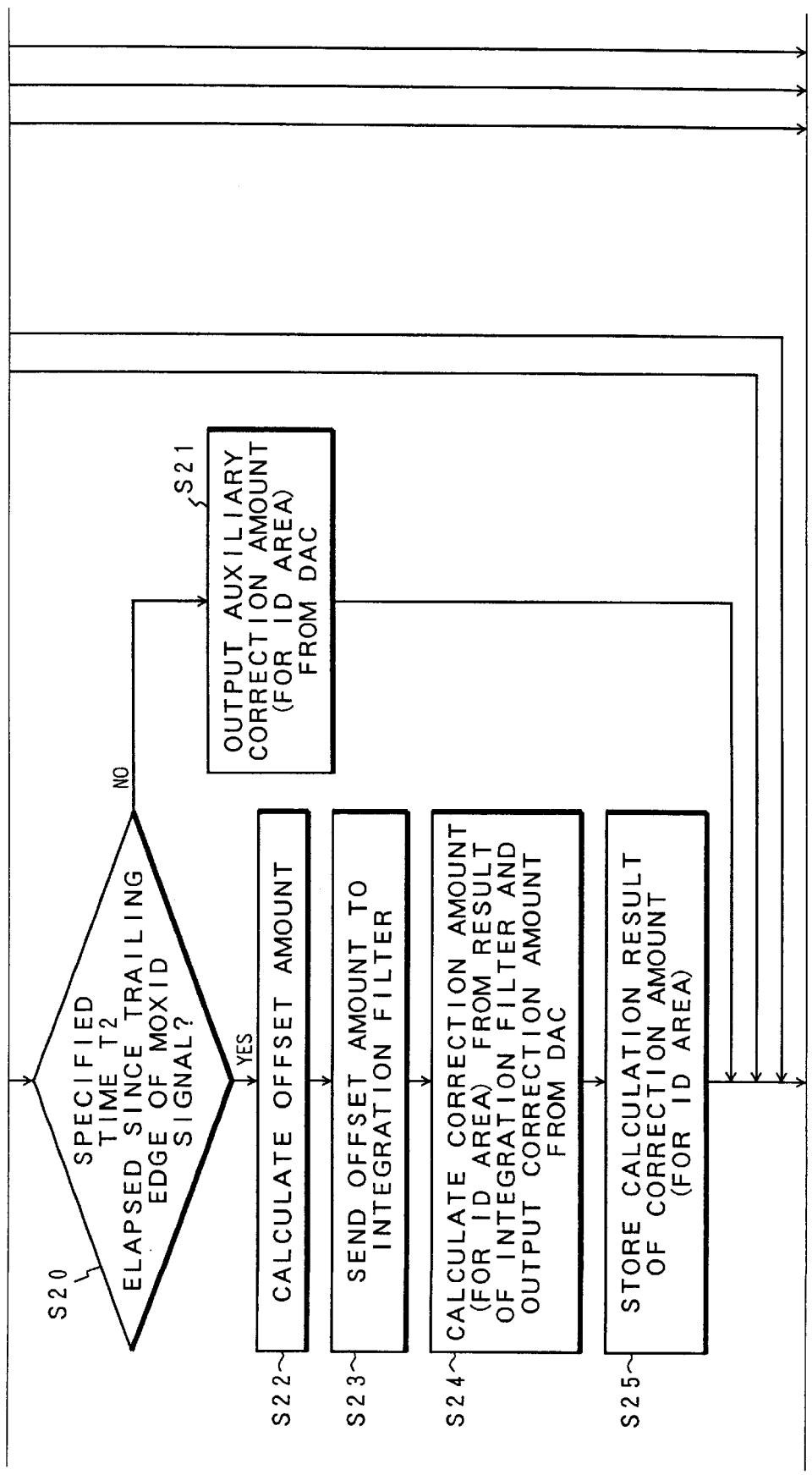
Figure 25E:
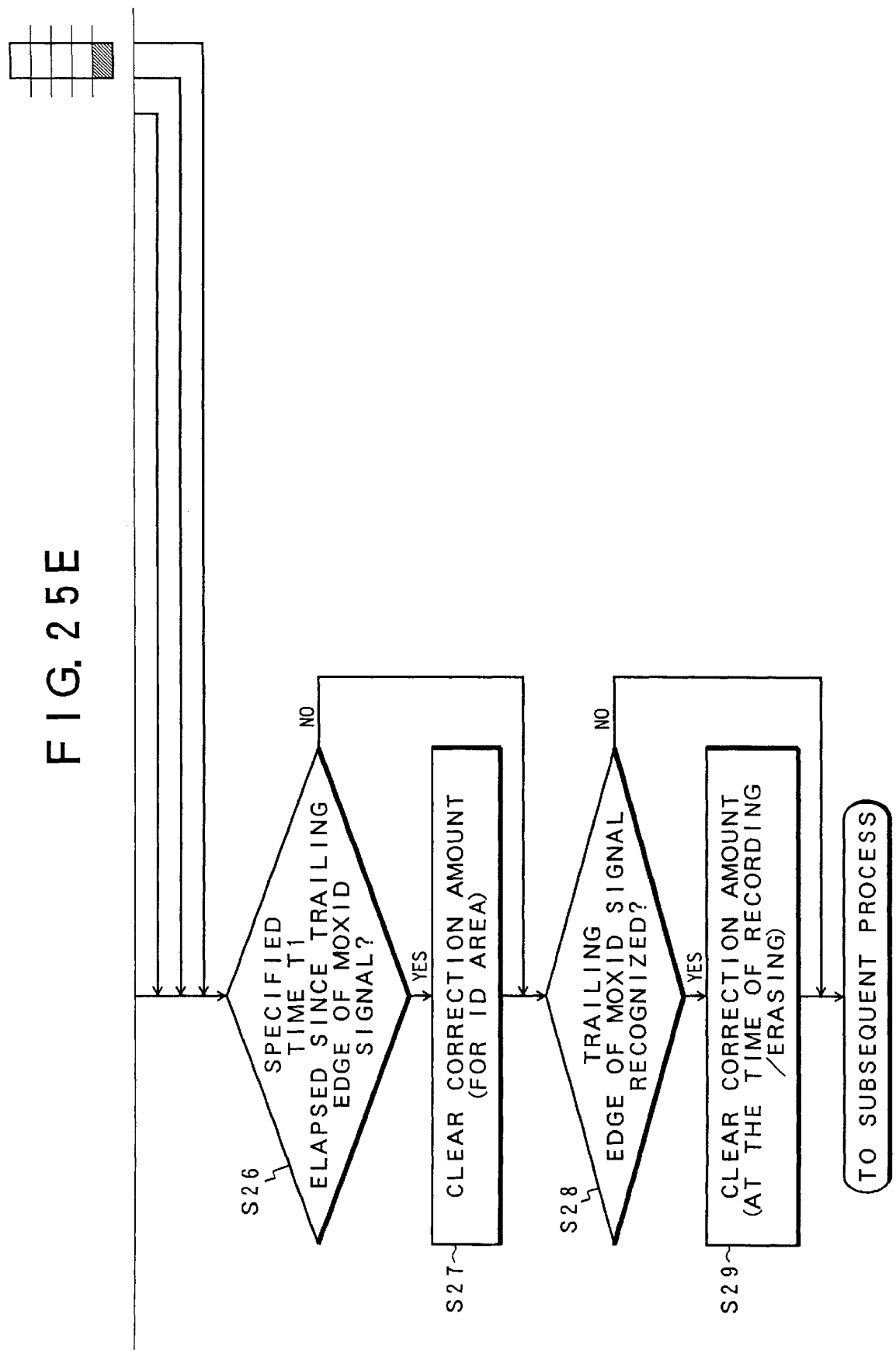
Figures 26A, 26B, 26C, 26D, 26E, 26F, 26G, 26H, 26I:
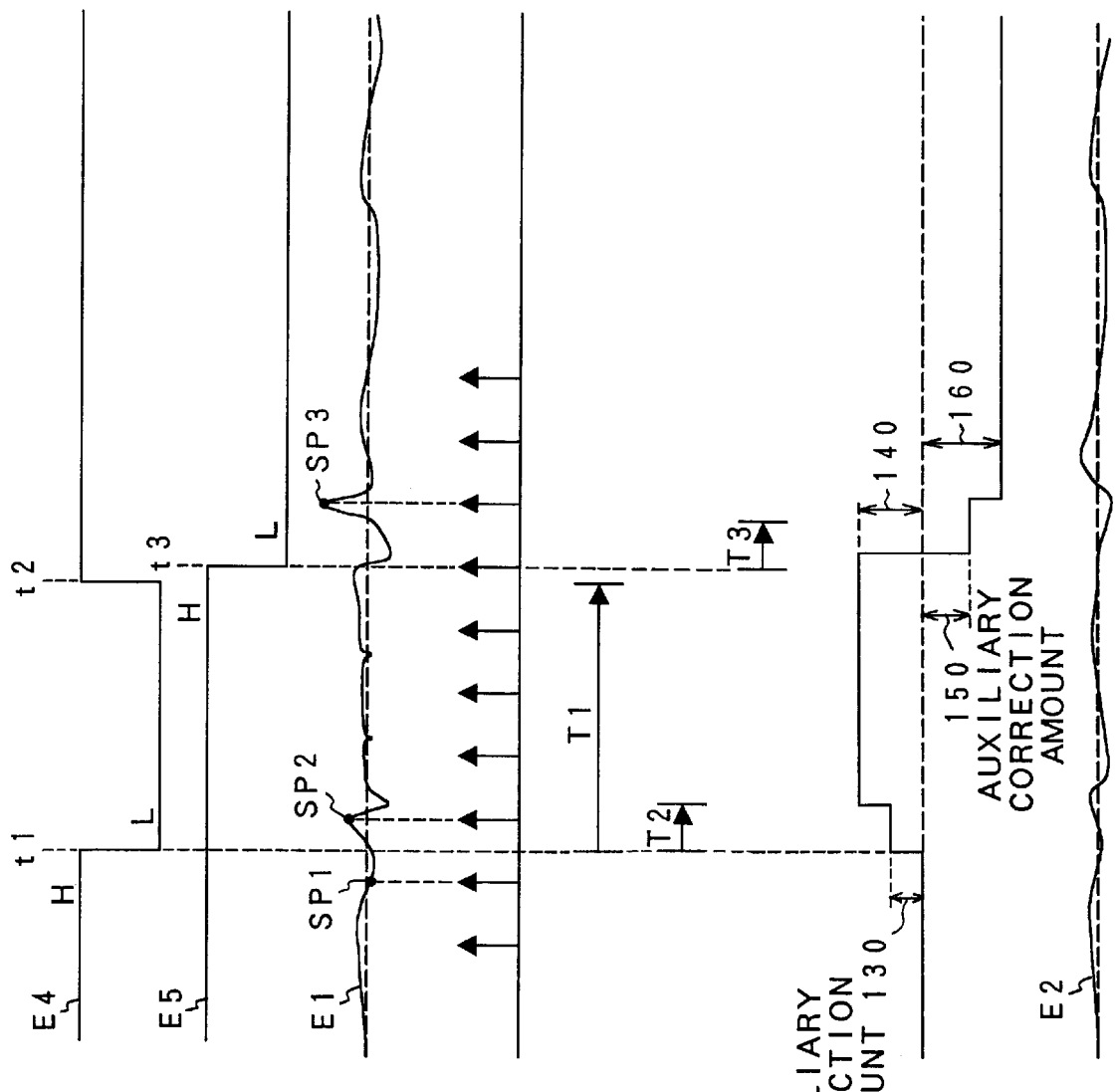
FIGS. 26A to 26I are time charts of signals of respective parts in the tenth embodiment of FIGS. 25A to 25E.

FIGS. 17A to 17C are flowcharts of a sixth embodiment of the invention for performing the offset correction at the time of recording or erasing. FIGS. 18A to 18G show signal waveforms of respective parts in the sixth embodiment. In the fifth embodiment, at the time when the trailing edge of the write gate signal is recognized, the difference between the sampled tracking error data and the tracking error data fetched at the sampling before the ID area just before the sampled tracking error data is calculated and used as an offset amount. In a manner similar to the offset amount in the ID area in the second embodiment of FIGS. 8A and 8B, however, if the tracking error data is fetched at the first sample timing immediately after the trailing edge of the write gate signal and the offset amount is calculated, there is a case such that the offset amount is calculated before the offset fully changes in the tracking error signal due to an increase in the reflection light amount. In a sixth embodiment of FIGS. 17A to 17C and FIGS. 18A to 18G, by using the time point after elapse of specific time T3 since the detection of the trailing edge of the write gate signal as a timing of detecting the offset amount, the offset amount is calculated on the basis of the tracking error data in which an offset has fully changed. The flowchart of the sixth embodiment is a flowchart obtained by adding processes necessary to improve the accuracy of the timing of calculating the offset amount to the flowchart of the fifth embodiment of FIG. 15. Underlined processes of steps S1, S2, and S8 are added. Specifically, a process such that when the trailing edge of the write gate signal is detected in step S1, a detection flag is set in step S2 is added. The process of setting the detection flag is necessary to monitor the elapsed time T3 since the trailing edge also after the recognition of the trailing edge of the write gate signal. When the detection flag is set by the trailing edge of the write gate signal in step S5, the program advances to step S8 where the elapse of the specific time T3 since the trailing edge of the write gate signal is monitored. When it is before the elapse of the specific time T3, steps S9 to S13 are skipped and the processes are not performed. After elapse of the specific time T3, by the processes of steps S9 to S13, the offset correcting process is performed by the calculation of the offset amount, calculation of the correction amount, and addition of the correction amount. The point of using the tracking error data sampled this time and the tracking error data sampled just before the ID area at the time of calculating the offset amount is the same as that of the fifth embodiment.

As a result of the offset correcting process in the sixth embodiment of FIGS. 17A to 17C, as shown in signal waveforms in respective parts in FIGS. 18A to 18G, the offset amount is calculated as a difference between the tracking error data fetched at the sample point SP1 as a sampling timing just before the time t1 at which the MOXID signal E4 goes down and the tracking error data at the sample point SP2 as a first sampling timing after elapse of the specific time T3 since the time t3 at which the write gate signal E5 goes down. A correction amount calculated based on the offset amount is outputted until the MOXID signal E4 in the next ID area goes down.

FIGS. 19A to 19D show a flowchart of a seventh embodiment of the invention of calculating an auxiliary correction amount and performing a correcting process until the offset correction is performed since a start timing of recording or erasing. FIGS. 20A to 20G show signal waveforms of respective parts. In a manner similar to the third embodiment of correcting an offset in the ID area in FIGS. 10A to 10C and FIGS. 11A to 11F, as in the sixth embodiment of FIGS. 17A to 17C and FIGS. 18A to 18G, when the offset is corrected by calculating the offset amount, calculating the correction amount, and adding the correction amount after the specific time T3 since the trailing edge of the write gate signal, the timing of starting the offset correction is naturally delayed. In this case, the time in which the offset change appearing on the tracking error signal is left until the start of the offset correction becomes long. Consequently, although the tracking error signal E2 is passed through the filters such as the notching circuit 102 and the low pass filter 104 for the servo control, if the influence of the offset is exerted on the tracking error signal E2, the effect of the offset correction is reduced in half. In the seventh embodiment of FIGS. 19A to 19D, therefore, during the period from the start timing of recording or erasing to the start of the offset correction, an auxiliary correction value obtained by multiplying the correction amount calculated at the time of immediately preceding recording or erasing by a predetermined constant smaller than 1 is calculated and added to the tracking error signal to thereby perform an auxiliary offset correction. The correction amount is multiplied by the constant smaller than 1 in consideration of variations in waveforms until the offset fully occurs. It is empirically considered that a value about 0.6 to 0.9 is appropriate as the constant. In the flowchart of FIGS. 19A to 19D, in order to realize the offset correction using such an auxiliary correction amount, processes necessary for the offset correction by using the auxiliary correction amount are added to the flowchart of the sixth embodiment of FIGS. 17A to 17C. That is, underlined processes in steps S9 to S11 and step S15 are added. In the offset correcting process of the seventh embodiment, until the specific time T3 is elapsed since the trailing edge of the write gate signal in step S8, the stored correction amount of the last recording or erasing time is read in step S9, the correction amount of last time is multiplied by a constant which lies in the range from about 0.6 to 0.9 to thereby calculate the auxiliary correction amount in step S10, and the auxiliary correction amount is outputted from the D/A converter 130 to the adding circuit 100 in step S10 and is used to correct the offset. After the specific time T3 has elapsed in step S8, in a manner similar to the sixth embodiment of FIGS. 17A to 17C, the correction amount is calculated, and the output of the D/A converter 130 is switched from the auxiliary correction amount to the calculated correction amount. The above processes are the processes in steps S12 to S17. In step S15, the calculated correction amount is stored for the calculation of the auxiliary correction amount used at the time of the next recording or erasing. In the processes of FIGS. 19A to 19D, the auxiliary correction amount is calculated and outputted in steps S9 to S11 every sampling until the specific time T3 is elapsed since the trailing edge of the write gate signal. It is also possible to add a determination branch so as to calculate the auxiliary correction amount only once in the beginning. Alternately, a process of calculating and storing an auxiliary correction amount to be used at the time of next recording or erasing upon calculation of a correction amount and unconditionally outputting the stored auxiliary correction amount at the time of next detection of the trailing edge of the write gate signal may be used. As a result of the offset correcting process of the seventh embodiment, as shown in signal waveforms of FIGS. 20A to 20G, during the period in which the track error data at the sample point SP2 is fetched at the first sampling timing after the elapse of the specific time T3 since the write gate signal E5 goes down at time t3 and the calculation of the offset amount, calculation of the correction amount, and output of the correction amount are performed, the auxiliary correction amount 150 obtained by multiplying the correction amount of last time by a constant is outputted.

FIGS. 21A to 21D show a flowchart of an eighth embodiment of the invention for averaging the offset amounts at the time of recording or erasing. FIGS. 22A to 22G show signal waveforms of respective parts. In the fifth to seventh embodiments of the offset correction at the time of recording or erasing, only the offset amount at the time of recording or erasing used for the offset correction is used as an input of the calculation of the correction amount. When a change which is not purely caused by the reflection light amount but is caused by, for example, a defect in a medium appears in the tracking error signal, the correction amount different from that to be inherently added is added to the tracking error signal. In the case of using the auxiliary correction amount as in the seventh embodiment, there is the possibility that an adverse influence is exerted on the offset correction at the time of next recording or erasing. In the eighth embodiment of FIGS. 21A to 21D, therefore, by using a plurality of past offset amounts as inputs to calculate the correction amount, the tracking servo control system can be prevented from being made unstable by a calculation result which is sporadically changed due to a medium defect or the like while suppressing an adverse influence on the result of calculation of the correction amount. In the eighth embodiment, calculated offset amounts are averaged by being passed to the integration filter, and the correction amount is calculated by using the averaged offset amount. The averaging process can be performed not necessarily by using the integration filter, but by a method of simply calculating an average of a plurality of past offset amounts. In the flowchart of the eighth embodiment, to realize the calculation of the correction amount by averaging offset amounts by using the integration filter, an underlined process of step S14 is added. The details of the averaging process by using the integration filter in step S14 are similar to the integration filter process in the offset correction in the ID area shown in FIG. 13. The following point is also the same. An output result of the integration filter is divided by a circuit gain constant in step S15 to thereby calculate the correction amount and is stored for the next calculation of the auxiliary correction amount in step S16. The integration constant used for the calculation by the integration filter is one or smaller as a condition. Empirically, a value around 0.8 to 0.9 is appropriate. As processes of averaging the offset amounts in FIGS. 21A to 21D by using the integration filter, all of the processes except for the integration filter process in step S14 are not always necessary. For example, by adding the process of averaging the integration filter process in step S14 to the fifth embodiment of FIG. 15 or the sixth embodiment of FIGS. 17A to 17C, similarly, the function of the correction calculation by averaging the offset amounts can be realized.

FIGS. 23A to 23E show flowcharts of a ninth embodiment of offset correction according to the present invention at the time of recording or erasing successive sectors. FIGS. 24A to 24E show signal waveforms of respective parts. In the case where information is continuously recorded or erased to/from successive sectors in a medium in an optical disk drive of the present invention, a change in the amount of reflection light from the medium becomes significant. To be specific, an offset due to reduction in the amount of reflection light occurs in the ID area, an offset occurs due to an increase in the light emitting power at the time of recording and erasing, and the offset repeatedly occurs every continuous sectors. At the time of continuous recording or erasing, tracking error data which is not influenced by the offset cannot be fetched. On the other hand, the time for tracking the data area in which recording or erasing is performed is much longer than that for the ID area. Consequently, the accuracy of the correction amount added for the offset correction is very important. In the ninth embodiment of FIGS. 23A to 23E when the continuous recording or erasing is performed, the correction amount used for recording or erasing in the first sector is held and is continuously used as an offset amount during the recording or erasing of the second or subsequent sectors, thereby enabling stable offset correction to be realized. The flowchart of FIGS. 23A to 23E are derived by adding the function of continuously using the correction amount calculated in the first sector during the continuous recording or continuous erasing to the flowchart of the eighth embodiment of FIGS. 21A to 21D. That is, underlined processes in steps S8, S13, S14, S15, and S22 are added. By similarly adding the correcting process added for the continuously recording or erasing to each of the fifth embodiment of FIG. 15, the second embodiment of FIGS. 17A to 17C, and the seventh embodiment of FIGS. 19A to 19D, an offset correcting process at the time of continuous recording or erasing can be properly performed. In the offset correcting process in the ninth embodiment, for the first sector, the offset correction by the calculation of the offset amount, calculation of the correction amount, and outputting of the correction amount, which is the same as that in the eighth embodiment of FIGS. 21A to 21D, is performed. In step S22, a continuous write flag is set. Consequently, for the second and subsequent sectors, when it is confirmed in step S13 that the continuous write flag is set, the correction amount of last time is read in step S14 and is outputted from the A/D converter 130 to the adding circuit 100 to perform the offset correction in step S15. When the offset correction is finished in such a manner with respect to the final sector by the continuous recording or erasing, the write gate signal rises to the H level in step S5 and the trailing edge is not detected. It is confirmed that the write gate signal is not at the L level in step S6. After that, the program advances from step S7 to step S8 where the continuous write flag is cleared and the series of continuous write or erasing offset correcting processes are finished. As shown in signal waveforms of FIGS. 24A to 24E, with respect to the offset correction of continuous recording or erasing in the ninth embodiment, the correction amount calculated for the first sector at time t1 is outputted as it is for the second and subsequent sectors. In this case, the auxiliary correction amount and the calculated inherent correction amount are repeatedly outputted.

FIGS. 25A to 25E show a flowchart of a tenth embodiment of performing the offset correction at the time of reproduction in the ID area and the offset correction at the time of recording or erasing in the data area, achieved by including all of the processes in the foregoing first to ninth embodiments. FIGS. 26A to 26I show signal waveforms of respective parts. As shown in the flowchart, for performing the correction of canceling out the offset in the tracking error signal caused by a change in the amount of reflection light from the medium, by providing the process function of both the offset correcting process in the ID area and the offset correcting process at the time of recording or erasing in the first to ninth embodiments of FIGS. 6 to 24E, the most effective offset correction can be realized.

Specifically, the flowchart of the tenth embodiment of FIGS. 25A to 25E includes all of the processes in the offset correction in the ID area of FIGS. 11A to 13 and the offset correcting process of continuous recording or erasing in FIGS. 23A to 23E.

According to the present invention as described above, although the servo error signal used for the servo control as passed to the filters, in the offset correction of the present invention, the offset correction of receiving the servo error signal before being passed to the filters, for example, the tracking error signal, measuring an offset, calculating the correction amount from the measured offset, and cancelling out the offset included in the tracking error signal is performed. A change in the offset due to a change in the amount of reflection light directly appears in the tracking error signal before being passed to the filter. As a result, calculation by measuring the offset amount can be realized with high precision, the accurate offset amount is obtained, and the correction amount used for the offset correction becomes accurate as well. Thus, the offset correction with higher precision can be realized. The offset-corrected servo error signal is passed through the filters and fetched by the servo control unit by the DSP. Consequently, there is also an advantage that, even if the timing of the offset correction is deviated more or less and an offset remains, by passing the signal through the filter after that, an influence of a slight deviation in the correction timing can be eliminated. As a result, at the time of reproduction when an offset occurs in the ID area and at the time of recording or reproduction when an offset occurs in the data area, tracking becomes stable and the stability of the entire apparatus is improved. Since all of the changes in the invention in the conventional offset correction based on the filtered tracking error signal are dealt in the DSP, the invention can be realized without increasing the cost by adding a new circuit part or the like.

Although the optical disk drive using a magnetooptic disk as an optical medium has been described as an example in the foregoing embodiments, the offset correction of the present invention can be also applied as it is to other appropriate removable optical disks such as a phase change optical disk, and a DVD.

In the above-described embodiments, the offset correction has been described by using the tracking servo control as an example in the servo controls in the optical disk drive. The offset correction can be also similarly performed with respect to the focusing servo control.

The present invention is not limited to the embodiments, includes appropriate modifications which do not deteriorate the object and advantages of the invention, and is not limited by the numerical values presented in the embodiments.

What is claimed is:

1. An optical storage apparatus comprising:
   an actuator capable of positioning an objective lens for irradiating a medium with a light beam from a light source to a target position on the medium;
   a servo error signal generating circuit which generates a servo error signal indicative of a deviation from a target position of the objective lens on the basis of reflected light from the medium;
   an offset correcting circuit which corrects an offset by adding an arbitrary correction amount to the servo error signal outputted from said servo error signal generating circuit;

a filter which eliminates an unnecessary frequency component from the servo error signal outputted from said offset correcting circuit;

a servo control unit which positions said objective lens to a target position on the medium on the basis of the servo error signal outputted from said filter;

an offset measuring unit which receives the servo error signal which does not pass through said filter and measures an offset amount in the servo error signal, caused by a change in an amount of reflection light; and a correction amount calculating unit which calculates a correction signal to cancel out said offset amount and outputs the correction signal to perform correction to said offset correcting circuit for an offset generating period.

2. An apparatus according to claim 1, wherein said offset measuring unit receives a light amount change detection signal indicative of a change in an amount of reflection light from the medium and measures an offset amount from a difference between a servo error signal just before a detection start timing of said light amount change detection signal and a servo error signal just after the detection start timing, and said correction amount calculating unit outputs a correction amount calculated on the basis of said offset amount to said offset correcting circuit for a period of time in which a light amount change is detected from said light amount change detection signal.

3. An apparatus according to claim 1, wherein said correction amount detecting unit inputs a light amount change detection signal indicative of a change in an amount of reflection light from the medium and measures an offset amount from a difference between a servo error signal just before a detection start timing of said light amount change detection signal and a servo error signal at a time point after elapse of predetermined time since the detection start timing, and said correction amount calculating unit outputs a correction amount calculated on the basis of said offset amount to said offset correcting circuit for predetermined time since the detection start timing of said light amount change detection signal.

4. An apparatus according to claim 2 or 3, wherein said correction amount calculating unit outputs an auxiliary correction amount obtained by multiplying a correction amount of a previous time by a constant to said offset correcting circuit for a period of time from the detection start timing of said light amount change detection signal until a correction amount based on the offset detection is calculated and outputted.

5. An apparatus according to claim 1, wherein said offset measuring unit calculates an offset amount on the basis of a plurality of past detection results.

6. An apparatus according to claim 1, wherein said offset measuring unit receives a first logical signal indicating whether a light beam following a track in a medium is in a data area to which data can be recorded or in an ID area recorded between sectors, and measures an offset amount in said servo error signal on the basis of a detection timing of the ID area in said first logical signal, and said correction amount calculating unit outputs a correction amount calculated based on said offset amount to said offset correcting circuit so as to perform correction for a period of detection of the ID area by said first logical signal.

7. An apparatus according to claim 6, wherein said offset measuring unit measures an offset amount from a difference between a servo error signal just before a start timing of detecting the ID area by said first logical signal and a servo error signal just after the start timing, and said correction amount calculating unit outputs a correction amount calculated on the basis of said offset amount to said offset correcting circuit for predetermined time since the start timing of detection of the ID area by said first logical signal.

8. An apparatus according to claim 6, wherein said offset measuring unit measures an offset amount from a difference between a servo error signal just before the start timing of the ID area detection by said first logical signal and a servo error signal at a time point after elapse of predetermined time since the start timing, and said correction amount detecting unit outputs a correction amount calculated on the basis of said offset amount to said offset correcting circuit for predetermined time since the start timing of detection of the ID area by said logical signal.

9. An apparatus according to claim 7 or 8, wherein said correction amount calculating unit outputs an auxiliary correction amount obtained by multiplying a correction amount of a previous time by a constant to said offset correcting circuit for a period of time since the start timing of detection of the ID area by said first logical signal until the correction amount based on the offset detection is calculated and outputted.

10. An apparatus according to claim 6, wherein said offset measuring unit calculates an offset amount on the basis of a plurality of past detection results.

11. An apparatus according to claim 1, wherein said offset measuring unit receives a first logical signal indicating whether a light beam following a track in a medium is in a data area to which data can be recorded or an ID area recorded between sectors and a second logical signal indicating whether the apparatus is recording data to the medium or erasing data in the medium, and measures an offset amount in said servo error signal being recorded or erased on the basis of said first and second logical signals, and said correction amount calculating unit outputs a correction amount calculated on the basis of said offset amount to said offset correcting circuit during said recording or erasing to perform correction.

12. An apparatus according to claim 7 or 8, wherein said offset measuring unit measures an offset amount from a difference between a servo error signal just before a start timing of detection of the ID area by said first logical signal and a servo error signal just after start of recording or erasing by said second logical signal and said correction amount calculating unit outputs a correction amount calculated on the basis of said offset amount to said offset correcting circuit during the recording or erasing by said second logical signal.

13. An apparatus according to claim 6, wherein said offset measuring unit detects an offset amount from a difference between a servo error signal just before the start timing of detection of the ID area by said first logical signal and a servo error signal after elapse of predetermined time since the start of recording or erasing by said second logical signal, and said correction amount calculating unit outputs a correction amount calculated on the basis of said offset amount to said offset correcting circuit during the recording or erasing by said second logical signal.

14. An apparatus according to claim 13, wherein said correction amount calculating unit outputs an auxiliary correction amount obtained by multiplying a correction amount of a previous time by a constant to said offset correcting circuit for a period of time since the start timing of recording or erasing by said second logical signal until the correction amount based on the offset detection is calculated and outputted.

15. An apparatus according to claim 11, wherein said offset measuring unit calculates an offset amount on the basis of a plurality of past detection results.

16. An apparatus according to claim 11, wherein in the case of continuously recording or erasing data to/from a plurality of sectors, said correction amount calculating unit continuously uses a correction amount calculated for the first sector for second and subsequent sectors.

17. An apparatus according to claim 1, wherein said servo error signal generating circuit is a tracking error signal generating circuit which generates a tracking error signal indicative of a deviation from a target position in a medium track center of the objective lens on the basis of reflection light from the medium.

18. An apparatus according to claim 1, wherein said servo error signal generating circuit is a focusing error signal generating circuit which generates a focusing error signal indicative of a deviation from a focus position of the objective lens on the medium on the basis of reflection light from the medium.

\* \* \* \* \*